US012724804B1

(12) United States Patent
Rajendran et al.

(10) Patent No.: US 12,724,804 B1
(45) Date of Patent: Sep. 1, 2026

(54) ARCHITECTURE FOR ARTIFICIAL INTELLIGENCE AVATAR DEPLOYMENT ACROSS HYBRID CLOUD INFRASTRUCTURE

(71) Applicant: Citibank, N.A., New York, NY (US)

(72) Inventors: Vasanthakumar Rajendran, New York, NY (US); Jefferson Okraku, New York, NY (US); Deepak Kela, New York, NY (US); Rachit Kumar, New York, NY (US); Satchel Aviram, New York, NY (US); Karolina Belwal, New York, NY (US); Tarak Mehta, New York, NY (US); Ranjit Kumar Angiya Rameshbabu, Chennai (IN); Robin Jain, Pune (IN); Joseph V. Bonanno, Jr., Scarsdale, NY (US); Dipendra Malhotra, Cranbury, NJ (US); Aravind Pitchai Guruswamy, Whitehouse Station, NJ (US)

(73) Assignee: CITIBANK, N.A.

( * ) Notice: Subject to any disclaimer, the term of this patent is extended or adjusted under 35 U.S.C. 154(b) by 0 days.

(21) Appl. No.: 19/442,919

(22) Filed: Jan. 7, 2026

(51) Int. Cl.

| | |
|---|---|
| ***G06F 16/33*** | (2025.01) |
| ***G06F 16/3329*** | (2025.01) |
| ***H04L 65/1069*** | (2022.01) |

(52) U.S. Cl.
CPC .... *G06F 16/33295* (2025.01); *H04L 65/1069* (2013.01)

(58) Field of Classification Search
USPC .................................................. 704/7–10.257
See application file for complete search history.

(56) References Cited

U.S. PATENT DOCUMENTS

| | | | | |
|---|---|---|---|---|
| 12,555,008 | B1 * | 2/2026 | Singh | G06N 5/04 |
| 2025/0190460 | A1 * | 6/2025 | Madisetti | G06F 16/3329 |

(Continued)

OTHER PUBLICATIONS

Schick, Timo, "Toolformer: Language models can teach themselves to use tools", Advances in neural information processing systems 36 (2023): 68539-68551. (Year: 2023), 17 pages.

(Continued)

*Primary Examiner* — Leonard Saint-Cyr
(74) *Attorney, Agent, or Firm* — Perkins Coie LLP

(57) ABSTRACT

The systems and methods disclosed herein provide an architecture for deploying artificial intelligence (AI) avatars that generate audio and video responses to user interactions across various infrastructure environments. The systems and methods disclosed herein establish connections between client applications and a first infrastructure layer that invokes multiple agents trained on domain-specific knowledge bases to retrieve associated data records. The retrieved data and user input are routed to a second infrastructure layer hosting a generative AI model that identifies relevant data fields and generates avatar responses as audio or video streams. The systems and methods disclosed herein are enabled to evaluate the user inputs and/or avatar responses by applying one or more validation criteria. The systems and methods disclosed herein adjust the user inputs and/or avatar responses based on the evaluation. Context data is maintained across communication sessions and multiple client devices to preserve conversational continuity

20 Claims, 18 Drawing Sheets

(56) References Cited

U.S. PATENT DOCUMENTS

| | | | | |
|---|---|---|---|---|
| 2025/0209326 | A1* | 6/2025 | Madisetti | G06N 3/045 |
| 2025/0321992 | A1* | 10/2025 | Madisetti | G06F 16/3329 |
| 2025/0328560 | A1* | 10/2025 | Madisetti | G06F 16/3329 |
| 2025/0330677 | A1 | 10/2025 | Chomal et al. | |
| 2026/0017386 | A1* | 1/2026 | Ohayon | G06F 21/577 |

OTHER PUBLICATIONS

Wang, Yuxuan, "Style V Tokens: Unsupervised Style Modeling, Control and Transfer in End-to-End Speech Synthesis.", (2018) Proceedings of the 35th International Conference on Machine Learning (Year: 2018), 10 pages.

* cited by examiner

ARCHITECTURE FOR ARTIFICIAL INTELLIGENCE AVATAR DEPLOYMENT ACROSS HYBRID CLOUD INFRASTRUCTURE

BACKGROUND

An avatar refers to a digital representation that presents information through audio and/or visual outputs. The avatar includes a graphical depiction that displays visual characteristics such as facial features, body structure, and clothing. The visual characteristics are rendered as images or video frames that can be displayed on electronic screens. The avatar produces audio outputs in the form of synthesized speech or other sounds that convey information to users through speakers or other audio playback devices. The graphical depiction can display movements such as changes in facial expressions, head orientation, and body posture that simulate natural human motion. The movements are created by generating sequential images or frames to simulate the appearance of continuous motion when the frames are displayed in rapid succession. The avatar typically operates as an interface element that facilitates communication between users and computational systems by presenting information in a format that resembles human-to-human interaction. However, because computational resources capable of generating natural language responses are typically hosted in external cloud environments, avatars struggle to access information stored in private networks that restrict external systems from directly querying internal databases.

Figure 1:
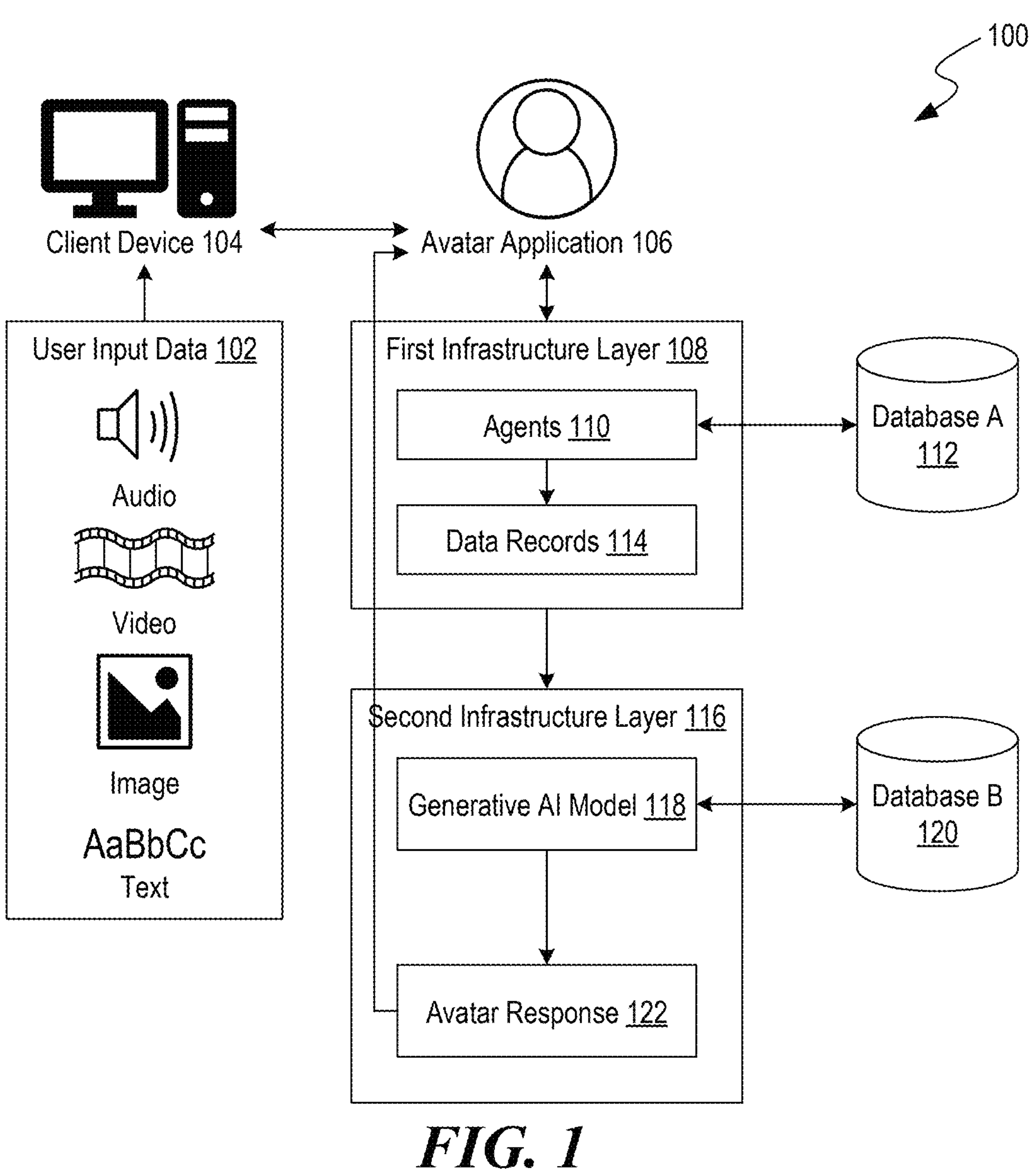
FIG. 1 shows a schematic illustrating an example environment of deploying an artificial intelligence (AI) avatar using an avatar management platform, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

An interface between a human and a computational system refers to a mechanism that enables bidirectional exchange of information between a user and computing resources. The interface receives input from the user in various modalities such as text entered through a keyboard, speech captured through a microphone, or gestures detected through cameras or sensors. The input is converted into data representations that the computational system can use to execute programmatic instructions and perform operations such as retrieving stored information, performing calculations, or generating new data based on the input. The computational system produces output data that is subsequently presented to the user.

Conversational agents refer to a type of interface that enables users to interact with computational resources through natural language exchanges. For example, some conventional conversational agents operate through rule-based systems that match user inputs against predefined patterns and return scripted responses associated with those patterns. Other conventional conversational agents use statistical models that identify associations between inputs and responses from training data (rather than relying on manually authored rules). Further, some conventional conversational agents use neural network architectures that process input text through multiple layers of transformations to generate responses token by token, rather than selecting from predefined templates. These neural network-based agents can generate responses that were not present in training data by identifying patterns of language structure and semantic relationships during training on text corpora.

Avatars refer to a type of interface that evolved from conversational agents by adding visual and audio presentation layers that create audiovisual representations of the underlying computational system. For example, some avatars present graphical depictions with human-like or character-like appearances displayed alongside or instead of the text-only interfaces of conversational agents. The combination of audio and visual modalities reduces cognitive load on users by distributing information across different perceptual channels rather than requiring users to process all information through a single modality, such as reading text. For example, the visual representations provide non-verbal communication signals such as using head nodding to indicate that an entity is present and engaged in the interaction. Synchronized audiovisual representations establish temporal correspondence between what is heard and what is seen to create a more coherent perceptual experience that resembles face-to-face human communication (e.g., spoken communication, sign language such as American sign language).

However, avatars deployed as external systems or services face limitations in accessing information maintained within internal enterprise infrastructure. When an avatar operates on computing resources external to an organization's network perimeter, the avatar lacks direct connectivity to internal databases and/or other backend systems that store user-specific information. External systems attempting to query internal databases typically encounter access restrictions because the firewalls block connection requests originating from outside the network perimeter to prevent unauthorized access to sensitive data. Without access to internal information, the avatar is unable to retrieve data used to generate responsive and/or personalized responses. Thus, the avatar is limited to providing generic information that does not require access to user-specific records, which reduces the utility of the avatar for tasks that require knowledge of individual user circumstances.

In the alternative, hosting avatars on internal computing infrastructure (as opposed to external computing infrastructures) presents resource allocation challenges due to the computational demands of generating avatar responses and rendering audiovisual outputs. Avatars that generate responses through neural network-based models typically require substantial processing power to perform the operations used to generate the output(s). Neural network-based models typically use millions of parameters, which consume significant processor cycles and memory bandwidth. Further, generating synchronized audiovisual outputs requires additional computational resources beyond those used to generate text-based outputs. Internal computing infrastructure typically operates with a fixed capacity, and the variable demand for avatar services creates inefficiencies in resource utilization because the infrastructure would be provisioned to handle peak usage periods and leave resources underutilized during periods of lower demand.

Additionally, avatars deployed in regulated fields such as healthcare or financial services encounter constraints when operating across infrastructure boundaries due to the sensitive nature of the information used to generate responses. Regulated fields are subject to legal and regulatory frameworks (e.g., guidelines, constraints) that impose requirements on how certain types of information must be stored, transmitted, and processed to protect confidentiality and prevent unauthorized disclosure. For example, in healthcare contexts, information such as medical diagnoses, treatment histories, and prescription records constitutes protected health information that is subject to regulations governing its transmission. In another example, in financial services contexts, information such as account balances, transaction details, and investment holdings constitutes confidential financial data that is subject to regulations governing its use. When an avatar requests access to such information to generate personalized and/or responsive responses, the transmission of that information from internal systems where it is stored to external systems where response generation occurs creates potential exposure of sensitive data across infrastructure boundaries. However, regulatory frameworks often require that sensitive information remain within controlled environments (and/or specific geographies) that implement specific security measures (e.g., encryption, access logging, audit trails). Since external systems may not implement the same security controls as internal systems, compliance risks are created when sensitive information is transmitted to those external systems for processing.

Further, conventional avatar systems typically operate using sequential processing architectures introduce latency issues that degrade user experience. When conventional avatar systems route user queries through multiple layers (e.g., security checkpoints, validation layers, data retrieval operations), each processing stage adds delay to the total response time. In conversational interactions, users expect responses within timeframes that approximate natural human dialogue, and delays exceeding several seconds disrupt the conversational flow and reduce user engagement. The latency issues become more pronounced when conventional avatar systems operate across geographically distributed infrastructure where network transmission times between data centers in different regions introduce additional delays.

As such, the inventor(s) have developed systems (hereinafter "avatar management platform") and related methods for deploying artificial intelligence (AI) avatars that generate audio and video responses to user interactions across various infrastructure environments. In response to an interaction request, the avatar management platform establishes a connection between a client application and a first infrastructure layer and invokes (e.g., concurrently, selectively) multiple agents trained on domain-specific knowledge bases to retrieve associated data records (e.g., user information). A domain-specific knowledge base refers to a structured collection of information organized around a particular subject area (e.g., client profiles, transaction histories, product specifications, service records). Each agent specializes in retrieving information from a specific domain by executing queries against backend databases or application programming interfaces (APIs) that provide access to that domain's data.

The retrieved data and/or additional user input are routed to a second infrastructure layer hosting a generative AI model that uses the routed data to generate an avatar response structured as audio and/or video signals. In some implementations, the first infrastructure layer operates within an internal network perimeter controlled by an enterprise entity (e.g., an institution) that maintains security controls over sensitive user data. In some implementations, the second infrastructure layer operates within an external cloud environment (e.g., provided by a third-party service provider) that provides computational resources for executing generative AI models. The generated avatar response can be transmitted back to the client application (e.g., via the first and second infrastructure layers) for presentation.

The avatar management platform can evaluate the user inputs and/or avatar responses by applying one or more validation criteria (e.g., guardrails). A validation criterion refers to a rule or pattern that defines prohibited content or required content characteristics that must be satisfied before data is transmitted or presented. In some implementations, a validation criterion includes patterns that detect sensitive information (e.g., social security numbers, credit card numbers, account passwords) in user input data. In some implementations, a validation criterion includes classification rules that determine whether an avatar response provides regulated advice (e.g., recommendations, guidance) rather than servicing a transaction request (e.g., executing a fund transfer, updating account information). The avatar management platform can adjust the user inputs and/or avatar responses based on the evaluation by removing prohibited content, redirecting conversations toward compliant topics, requesting additional authentication when sensitive operations are detected, adding referrals to human agents when queries exceed the avatar's authorized scope, and so forth.

The avatar management platform addresses the above-mentioned technical challenges by implementing a hybrid architecture that separates data retrieval operations from response generation operations across distinct infrastructure layers. By positioning the agents within the internal infrastructure layer, the avatar management platform enables direct access to sensitive data repositories without creating security vulnerabilities. Thus, the retrieved data records can be redacted before transmitting the data to a second infrastructure layer that hosts generative AI models. Further, by separating the data retrieval operations that require access to internal systems from the computationally intensive response generation operations that benefit from cloud-scale resources, the avatar management platform enables avatars to generate personalized responses based on user-specific information without requiring the entity controlling the first (e.g., internal) infrastructure layer to provision internal infrastructure for peak demand scenarios.

Further, by invoking the specialized agents concurrently and/or selectively rather than sequentially, the avatar management platform enables faster retrieval of data records from different domain-specific databases. By spawning separate execution threads for agent invocation, data retrieval, and input validation, the avatar management platform overlaps processing operations that would otherwise contribute to cumulative latency when performed in sequence. The avatar management platform can further reduce unnecessary processing overhead by classifying user queries into categories and invoking only the subset of validation rules applicable to each category rather than applying the full suite of guardrails to every interaction. Additionally, the avatar management platform can position the gateway engine at the boundary between infrastructure layers to perform data filtering and redaction operations as data passes through rather than requiring separate round-trip transmissions for security operations. The streaming data format used to transmit avatar responses can enable progressive delivery where initial portions of the response are presented to the user while subsequent portions are still being generated and transmitted, thereby reducing the perceived latency experienced by users during conversational interactions. The avatar management platform can maintain cached copies of frequently accessed data in shared resources accessible to multiple agents, thereby enabling subsequent requests for the same information to be satisfied from cache rather than requiring new database queries that would introduce additional retrieval latency.

Further, conventional avatar systems typically require users to re-establish context each time they interact through a different channel or device. For example, when a user initiates a conversation with a conventional avatar through a mobile application and subsequently attempts to continue the conversation through a web browser or wearable device, the conventional avatar lacks awareness of the prior interaction because the conversational state is stored locally on the original device and/or on a server through a channel accessible only by the original device. The user thus must repeat information that was previously provided, re-explain preferences that were previously expressed, and so forth. This repetition consumes time and creates friction in the user experience. The problem is compounded when users frequently switch between devices based on situational convenience. Each transition requires the user to invest effort in reconstructing the conversational context that was lost during the channel switch.

Beyond conversations that include the avatar itself, users often have extensive interaction history documented in external systems that conventional avatars cannot access. For example, when a user has previously engaged with an agent (e.g., a human agent, an automated system) through in-person meetings, telephone conversations, chat interfaces, and so forth, the agent typically documents observations and notes from those interactions in a record-keeping system such as a customer relationship management platform. These documented interactions include context about the user's preferences that were expressed during the direct engagements. However, when the user subsequently interacts with a conventional electronic avatar, the avatar has no awareness of what transpired during those external engagements/conversations because the avatar's memory is limited to interactions that occurred through the avatar interface itself. Thus, again, the user must re-explain information that was already communicated to the agent. The problem is particularly challenging in domains where users have long-standing relationships with organizations and have accumulated substantial interaction history through non-avatar channels over months or years. Each time the user interacts with the conventional avatar, the avatar treats the user as if no prior relationship exists because the avatar is unable to access contextual information stored in external systems.

Conventional avatar systems that do maintain a form of memory of prior interactions (e.g., short-term memory, long-term memory) typically treat all stored memories with equal importance regardless of when the interactions occurred, with whom the interactions occurred, and/or how relevant they remain to the user's current circumstances. When a conventional avatar retrieves context from its memory to inform a response, the avatar may surface information from interactions that occurred months or years ago alongside information from recent interactions. However, a preference expressed by the user during an interaction two years ago may no longer reflect the user's current preferences. The user's circumstances change over time as events occur and priorities shift, but the conventional avatar's memory fails to account for this temporal dimension of relevance. Some conventional systems do incorporate rudimentary decay mechanisms that erase older conversations or exclude them from consideration after a fixed time period, but these approaches continue to remain inadequate because the conventional approaches apply uniform decay policies regardless of the content or importance of the stored information. For example, a conventional system that deletes all interactions older than six months, may result in the loss of contextual information that remains relevant to the user's ongoing needs. Additionally, conventional decay mechanisms typically operate as binary decisions that either include or exclude entire conversations, and fail to account for different aspects of stored information based on their continued relevance to the user's evolving circumstances. Thus, conventional avatars often generate responses that are disconnected from the user's current reality.

To overcome these and other limitations of conventional systems, the disclosed avatar management platform is further enabled to synchronize memory from multiple sources for avatar-based interfaces. The avatar management platform can access a plurality of memory data structures that include a first memory data structure representing records generated by the AI avatar during prior communication sessions with a user (e.g., historical user inputs and avatar responses from previous conversations), a second memory data structure representing records generated by an external source during engagements with the user that occurred independently of the AI avatar (e.g., notes documented by an agent during in-person meetings or telephone conversations), and/or a third memory data structure representing session context data captured during the current communication session (e.g., user inputs and avatar responses and state information generated since the session was initiated). The avatar management platform aggregates the memory data structures into a unified memory representation by, for example, generating a vector embedding for each record (i.e., a numerical encoding that captures the semantic meaning of the record) and indexing the vector embeddings into a common vector space (i.e., a multi-dimensional space in which semantically similar records are positioned near each other).

The avatar management platform can apply one or more weighting operations to portions of the unified memory representation to generate a prioritized memory representation, where the weighting operations assign weight values based on attributes such as timestamps associated with each portion, such that more recent records receive higher weight values relative to older records (e.g., through a temporal decay function that reduces weight values as elapsed time increases). The avatar management platform can generate an avatar response using a generative AI model. The avatar response can include an audio signal (e.g., synthesized speech conveying the response content) and/or a video signal (e.g., animated visual representations of the AI avatar synchronized to the audio signal, sign language gestures, and so forth). The memory data structures can be stored in a distributed database accessible across multiple interaction channels (e.g., a mobile application interface, a web-based interface, a wearable device interface), thereby enabling the avatar management platform to maintain conversational continuity when a user transitions between channels during or between communication sessions.

The avatar management platform addresses the above-mentioned technical challenges by storing memory data structures in a distributed database accessible across multiple interaction channels rather than storing conversational state locally on individual devices or on servers accessible only through specific channels. When a user transitions from one interaction channel to another (e.g., from a mobile application to a web browser to a wearable device), the avatar management platform can retrieve the memory data structures from the distributed database through the new channel and use the retrieved memory to continue the conversation with awareness of prior interactions. The distributed storage architecture ensures that conversational context is preserved regardless of which device or interface the user uses, thereby eliminating or otherwise reducing the need for users to repeat information or re-establish context when switching between channels. The avatar management platform further addresses the technical challenge of inaccessible external interaction history by aggregating records from external sources into the same unified memory representation used for records generated by the AI avatar itself. The AI avatar can thus reference information from external engagements as prior interaction experience, which enables the avatar to generate responses that account for the user's full relationship history with an organization and/or entity rather than treating each interaction as if no prior relationship exists.

The avatar management platform further addresses the technical challenge of outdated memories by applying one or more weighting operations that assign weight values to each portion of the unified memory representation based on timestamps associated with those portions. The weighting operations can apply a temporal decay function that progressively reduces the weight values assigned to records as elapsed time increases from the timestamps associated with those records. The decay function ensures that preferences expressed during recent interactions take precedence over preferences expressed during interactions that occurred months or years ago, which aligns the avatar's responses with the user's current circumstances rather than outdated information. The avatar management platform can further combine the temporal weight values with one or more relevance scores determined by comparing each stored record against the current user input to produce a composite ranking that reflects both recency and semantic relevance. The composite ranking improves the quality and relevance of generated responses.

Further, conventional avatar systems typically require guardrails to validate data received from avatars. For example, an avatar system implementing a generative AI model is at risk of generating avatar interactions that are not appropriate (e.g., associated with prohibited topics) for presentation to a user. As with most generative AI systems, the avatar system can generate textual content that is misleading, inaccurate, or biased, and can generate hallucinations containing factually incorrect statements. Further, multimodal avatars have the additional risk of generating inappropriate content in multiple modes of data. For example, audio data can be too loud or too quiet, be presented in a condescending or angry tone when the desired presentation is one with a cheerful tone, and/or have a speaking cadence that has irregular timing or is inconsistent with the language content of the audio signal. Additionally, video data can include offensive gestures, rude facial expressions, and/or unnatural avatar movements.

In addition to validating the generated avatar responses, multimodal user input data must be validated as well. For example, in cloud environments where the avatar responses are generated on a remote system, guardrails must be implemented to prevent sensitive user data from being transmitted to external systems. Such sensitive user data can include a user's name, address, social security number, bank account information, health information, and the like. Guardrails may be required for each component of multimodal user input data, as sensitive user information can be conveyed through text, audio, and visual modalities. Furthermore, organizational or governmental regulations may require that an organization protect particular user information. For example, privacy regulations may prohibit an organization from sharing personally identifiable information, such as address, name, location, and biometric information such as facial features. These regulations may also apply to additional individuals other than the user who are recorded as part of the avatar conversation, such as family members or individuals in a shared public space with the user.

An avatar management platform may also require content guardrails to the user input data to prevent unintended or prohibited content from being generated in avatar responses. For example, guardrails may be needed that prevent user input data from containing instructions or commands that would cause prohibited avatar responses. In some implementations, users can attempt to intentionally exploit or "jailbreak" an avatar by supplying input data, such as adversarial input data, that causes the avatar to generate unexpected responses. In platforms that leverage AI agents, such unexpected responses can include causing the avatar to output sensitive information that the user is not authorized to access and/or perform actions that the user is not authorized to perform, such as reading and/or modifying account information for another user. Such exploits can cause serious violations of privacy and data security unless guardrails are put in place.

Furthermore, an avatar management platform needs to have guardrails that are compatible with the bidirectional, real-time communication of an avatar communication session. The data transmitted through the avatar management platform must be validated in real time with negligible latency, or else the user's experience will be negatively impacted. This requires efficient approaches to applying guardrails and resolving any subsequently detected compliance failures.

As such, the avatar management platform is further enabled to apply guardrails on data transmitted across infrastructure layers. The avatar management platform can implement an access gateway hosted on internal resources that applies guardrails to outgoing user data and incoming avatar responses. The guardrails can define and detect prohibited content and prevent the prohibited content from being transmitted across the infrastructure layers. The access gateway can process incoming user input data to detect sensitive information or prohibited content, such as prohibited topics or intents. The avatar management platform can responsively remove the prohibited content or replace the prohibited content (e.g., with fake or proxy content) before transmitting the data to externally hosted generative AI models. The access gateway can process incoming avatar responses to detect prohibited content, such as inaccurate text, inappropriate tone, and inconsistent visual data. The avatar management platform can responsively remove the prohibited content or replace the prohibited content. Furthermore, the access gateway can detect proxy content in avatar responses (e.g., representing sensitive user information) and replace the proxy content with true values retrieved from internal databases.

The access gateway can separate and/or partition the guardrails based on characteristics of the user input or avatar response. For example, a set of guardrails can be associated with an attempt to retrieve and present sensitive data about a user from internal systems. The access gateway can identify the set of guardrails and apply them to the data as it is transmitted through the access gateway. Applying only a subset of guardrails decreases the latency involved with applying the guardrails to the transmitted data. Furthermore, guardrails can be applied to the data in parallel to further decrease latency.

The access gateway can detect prohibited content by comparing vector representations of user data and avatar responses with reference patterns that are indicative of prohibited content. Vector representations of the reference patterns can be stored in one or more vector stores for efficient retrieval by the access gateway. The vector representations can be labeled or categorized based on a category of the user input or avatar response, and retrieved only for user input or avatar responses of the corresponding category.

The avatar management platform addresses the above-mentioned technical challenges by detecting prohibited content locally in internal data storage systems to prevent sensitive data from being transmitted to external systems. The avatar management platform allows sensitive user data to be hosted internally and used in avatar conversations without allowing sensitive information to cross infrastructure boundaries. Additionally, the avatar management platform can detect and prevent prohibited content from being presented to a user without relying on external systems that are not under the control of an organization hosting the avatar conversation. Furthermore, the avatar management platform is enabled to apply the guardrails in a distributed manner to decrease latency, allowing the avatar management platform to apply guardrails in real time to data being streamed as part of the avatar conversation.

In some implementations, the AI models described throughout the description herein operate as neurosymbolic AI systems that integrate neural network processing with symbolic reasoning. The neurosymbolic AI systems can maintain neural network components that perform statistical pattern recognition (e.g., using learned parameter weights) and symbolic reasoning components that execute rule-based inference (e.g., using logic operations), thus enabling the models to process multimodal input data while applying predefined logical constraints to produce outputs with audit trails that trace each inference step back to specific rules and/or data inputs.

A neurosymbolic AI system represents a computational architecture that combines neural networks with symbolic reasoning systems to perform both statistical pattern recognition and logical inference operations. The neural component includes, for example, interconnected nodes with learned parameter weights that evaluate input data to identify patterns and extract feature representations using one or more transformations. The symbolic component operates using one or more logic systems, knowledge graphs, and/or rule-based engines that execute logical operations using defined relationships and/or constraints. In some implementations, the neural network inference results operate as inputs to the symbolic reasoning system, and the symbolic reasoning system is enabled to execute one or more evaluations against the defined relationships and/or constraints to verify that generated neural network inference results comply with the defined relationships and/or constraints.

When implemented as neurosymbolic AI system(s), the AI models can maintain separate neural and symbolic components that evaluate user input data and generate validated outputs. The neural component, for example, processes the user input data through multiple layers of interconnected nodes to generate provisional responses based on statistical patterns learned during training. The provisional responses represent candidate outputs that satisfy a confidence threshold value based on the training data but have not yet been validated against logical constraints. The symbolic component receives the provisional responses from the neural component and evaluates them against a set of predefined rules and constraints encoded in a database, such as a knowledge graph or rule-based system. The knowledge graph can define relationships between entities (e.g., account types and permissible operations, user roles and authorized information access levels) and constraints that must be satisfied (e.g., regulatory requirements, guidelines). When a provisional response violates a constraint (e.g., providing advice when only servicing operations are authorized), the symbolic component rejects the response and can request the neural component to generate an alternative response and/or modify the response.

While the avatar management platform is described in detail with one or more sequences of operations, the order in which these operations are performed can be modified or rearranged. For example, the avatar management platform applies validation criteria to user input data before invoking agents within the first infrastructure layer. In another example, the avatar management platform applies validation criteria after agents retrieve data records but before routing the data to the second infrastructure layer by scanning the retrieved data for sensitive information that triggers redaction or masking. In some implementations, the avatar management platform invokes guardrails at multiple points in the data flow by applying a first set of validation rules to user input data, a second set of validation rules to retrieved data records, and/or a third set of validation rules to generated avatar responses. In some implementations, the avatar management platform can perform agent invocation, data retrieval, and response generation in parallel rather than sequentially by spawning multiple execution threads that operate concurrently to reduce total processing time. The specific ordering of operations described in the detailed description and illustrated in the figures represents example implementation sequences, but alternative orderings are additionally within the scope of the disclosed technology.

Further, while the avatar management platform is described in detail for deploying avatars in health and financial services contexts, the avatar management platform can be applied, with appropriate modifications, to deliver services across diverse application domains. For example, the avatar management platform can be deployed in customer service contexts where users interact with avatars to resolve product issues, track orders, and/or obtain technical support. The examples provided in this paragraph are intended as illustrative and are not limiting. Any other applications or workflows referenced in this document, and many others unmentioned, are equally appropriate after appropriate modifications.

While the current description provides examples related to neurosymbolic AI models, generative AI models, large language models (LLMs), and agents, one of skill in the art would understand that the disclosed techniques can apply to other forms of machine learning or AI algorithms/models, including unsupervised, semi-supervised, supervised, and reinforcement learning techniques. For example, the disclosed avatar management platform can generate personalized data signals using model outputs from symbolic AI models, support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean that the specific feature, structure, or characteristic following the phrase is included in at least one implementation of the present technology and can be included in more than one implementation. In addition, such phrases do not necessarily refer to the same implementations or different implementations.

Example Implementations of the Avatar Management Platform

FIG. 1 shows a schematic illustrating an example environment 100 of deploying an AI avatar using an avatar management platform, in accordance with some implementations of the present technology. The environment 100 can be implemented using components of example computer system 1600 illustrated and described in more detail with reference to FIG. 16. Likewise, implementations of example environment 100 can include different and/or additional components or can be connected in different ways.

The avatar management platform is enabled to receive (e.g., obtain, access) user input data 102 via a client device 104 communicatively connected to an avatar application 106. For example, the user input data 102 includes audio data captured through a microphone of the client device 104 that records spoken utterances from a user. The audio data can be encoded into a digital format by sampling the analog audio signal at a specified sampling rate and converting the samples into a compressed audio format. In another example, the user input data 102 includes video data captured via a camera of the client device 104 that records facial expressions or gestures from the user. The video data can refer to sequential image frames. In yet another example, the user input data 102 includes text data entered through a keyboard or touchscreen interface of the client device 104. The text data can be captured as character sequences.

The client device 104 refers to a computing device having at least one processor and memory that executes software applications and transmits data over network connections. For example, the client device 104 is a mobile phone that captures voice commands from a user and transmits the voice commands over a cellular network connection. The mobile phone processes the voice commands by executing the avatar application 106 on a mobile operating system. In another example, the client device 104 is a wearable electronic device such as augmented reality (AR) glasses that overlay visual representations of the AI avatar onto the user's field of view while capturing voice commands through a microphone. The AR glasses render the visual representations by projecting images onto transparent display elements positioned in front of the user's eyes. The avatar application 106 refers to a software application executing on the client device 104 that renders an AI avatar interface structured to present audiovisual signals in response to natural language inputs received from a user. The avatar application 106 can process the user input data 102 by transmitting the user input data 102 to the first infrastructure layer 108.

The avatar application 106 can be communicatively connected with a first infrastructure layer 108 that includes agent(s) 110. The connection between the avatar application 106 and the first infrastructure layer 108 can be established by initiating a network session that authenticates the client device 104 using credentials such as authentication tokens or digital certificates. In some implementations, the first infrastructure layer 108 operates as an internal infrastructure layer controlled by an enterprise entity that operates within a private network perimeter. The private network perimeter restricts access to authorized devices and users by filtering incoming network traffic based on source addresses and connection parameters.

The agents 110 refer to autonomous software modules that are each trained on distinct domain-specific knowledge bases and execute programmatic function calls to APIs to retrieve domain-specific information from backend data repositories. A knowledge base refers to a structured collection of information organized around a specific subject domain. Each agent within the agents 110 can be exposed to labeled training data that associates example user inputs with corresponding intents and entities. For example, a first agent within the agents 110 can be trained on a client profile knowledge base that enables the first agent to identify when the user input data 102 contains queries about account status by detecting keywords related to account information and constructing requests to retrieve user account details from backend systems. The requests can be constructed by populating request templates with parameters extracted from the user input data 102 such as user identifiers and account numbers. The agents 110 execute function calls by transmitting the requests to backend systems that process the requests and return structured data responses in formats that contain the requested information organized into key-value pairs.

The agents 110 can be used to generate one or more data records 114 by retrieving information from backend systems in response to the user input data 102. The agents 110 can access a first database 112 to retrieve the one or more data records 114 by executing database queries that filter records based on criteria derived from the user input data 102. The first database 112 refers to a structured data repository that stores client information such as user account information, transaction histories, and/or service-related data accessible through query operations. A structured data repository organizes data into predefined formats with defined relationships between data elements. The structured data repository can organize data into tables with defined schemas where each table represents a different category of information such as user profiles or transaction logs. Each table can include rows that represent individual records and columns that represent data fields within those records.

The agents 110 can retrieve the one or more data records 114 by executing queries against the first database 112 that filter records based on user identifiers extracted from the user input data 102 using authentication tokens or session identifiers. The queries refer to statements that specify which columns to retrieve and conditions that define filtering criteria based on the user identifiers. In some implementations, the agents 110 execute multiple parallel queries to the first database 112 to retrieve different categories of data records simultaneously by spawning separate execution threads that each query a different table within the first database 112. The parallel execution reduces the total retrieval time by allowing multiple database operations to proceed concurrently rather than sequentially. The data records 114 can include structured data entries containing fields relevant to the user input data 102. Each data record within the data records 114 includes key-value pairs that associate data field names with corresponding data values stored in specific data types such as text strings or numerical values. For example, a data record includes an account balance field paired with a numerical value representing the current balance expressed in a currency denomination.

The data records 114 can be transmitted from the first infrastructure layer 108 to a second infrastructure layer 116 via a network connection that spans the boundary between the two infrastructure layers. In some implementations, the data records 114 are transmitted through a gateway engine (e.g., the gateway engine 232 in FIGS. 2A and 2B) that validates the data records 114 against one or more criteria (e.g., guidelines, rules) before allowing transmission to the second infrastructure layer 116. The gateway engine can detect sensitive information patterns such as social security numbers or credit card numbers and redact or mask the sensitive information by replacing it with placeholder values, synthetic values, and so forth. The second infrastructure layer 116 includes one or more generative AI models 118 hosted on computing resources within the second infrastructure layer 116.

The one or more generative AI models 118 refer to neural network-based models that process input data to generate natural language text, audio streams, or visual streams as outputs through forward propagation operations that transform input tensors into output tensors. A tensor refers to a multi-dimensional array of numerical values. The forward propagation operations pass the input data through multiple layers of the neural network where each layer applies one or more transformations to produce intermediate representations that are progressively refined until the final output is generated.

The one or more generative AI models 118 can use a second database 120 to generate an avatar response 122 by retrieving supplemental information that grounds the outputs in verifiable facts. The second database 120 refers to a knowledge base containing information sources (e.g., pre-approved, verified) used for grounding outputs of the one or more generative AI models 118 to ensure factual accuracy. Grounding refers to the process of connecting generated outputs to verified information sources to reduce the likelihood of generating false or unsupported statements. For example, the knowledge base stores curated content such as policy documents or product specifications that have been verified for accuracy by domain experts.

The one or more generative AI models 118 access the second database 120 by executing search queries that retrieve particular information based on semantic similarity between the data records 114 and content stored in the second database 120. Semantic similarity is a measure of how closely related two pieces of text are in meaning rather than in exact wording. The search queries are executed by generating vector embeddings of the data records 114 through an embedding model that transforms text into high-dimensional vectors representing semantic meaning. A vector embedding is a numerical representation of text where semantically similar texts are mapped to nearby points in a multi-dimensional space. The vector embeddings are compared against vector embeddings of content in the second database 120 using similarity calculations that measure the distance between vectors to identify particular information sources. The one or more generative AI models 118 can generate the avatar response 122 by combining information from the data records 114 with information retrieved from the second database 120 using the retrieved context with the data records 114 as input.

The avatar response 122 includes at least one of an audio stream or a corresponding visual stream that presents information responsive to the user input data 102. An audio stream refers to a continuous sequence of audio data transmitted over a network connection that can be played back in near-real-time or real-time. In some implementations, the avatar response 122 includes an audio stream that contains synthesized speech generated by converting generated text responses into audio waveforms. The avatar response 122 can include a video stream that displays an animated avatar representation speaking the synthesized speech using a video rendering model that maps speech sounds to corresponding visual animations (e.g., mouth shapes). In some implementations, the avatar response 122 includes other modalities of communication, such as text, haptic signals, or other modalities to convey information (e.g., instructions to convert to American sign language).

The avatar response 122 can be transmitted back to the avatar application 106. In some implementations, the avatar response 122 is transmitted from the second infrastructure layer 116 to the first infrastructure layer 108 in a streaming data format, which refers to organizing data for continuous transmission where data is sent in sequential chunks that can be processed as they arrive rather than waiting for complete transmission. In some implementations, the avatar response 122 is validated by a gateway engine within the first infrastructure layer 108 before being forwarded to the avatar application 106 by applying output validation rules that check for prohibited content patterns or compliance violations. The avatar application 106 receives the avatar response 122 and renders the audio stream and/or the corresponding video stream on the client device 104 by presenting content through output devices such as speakers that play audio or displays that present visual frames to the client device 104.

Figure 2A:
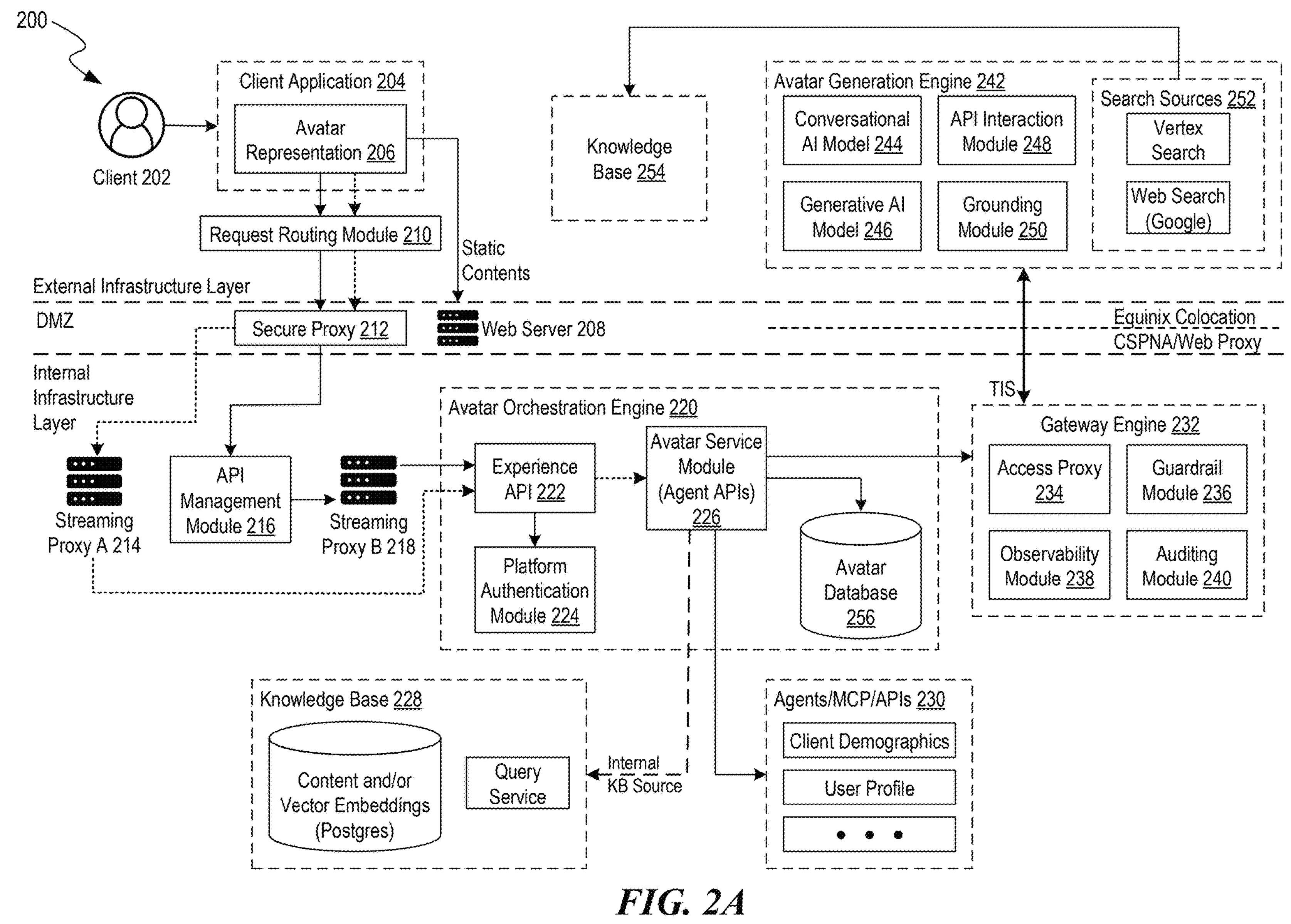
FIG. 2A shows a schematic illustrating an example environment of a first architecture implemented by an avatar management platform, in accordance with some implementations of the present technology.

FIG. 2A shows a schematic illustrating an example environment of a first architecture implemented by an avatar management platform, in accordance with some implementations of the present technology. The environment can be implemented using components of example computer system 1600 illustrated and described in more detail with reference to FIG. 16. Likewise, implementations of example environment can include different and/or additional components or can be connected in different ways.

The avatar management platform implements an architecture for generating avatar responses for an avatar representation 206, where a client 202 communicates with the avatar representation 206 presented in a client application 204 (e.g., the avatar application 106 in FIG. 1). The client 202 refers to an end user who initiates interactions with the AI avatar through input commands or queries submitted via the client application 204. The avatar representation 206 can include a visual and audio interface element that presents synthesized responses generated by the avatar management platform. A visual component of the avatar representation 206 can display, for example, an animated character or graphical representation that simulates human-like (or other reference figure) appearance and movements. An audio component of the avatar representation 206 can produce synthesized speech that conveys information in response to user queries. The client application 204 includes a software application executing on a client device that renders the avatar representation 206 and manages bidirectional data transmission during communication sessions. The bidirectional data transmission enables the client application 204 to send user input data to backend systems and receive avatar responses from those systems such that conversation flow is maintained.

Static contents of the avatar representation 206 can be stored within a web server 208 to increase efficiency of the delivery of unchanging visual and/or interface elements. The web server 208 refers to a server computing system that hosts static assets such as graphical elements, user interface components, and pre-rendered media files for the avatar representation 206. Static assets include files that do not change based on user interactions or dynamic data retrieval and that can be retrieved from the web server 208 during initial loading of the avatar interface to establish the visual framework within which dynamic content will be presented.

The client application 204 can operate within an external infrastructure layer (e.g., the second infrastructure layer 116 in FIG. 1). Non-static information can be transmitted via a request routing module 210 to a secure proxy 212. The request routing module 210 refers to a network service that directs incoming user requests to specific backend servers based on, for example, routing policies and load distribution criterion (e.g., server availability, geographic proximity, current load conditions). The secure proxy 212 refers to a gateway server that enforces predefined criteria (e.g., security rules) and controls access to internal network resources by validating incoming requests and filtering traffic against the predefined criteria.

The web server 208 and the secure proxy 212 can be positioned within a demilitarized zone (DMZ) (e.g., perimeter network, screened subnet) separate from the external infrastructure layer. The DMZ refers to a network segment that acts as a buffer zone between external networks accessible to the public and internal infrastructure that contains enterprise systems. The DMZ provides an additional security layer by isolating publicly accessible services from internal systems and requiring traffic to pass through security checkpoints before reaching internal resources.

Within an internal infrastructure layer such as the first infrastructure layer 108 in FIG. 1, the content from the secure proxy 212 is transmitted to a first streaming proxy 214 (e.g., WebSocket, WebRTC) and/or an API management module 216. The first streaming proxy 214 refers to a server that manages persistent bidirectional communication channels to enable real-time data streaming between the client application 204 and internal services. A persistent bidirectional communication channel maintains an open connection that allows data to flow in both directions without requiring repeated connection establishment for each data exchange. The first streaming proxy 214 receives streaming data such as audio inputs from users and forwards this data to internal processing services (such as an avatar orchestration engine 220) while receiving response data from those services (such as an avatar orchestration engine 220) and transmitting it back to the client application 204. The API management module 216 refers to a platform that controls access to APIs by enforcing authentication requirements, rate limiting policies, and other criteria. Rate limiting refers to restricting the number of requests that a client can make to an API within a specified time period to prevent system overload. The API management module 216 is enabled to track the number of requests received from each client and blocks requests that exceed defined threshold values.

The information received by the first streaming proxy 214 can be transmitted to an experience API 222 within an avatar orchestration engine 220. Similarly, information from the API management module 216 can be transmitted via a second streaming proxy 218 to the experience API 222 within the avatar orchestration engine 220. The second streaming proxy 218 refers to an internal server that routes data between internal services using persistent connections that maintain communication channels for the duration of a user session. The avatar orchestration engine 220 refers to a software framework that coordinates interactions between multiple agents to generate the avatar responses by determining which agents should be invoked based on the content of user queries and aggregating the results returned by those agents. The avatar orchestration engine 220 can evaluate the user input data to identify the types of information used to formulate a response and, via the experience API 222, select one or more agents that have access to the associated data sources of the types of information.

The experience API 222 can use a platform authentication module 224 to verify that incoming requests originate from authorized users before processing those requests. The platform authentication module 224 refers to a security service that enforces access control policies. The platform authentication module 224 validates authentication tokens by verifying one or more user authentication credentials associated with the incoming requests. The information from the experience API 222 is transmitted to an avatar service module 226 after successful authentication.

The avatar service module 226 refers to a collection of autonomous software agents that execute domain-specific function calls to retrieve information from backend systems. Each agent within the avatar service module 226 is trained on a distinct knowledge base corresponding to a particular service domain. For example, a first agent within the avatar service module 226 is trained on a certificate of deposit maturity knowledge base that enables the agent to retrieve information about upcoming maturity dates for certificates of deposit held by a user. In another example, a second agent within the avatar service module 226 is trained on a cash event knowledge base that enables the agent to retrieve information about recent deposits or withdrawals from user accounts. Each agent can be exposed to example queries related to its domain and trained to recognize patterns that indicate when its specialized knowledge is requested.

The avatar service module 226 accesses a knowledge base 228 to retrieve information needed to respond to user queries. The knowledge base 228 can store structured data, unstructured content, semi-structured content, and/or vector representations of data elements to enable semantic search operations and information retrieval. The avatar service module 226 retrieves information from the knowledge base 228 by submitting search queries that define the type of information needed and receiving result sets that contain matching data records (e.g., data records that share a degree of similarity above a particular threshold). The knowledge base 228 can operate as an internal knowledge base source of the avatar orchestration engine 220.

The avatar service module 226 accesses one or more information sources 230 (e.g., agents, MCP, APIs) to retrieve information related to the client 202 from backend systems that maintain user account data and transaction records. The one or more information sources 230 can include application programming interfaces that expose backend services and data repositories defining user-specific information such as account details, transaction histories, product holdings, and/or risk assessment data. Each API within the one or more information sources 230 provides access to a specific category of information by receiving or otherwise obtaining requests that specify user identifiers and data types and returning structured responses that contain the requested information. In some implementations, a first API within the one or more information sources 230 provides access to client demographic information such as age and location. The avatar service module 226 can generate and/or construct API requests by extracting identified parameters from user queries and formatting the parameters according to the specifications of each API. Further methods of extracting the identified parameters are discussed with reference to FIGS. 1 and 5.

In some implementations, the one or more information sources 230 include autonomous software agents that execute domain-specific function calls to retrieve information from specialized data repositories. Each agent within the one or more information sources 230 can be trained on a particular knowledge base corresponding to a particular service domain and/or can operate using Model Context Protocol to standardize communication between the agent and backend systems. The agents can execute function calls through the Model Context Protocol by constructing standardized request messages that contain user identifiers, query parameters, authentication credentials, and so forth, formatted according to protocol specifications. The backend systems receive these standardized messages and return structured data responses in formats defined by the Model Context Protocol, which thus enables the agents to parse and process the returned information consistently regardless of the underlying database or API implementation.

The avatar service module 226 can access a gateway engine 232 to transmit the retrieved information to external infrastructure layer(s) for processing by generative AI model(s). The gateway engine 232 includes an access proxy 234, a guardrail module 236, an observability module 238, and an auditing module 240 that can manage and monitor data transmission between infrastructure layers. The gateway engine 232 controls data transmission between the internal infrastructure layer and the external infrastructure layer by applying one or more validation criteria and/or logging information associated with the agent management platform. The access proxy 234 refers to a component of the gateway engine 232 that enforces access control policies by verifying that requests to transmit data to external systems include valid authorization credentials. The access proxy 234 can apply one or more rules defining particular patterns of text or data that should not be transmitted to external systems or presented to users. The guardrail module 236 scans data passing through the gateway engine 232 to identify matches against prohibited patterns and blocks transmission of data containing prohibited content and/or redacts the prohibited portions before allowing transmission.

The observability module 238 refers to a monitoring service that tracks system performance metrics, logs data transmissions, and/or generates alerts for anomalous behavior. System performance metrics refer to measurements such as response times and error rates that indicate whether the system is operating within expected parameters. The observability module 238 collects these metrics and compares them against threshold ranges or values to detect deviations that may indicate one or more system errors. The auditing module 240 refers to a logging service that maintains records of interactions, data accesses, and/or system operations.

The gateway engine 232 communicates with an avatar generation engine 242 within the external infrastructure layer to process data using generative AI models hosted, for example, on cloud computing resources. The avatar generation engine 242 includes a cloud-based platform that hosts generative AI models and provides computational resources for generating avatar responses. Cloud-based platforms provide access to computing resources such as processors and memory that are maintained by external service providers and accessed over network connections rather than being physically located within the enterprise's facilities. The avatar generation engine 242 includes a conversational AI model 244, a generative AI model 246, an API interaction module 248, a grounding module 250, and search sources 252 that enable generation of avatar responses. The conversational AI model 244 uses the user input data to identify the intent and context of user queries and generates natural language text responses responsive to those queries. The generative AI model 246 transforms the natural language text responses into audio streams and generates visual representations to synchronize the animated avatar movements with the audio signal.

The conversational AI model 244 refers to a neural network-based model trained to process natural language inputs and generate conversational responses in real-time or near-real-time audio or text formats. The conversational AI model 244 can be exposed to datasets of example conversations. The parameters of the conversational AI model 244 can be adjusted to reduce or minimize the difference between the generated responses of the conversational AI model 244 and the expected responses in the training data.

The generative AI model 246 includes a neural network that generates visual representations and animated avatar outputs synchronized with audio responses by mapping phonetic elements of speech to corresponding visual shapes (e.g., mouth shapes), facial expressions, and the like. The API interaction module 248 can include a service that enables the generative AI models to invoke external function calls to retrieve additional information during response generation. External function calls refer to requests sent from the generative AI models to external services or APIs to obtain data that is not contained within the models' training data or the information provided in the initial request. The grounding module 250 refers to a component that connects outputs of the generative AI models to particular information sources, e.g., verified information sources to ensure factual accuracy of generated responses. The search sources 252 refer to external data repositories and search engines that provide access to publicly available information and verified knowledge bases that can be queried to retrieve supporting information for avatar responses.

The avatar generation engine 242 can use a knowledge base 254 to generate avatar responses that are grounded in verified information rather than relying solely on patterns learned during model training. The knowledge base 254 includes a repository of verified information sources maintained by the external infrastructure provider that is used to ground and validate outputs of the generative AI models. Verified information sources refer to documents or data collections that have been flagged or otherwise identified as a ground truth. The avatar generation engine 242 queries the knowledge base 254 by generating a degree of semantic similarity between user queries and content stored in the knowledge base 254 to identify relevant information to be incorporated into the avatar responses.

The avatar response and/or other information about the avatar interaction can be stored in an avatar database 256 for subsequent analysis and auditing. The avatar database 256 includes a data repository that stores records of generated avatar responses, interaction histories, and/or metadata associated with communication sessions. Metadata refers to descriptive information about data such as timestamps indicating when interactions occurred and identifiers linking interactions to specific users or sessions.

Figure 2B:
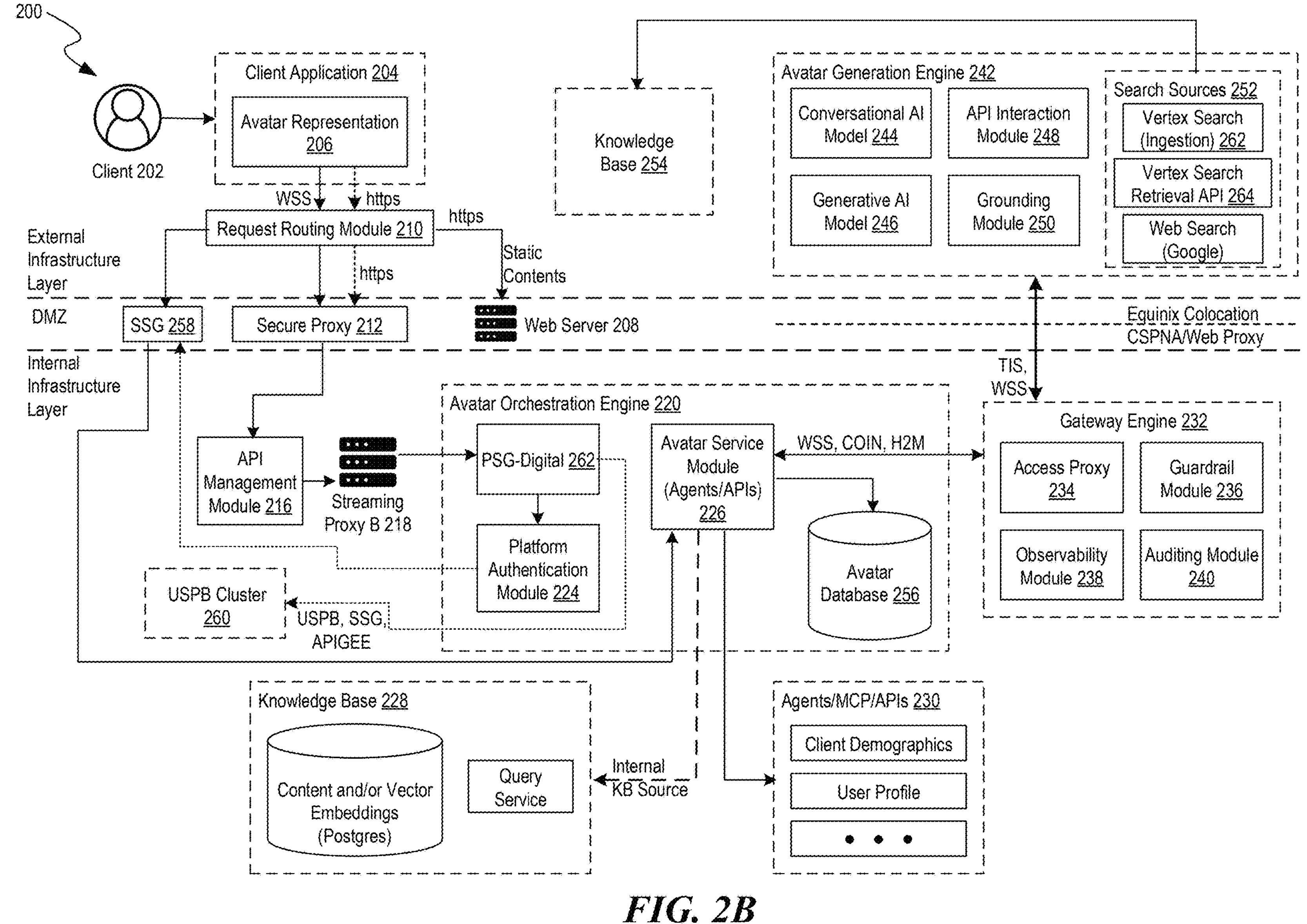
FIG. 2B shows a schematic illustrating an example environment of a second architecture implemented by an avatar management platform, in accordance with some implementations of the present technology.

FIG. 2B shows a schematic illustrating an example environment of a second architecture implemented by an avatar management platform, in accordance with some implementations of the present technology. The environment can be implemented using components of example computer system 1600 illustrated and described in more detail with reference to FIG. 16. Likewise, implementations of example environment can include different and/or additional components or can be connected in different ways.

In some implementations, information from the request routing module 210 is transmitted to a secure service gateway 258 that operates as an additional security layer within the demilitarized zone. The secure service gateway 258 refers to a network component that enforces security policies and controls access to internal services by validating incoming requests and applying authentication requirements before allowing or otherwise causing the data transmission to proceed. The secure service gateway 258 transmits information via web socket secure connections to the avatar service module 226 to enable real-time bidirectional communication between external client requests and internal avatar services. The web socket secure connections can maintain persistent encrypted channels that allow continuous data exchange without requiring repeated connection establishment for each interaction.

The second streaming proxy 218 can transmit information to a platform service gateway for digital services 262 rather than directly to the experience API 222. The platform service gateway for digital services 262 refers to an enterprise service management component that coordinates access to one or more backend systems and APIs through standardized interfaces. The platform service gateway for digital services 262 transmits information through a series of enterprise service components including unified service platform backend systems, secure service gateways, and API management platforms to reach a unified service platform backend cluster 260. The unified service platform backend cluster 260 can include distributed computing resources that host platform authentication services, digital service orchestration components, and/or other enterprise infrastructure services that support the avatar management platform operations. In some implementations, the avatar service module 226 bidirectionally communicates with the gateway engine 232 via web socket secure connections, hypertext transfer protocol connections, and so forth.

In some implementations, the gateway engine 232 communicates with the avatar generation engine 242 via web socket secure connections that maintain persistent encrypted channels for transmitting validated data records and receiving generated avatar responses. The search sources 252 include multiple vertex search components that provide different types of information retrieval capabilities to support avatar response generation. For example, the search sources 252 include an ingestion vertex search 264 that processes and indexes new content as it becomes available in knowledge repositories, and a retrieval vertex search 266 that executes semantic search queries against indexed content to identify information relevant to user queries. The vertex search components can operate as cloud-based search services that enable scalable information retrieval capabilities by distributing search operations across multiple computing nodes.

Figure 3:
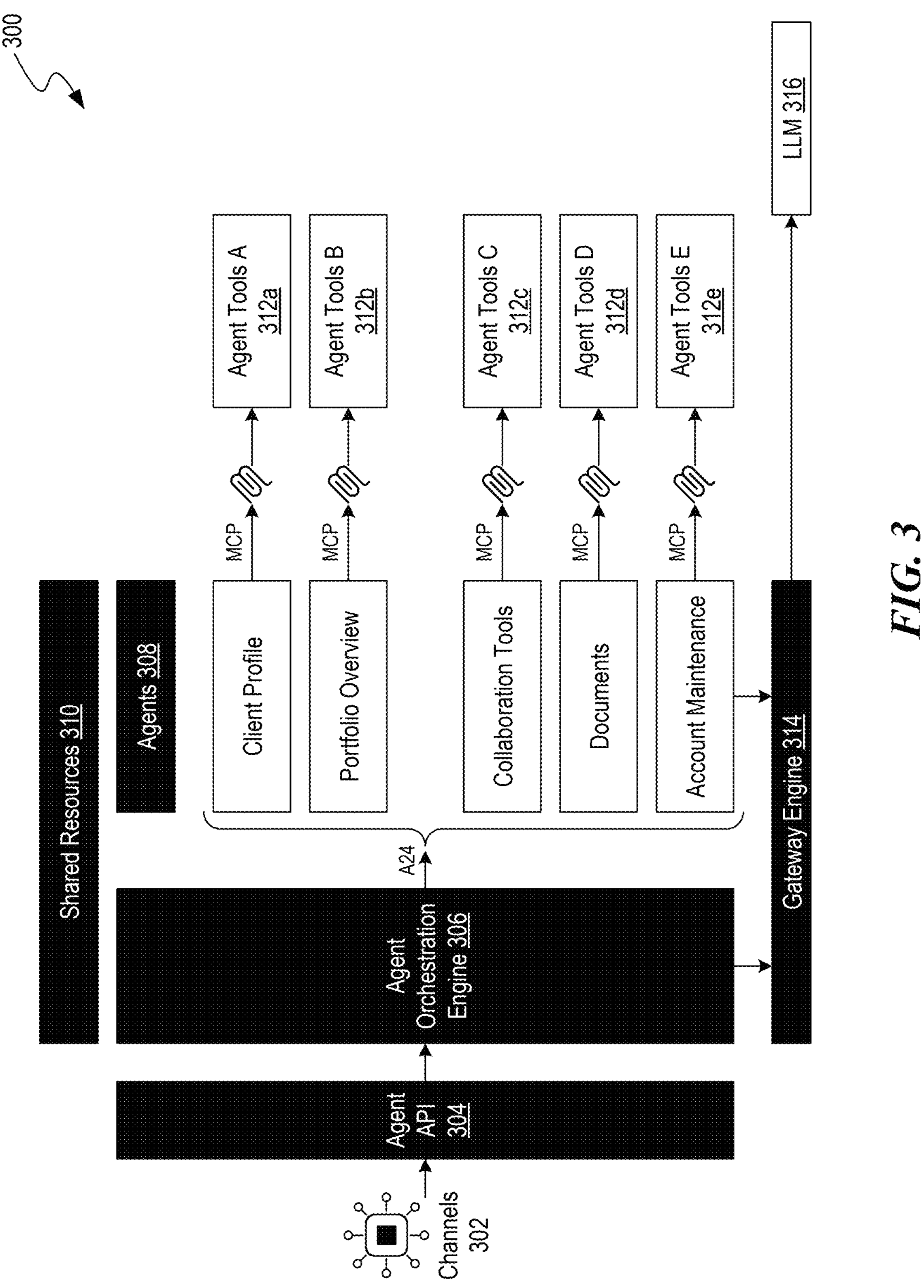
FIG. 3 shows a schematic illustrating an example environment of an avatar orchestration engine used by an avatar management platform, in accordance with some implementations of the present technology.

FIG. 3 shows a schematic illustrating an example environment 300 of an avatar orchestration engine used by an avatar management platform, in accordance with some implementations of the present technology. The environment 300 can be implemented using components of example computer system 1600 illustrated and described in more detail with reference to FIG. 16. Likewise, implementations of example environment 300 can include different and/or additional components or can be connected in different ways.

The avatar management platform implements an architecture where channels 302 are connected to an agent API 304 (e.g., the avatar service module 226 in FIGS. 2A and 2B) to enable user interactions across multiple interface types. The channels 302 refer to communication pathways through which user interaction requests are transmitted from client applications to the agent API 304. Each channel within the channels 302 represents a mode of user interaction that operates using specific input and/or output formats. In some implementations, a channel within the channels 302 is a web-based interface that enables users to interact with the AI avatar through a web browser by submitting text queries and receiving text or audio responses. The web-based interface can render graphical elements within the browser window and capture user inputs through form fields or text boxes. In some implementations, a channel within the channels 302 is a mobile application interface that enables users to interact with the AI avatar through an application installed on a mobile device. The mobile application interface can capture voice inputs through the device's microphone and presents audio or visual responses through the device's speakers and/or display. In some implementations, a channel within the channels 302 is a voice-activated interface that enables users to interact with the AI avatar through spoken commands.

The agent API 304 receives user interaction requests from the channels 302 and routes the requests to an agent orchestration engine 306 (e.g., the avatar orchestration engine 220 in FIGS. 2A and 2B). The agent orchestration engine 306 can manage the invocation of multiple agents, route data between agents, and/or aggregate results from agent operations. The agent orchestration engine 306 can evaluate incoming user interaction requests to determine which agents should be invoked based on the content and intent of those requests using methods described with reference to FIGS. 1, 2, and 5.

In some implementations, the avatar management platform initiates conversations proactively based on detected events rather than waiting for user interaction requests. The avatar management platform can monitor data sources for event triggers that indicate circumstances warranting outreach to specific users. An event trigger refers to a condition or threshold that, when satisfied, causes the platform to generate an outbound communication to one or more users. For example, in financial services contexts, the avatar management platform monitors market data feeds for significant shifts in financial market indices (e.g., a percentage change exceeding a predefined threshold within a specified time period) and initiates avatar conversations with clients whose portfolios contain holdings affected by the market movement. In another example, the avatar management platform monitors account activity data for upcoming events such as certificate of deposit maturity dates or loan payment due dates and initiates conversations to remind users of pending deadlines or available actions. The avatar management platform can generate or otherwise cause transmission of a notification transmitted to the client device that, when acknowledged by the user, establishes a communication session with the avatar. In some implementations, the avatar management platform retrieves user-specific data records through the agents within the first infrastructure layer to personalize the proactive outreach based on the user's particular circumstances (e.g., specific holdings affected by market changes, specific account balances approaching thresholds).

The agents 308 refer to autonomous software modules that execute domain-specific function calls to retrieve information associated with a client. Each agent within the agents 308 can specialize in a particular information domain and is trained to recognize when user queries require information from that domain. In some implementations, a first agent within the agents 308 specializes in retrieving client profile information such as contact details and account preferences. The first agent recognizes queries that contain keywords related to personal information and constructs function calls to backend systems that store client profile data. The agents 308 can execute function calls using Model Context Protocol (MCP) via corresponding agent tools 312 (e.g., a first agent tool 312*a*, a second agent tool 312*b*, a third agent tool 312*c*, a fourth agent tool 312*d*, a fifth agent tool 312*e*). The MCP defines how agents exchange information with backend systems by specifying message formats and interaction sequences.

The agent tools 312 refer to software interfaces that enable the agents 308 to execute function calls to backend systems and data repositories through the MCP. Each agent tool within the agent tools 312 corresponds to a specific data domain or service function by providing access to a particular backend system or database. For example, the first agent tool 312*a* provides access to client profile databases by accepting function calls that specify user identifiers and returning structured data containing profile information.

The agents 308 can share one or more shared resources 310 to improve operational efficiency and reduce redundant data retrieval operations. The shared resources 310 can include computational resources, memory caches, and/or data repositories that are accessible by multiple agents. Memory caches refer to temporary storage locations that hold frequently accessed data to enable faster retrieval compared to querying backend databases. When an agent retrieves information from a backend system, the agent stores a copy of that information in a memory cache within the shared resources 310. Subsequent requests for the same information from any agent can be satisfied by retrieving the cached copy rather than executing a new query to the backend system. The shared resources 310 reduce the total number of backend queries by enabling agents to reuse information retrieved by other agents during the same communication session or recent prior sessions.

The agent orchestration engine 306 causes transmission of the retrieved client information to a gateway engine 314 (e.g., the gateway engine 232 in FIGS. 2A and 2B) after aggregating results from multiple agents by combining information retrieved by different agents into a unified data structure used to generate an avatar response. The agent orchestration engine 306 can generate the unified data structure by organizing retrieved information according to data types and associating each piece of information with metadata that identifies which agent retrieved it and which backend system it came from.

The gateway engine 314 can include a security and monitoring framework that controls data transmission between the internal infrastructure layer and the external infrastructure layer by applying validation rules (e.g., criteria, guidelines, guardrails) to data passing through the gateway. The gateway engine 314 can apply one or more guardrails to the client information before transmitting it to an LLM 316 (e.g., the avatar generation engine 242 in FIGS. 2A and 2B). Guardrails refer to validation rules that detect and/or remove sensitive or prohibited information from data before it is transmitted to external systems or client applications. The gateway engine 314 can apply the guardrails by evaluating the client information for patterns that match sensitive data types such as social security numbers, credit card numbers, or account passwords. When the gateway engine 314 detects a match against a sensitive data pattern, the gateway engine 314 can remove the matching content by replacing it with a placeholder value or by deleting the data field from the transmitted data structure. Thus, sensitive information remains within the internal infrastructure layer and is not exposed to external systems.

The LLM 316 refers to a large language model that uses the client information to generate natural language responses for the AI avatar. A large language model refers to a neural network-based model trained on text datasets to understand and generate text by predicting sequences of words or tokens in response to a given input text. The LLM 316 can receive the filtered client information from the gateway engine 314 and use the information as context for generating responses to the given input text.

Figure 4:
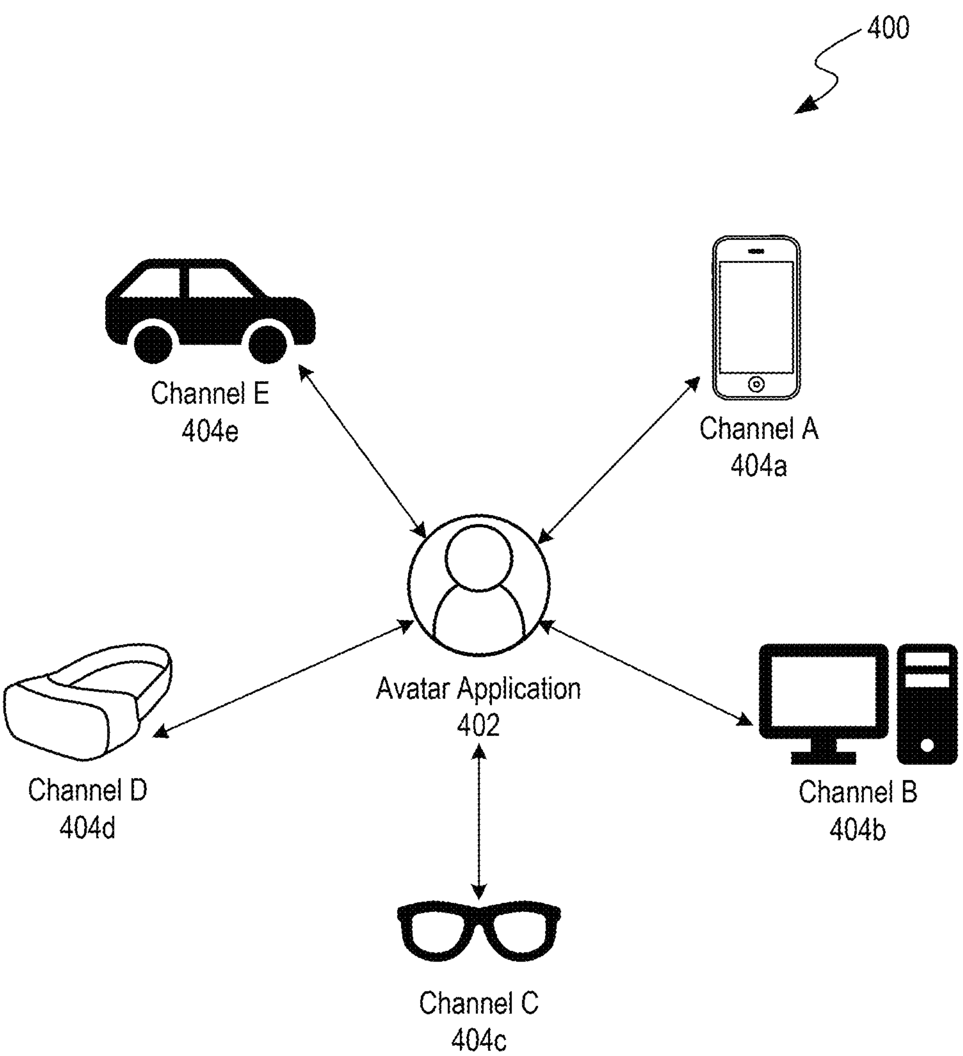
FIG. 4 shows a schematic illustrating an example environment of multiple channels accessible to an avatar management platform, in accordance with some implementations of the present technology.

FIG. 4 shows a schematic illustrating an example environment 400 of multiple channels accessible to an avatar management platform, in accordance with some implementations of the present technology. The environment 400 can be implemented using components of example computer system 1600 illustrated and described in more detail with reference to FIG. 16. Likewise, implementations of example environment 400 can include different and/or additional components or can be connected in different ways.

The avatar management platform implements an architecture where an avatar application 402 such as the client application 204 in FIGS. 2A and 2B and the avatar application 106 in FIG. 1 operates across different channels to enable continuous user interactions regardless of the device being used. The different channels can include a first channel 404*a*, a second channel 404*b*, a third channel 404*c*, a fourth channel 404*d*, and a fifth channel 404*e*.

The avatar application 402 can maintain conversational continuity across the channels 404*a*-404*e* by storing conversation context data in a centralized memory database accessible through network connections. Conversation context data refers to information about the current state of a dialogue including previously discussed topics, user preferences expressed during the conversation, and/or references to specific data elements mentioned in prior exchanges. The centralized memory database stores the conversation context data in a format that associates each piece of context with a user identifier to enable retrieval when the same user accesses the avatar application 402 from a different channel. When a user transitions from one channel to another, the avatar application 402 can retrieve the stored conversation context data from the memory database using the user identifier that uniquely identifies the user across all channels. The agent management platform can query the memory database with the user identifier and receive a data structure containing the conversation context associated with that user. The AI avatar can use the retrieved conversation context data to resume the communication session with awareness of prior interactions, user preferences, and/or dialogue history without requiring the user to repeat information or restart the conversation from the beginning.

In some implementations, the avatar management platform differentiates between short-term memory and long-term memory to adapt storage and retrieval of conversation context data based on temporal relevance. Short-term memory refers to conversational state information for the current communication session. The conversational state information includes dialogue context that tracks the flow of conversation such as the topic currently being discussed and questions that have been asked but not yet fully answered. The conversational state information includes temporary user preferences expressed during the session such as a preference for brief responses. The conversational state information, in some implementations, includes transient data references made within recent conversational turns such as mentions of specific account numbers or transaction dates that are associated with the current query but not to be associated with future sessions.

The short-term memory can be stored in a session memory that provides access during active interactions by maintaining the data in volatile storage that can be read and updated. A session memory retains information only for the duration of a communication session. The session memory can be cleared or archived after the communication session terminates to free up storage resources for new sessions. In some implementations, the session memory is cleared after a predetermined period of inactivity such as thirty minutes without user interaction to ensure that abandoned sessions do not consume storage resources indefinitely.

Long-term memory refers to historical interaction data that persists across multiple communication sessions to enable the AI avatar to build an understanding of the user over time. The historical interaction data includes user profile information such as the user's name, contact preferences, and account identifiers that remain constant across sessions. The historical interaction data can include established preferences such as preferred communication styles or frequently requested information types that have been consistently expressed across multiple interactions. The historical interaction data can include past transaction histories such as records of previous account activities or service requests. In some implementations, the historical interaction data includes recurring topics of interest such as subjects that the user frequently asks about or areas where the user has expressed ongoing concerns.

The long-term memory can be stored in a persistent memory database that maintains data indefinitely or according to data retention policies that specify how long different types of information should be preserved. A persistent memory database refers to retaining data even when the system is powered off or restarted. When generating avatar responses, the avatar management platform can retrieve both short-term memory from the session memory and long-term memory from the persistent memory database. The avatar management platform can combine information from both memory sources to generate responses that account for both the specific details of the current query and the broader context of the user's relationship with the system over time.

Example Implementations of Using the Avatar Management Platform

Figure 5:
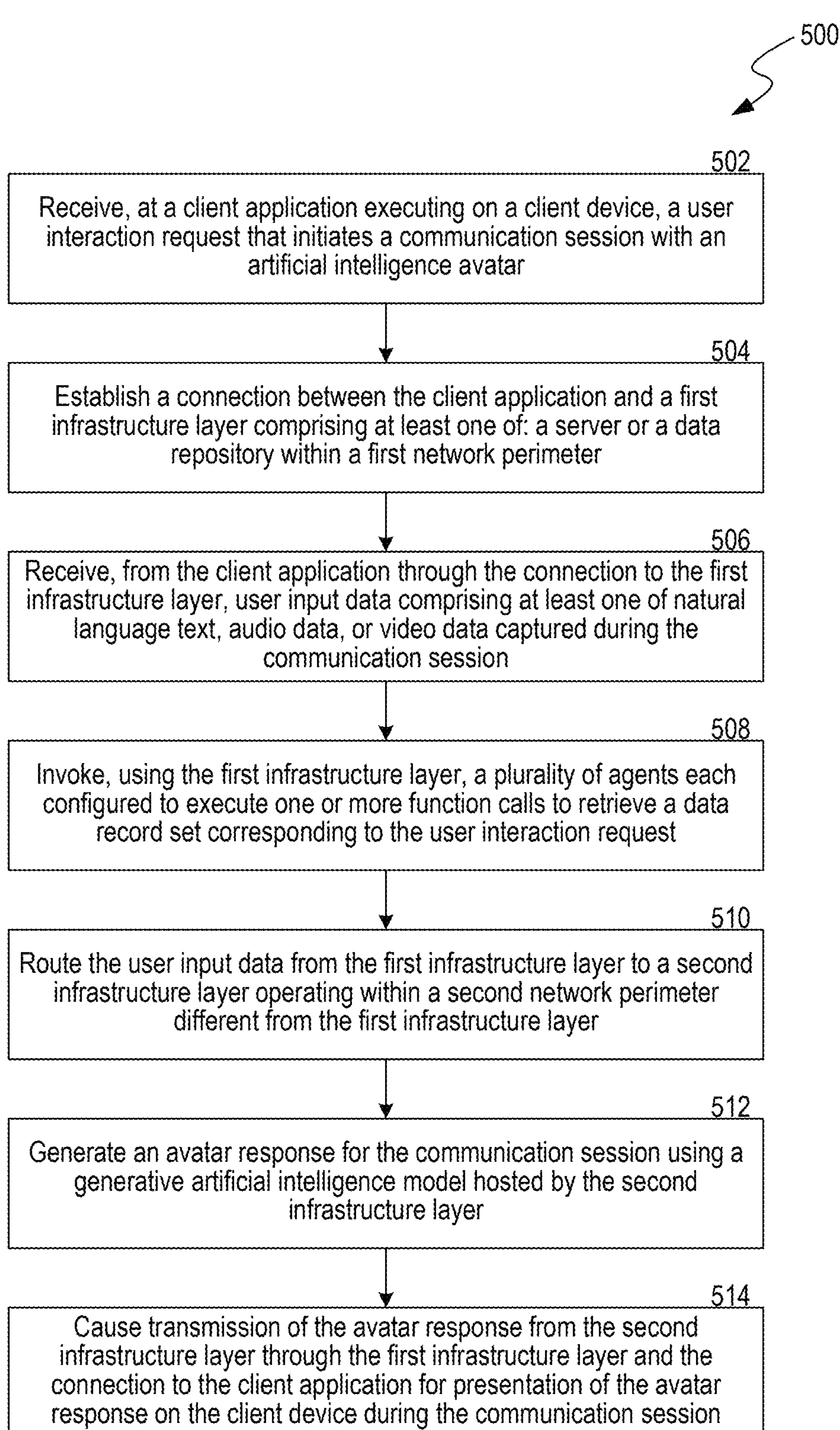
FIG. 5 is a flow diagram illustrating an example process of deploying an AI avatar using an avatar management platform, in accordance with some implementations of the present technology.

FIG. 5 is a flow diagram illustrating an example process 500 of deploying an AI avatar using an avatar management platform, in accordance with some implementations of the present technology. In some implementations, the process 500 is performed by a computer system, e.g., example computer system 1600 illustrated and described in more detail with reference to FIG. 16. Implementations can include different and/or additional operations or can perform the operations in different orders.

In operation 502, the avatar management platform can receive (or otherwise obtain), at a client application executing on a client device, a user interaction request to initiate a communication session with an AI avatar. The user interaction request can be generated when a user performs an action that signals intent to begin interacting with the AI avatar. In some implementations, the user interaction request is generated when the user taps an icon displayed on a touchscreen interface of the client device. The tapping action triggers an event handler within the client application that constructs the user interaction request as a data structure containing initialization parameters. In some implementations, the user interaction request is generated when the user speaks an activation phrase such as "start avatar session." The user interaction request can include metadata that identifies the user and/or specifies configuration parameters for the communication session. For example, the metadata includes a user identifier that uniquely identifies the user within the system to enable retrieval of user-specific data and preferences.

The AI avatar can output an audiovisual signal (e.g., an audio output and a visual representation) responsive to an input received by the client application. An audiovisual signal refers to a combined data stream that contains an audio component and a visual component transmitted together. The audio component of the audiovisual signal includes synthesized speech generated by converting text responses into spoken words. The visual component of the audiovisual signal includes animated or otherwise visual representations of the avatar (e.g., representations that display facial movements) synchronized with the synthesized speech.

In a finance scenario, the user interaction request can include a service inquiry (e.g., a health services inquiry, a financial services inquiry) from a user account. The data record set includes, for example, account information, transaction history, and/or product data associated with the user account. A services inquiry refers to a question or request submitted by a user that pertains to particular products or services provided by an entity (e.g., banking products, investment accounts, transaction details, or other financial services). The user interaction request can be generated when the user submits a query through the client application such as asking, "What is my current account balance?"

In operation 504, the avatar management platform can initiate (or cause initiation of) the communication session by establishing a connection between the client application and a first infrastructure layer (e.g., an internal infrastructure layer controlled by a first entity) operating within a first network perimeter. For example, the client application sends a connection request to a network endpoint associated with the first infrastructure layer. The connection request includes authentication credentials such as a username and password or an authentication token that proves the user's identity. The first infrastructure layer receives the connection request and validates the authentication credentials by comparing them against stored user credentials. When the credentials match, the first infrastructure layer generates a session identifier that identifies the communication session and associates it with the user's account. The connection can be configured to bidirectionally transmit data during the communication session. Bidirectional transmission enables the client application to send user inputs to the first infrastructure layer while receiving avatar responses from the first infrastructure layer without requiring separate connections for each direction of data flow.

In operation 506, the avatar management platform can receive (or otherwise obtain), from the client application through the connection to the first infrastructure layer, user input data (e.g., natural language text, audio data, or video data of a client inquiry) captured during the communication session. For example, the user input data includes natural language text that the user types into a text input field displayed by the client application. The client application captures each keystroke and assembles the characters into a complete text string when the user submits the input by pressing an enter key or tapping a send button. In some implementations, the user input data includes audio data captured when the user speaks into a microphone connected to the client device. In some implementations, the user input data includes video data captured when a camera on the client device records the user's face or gestures. The video data is encoded as a sequence of image frames. The client application transmits the captured user input data to the first infrastructure layer by packaging the data into network packets and sending the packets through the connection.

In operation 508, the avatar management platform can invoke (or cause invocation of), within the first infrastructure layer, a plurality of agents (or one or more internal agents) each configured to execute a command set to retrieve a data record set (e.g., client information such as client preferences, client profile, and so forth) corresponding to the user interaction request. Each agent of the plurality of agents can be trained using different domain-specific knowledge bases to execute a respective command set. The avatar management platform can tokenize the user input data by breaking the input data into individual elements, such as words or subwords. The avatar management platform can apply a classification model to the tokenized input to identify the intent of the user's query. The classification model can assign probability scores to predefined intent categories such as "account balance inquiry" or "transaction history request" by evaluating the tokens (or user input data as a whole) through one or more layers that have been trained on labeled examples of each intent type. The intent category with the highest probability score above a threshold value can be selected as the identified intent. In some implementations, the agent orchestration engine extracts entities from the user input data by identifying specific data elements such as account numbers or date ranges mentioned in the query. The agent orchestration engine can compare the identified intent against a registry of available agents by looking up the intent category in a mapping table that associates each intent with one or more agent identifiers. A match can occur when the intent category appears as a key in the mapping table with corresponding agent identifiers as values. When a match is found, the agent orchestration engine constructs an invocation message containing the user identifier and extracted entities and transmits this message to each matched agent to trigger execution of its command set.

In operation 510, the avatar management platform can route the user input data and/or the data record set from the first infrastructure layer to a second infrastructure layer (e.g., an external infrastructure layer controlled by a second entity) operating within a second network perimeter different from the first infrastructure layer. Before transmission occurs, the transmission payload can pass through a gateway engine (e.g., the gateway engine 232 in FIGS. 2A and 2B) that validates the data, logs the data, and/or applies security controls.

In operation 512, the avatar management platform can cause generation of an avatar response of the AI avatar using a generative AI model hosted by the second infrastructure layer. The generative AI model can identify, within the data record set, one or more data fields (e.g., fields relevant to generating the avatar response) by comparing a vector representation of the user input data and a vector representation of each data field in the data record set. A vector representation refers to a numerical encoding of text or data that captures semantic meaning in a multi-dimensional space where semantically similar content is represented by vectors that are close together.

In some implementations, the generative AI model can determine similarity scores between the user input vector and each data field vector using operations such as cosine similarity that measure the angular distance between vectors. Data fields with similarity scores above a threshold value can be identified as relevant and/or associated with the user's query. The generative AI model can map the one or more data fields to one or more corresponding data sources (e.g., accessible by the second infrastructure layer). The generative AI model can use the one or more data fields and/or a representation of the one or more corresponding data sources to generate at least one of an audio stream or a corresponding video stream within the avatar response. The audio stream or the corresponding video stream can be responsive to the user input data.

In some implementations, guardrails are being applied to the user input data to validate the user input data prior to routing the user input data to the second infrastructure layer, e.g., by applying one or more criteria to remove prohibited content within the user input data. The one or more criteria can be associated with one or more patterns indicative of the prohibited content within the user input data. The result from tests applied by guardrails can be used to generate the avatar response (e.g., if the user inquiry includes an advice question, redirecting the conversation). The avatar management platform applies one or more validation rules to at least one of the user input data or the avatar response to generate a validation result. The avatar management platform can modify the avatar response using the validation result by adjusting a conversation topic within the avatar response, requesting additional authentication information, adding a referral associated with a particular agent within the avatar response, and so forth.

In operation 514, the avatar management platform can cause transmission of the avatar response from the second infrastructure layer, through the first infrastructure layer and the connection, to the client application for presentation of the avatar response on the client device during the communication session. In some implementations, the second infrastructure layer packages the avatar response into a streaming data format that enables progressive transmission where portions of the response can be sent and presented before the entire response is complete. The streaming data format organizes the audio and video data into sequential chunks that are transmitted in order. The second infrastructure layer sends the first chunk of the avatar response across the network connection to the first infrastructure layer while subsequent chunks are still being generated or prepared for transmission. The first infrastructure layer receives each chunk as it arrives and forwards it through the established connection to the client application without waiting for the complete response. This progressive transmission reduces the perceived latency by allowing the user to begin hearing and seeing the avatar's response sooner.

The avatar response can be stored on a distributed ledger such as a blockchain/federated ledger. For example, the avatar management platform generates a cryptographic hash (or other cryptographic representation) of the avatar response and records the hash along with metadata such as timestamps and user identifiers in a block that is added to the distributed ledger.

In some implementations, guardrails are being applied to the avatar response to validate the avatar response prior to causing transmission of the avatar response to the client application, e.g., by applying one or more criteria to remove prohibited content within the avatar response. The one or more criteria can be associated with one or more patterns indicative of the prohibited content within the avatar response.

In the case where the avatar operates as an advisor (e.g., a health advisor, a financial advisor), the avatar management platform can classify the services inquiry as a servicing request or an advice request. The servicing request can include a request to execute a transaction in association with the user account. The advice request can include a request for a recommendation generated based on the data record set associated with the user account. The guardrails can check whether the response is servicing a client or operating as advice. For example, the one or more criteria include a classification rule configured to determine whether the avatar response includes advice or a transaction request. In response to a determination that the avatar response includes the advice, the avatar management platform can modify the avatar response to remove the advice. For example, servicing requests typically contain action verbs related to account operations while advice requests contain interrogative phrases seeking recommendations. The classification rule can evaluate the generated response text to identify language patterns characteristic of advice such as the phrases "you should consider" or "I recommend" that indicate the avatar is providing advice rather than executing requested actions.

The guardrails can be requested by a sub-layer within the first infrastructure layer. For example, the agent management platform invokes a guardrails service hosted within the first infrastructure layer, where the guardrails service is configured to apply one or more criteria to at least one of the user input data or the avatar response. In some implementations, the guardrails can be accessed separately from the sub-layer within the first infrastructure layer. For example, while the agent management platform invokes a first guardrails service hosted within the first infrastructure layer, the first guardrails service can be configured to trigger one or more function calls to a second guardrails service external to the first infrastructure layer. The second guardrails service can be configured to apply one or more criteria to at least one of the user input data or the avatar response. In some implementations, the guardrails are accessed via the second infrastructure layer. For example, the agent management platform can invoke a guardrails service hosted within the second infrastructure layer, where the guardrails service is configured to apply one or more criteria to at least one of the user input data or the avatar response.

In a redundant guardrails or multiple guardrails scenario, the agent management platform can select specific ones based on use case. For example, the agent management platform classifies the user input data into a category. The agent management platform can identify a subset of validation rules from a plurality of validation rules based on the category, and apply the subset of validation rules to the avatar response to generate a validation result. The agent management platform can determine, based on the validation result, whether to transmit the avatar response to the client application or generate a modified avatar response.

The agent management platform can foreshadow future steps to proactively invoke agents to ask guardrail questions early on (i.e., monitoring trajectory of conversation). For example, the agent management platform can evaluate the input data to determine one or more subsequent interaction requests to occur within a predetermined number of conversational turns, and invoke (or cause invocation of) one or more additional agents configured to retrieve supplemental data records corresponding to the one or more subsequent interaction requests.

The avatar can shift memory from different modes (phone, desktop, glasses). The avatar management platform can store conversation data including the input data and/or the avatar response from the communication session in a memory database, where the conversation data is accessible across multiple client devices. When a user transitions from interacting with the avatar on a phone to interacting on a desktop computer, the avatar application on the desktop retrieves the conversation data from the memory database by querying with the user identifier. The retrieved conversation data enables the avatar to resume the conversation on the desktop with awareness of what was discussed on the phone. The memory database can be implemented as a distributed data store that replicates conversation data across multiple geographic locations to ensure reduced latency access regardless of where the user is located or which client device they are using.

The avatar can post short-term and long-term memory and maintain the two types of memory separately. For example, the avatar management platform classifies conversation data as short-term memory data or long-term memory data based on temporal data associated with the conversation data, where the conversation data includes one or more input data and one or more avatar responses across multiple communication sessions. The avatar management platform stores the short-term memory data in a session memory that is accessible during the communication session. The avatar management platform stores the long-term memory data in a persistent memory database that is accessible across the multiple communication sessions.

The avatar management platform can implement a proof channel to authenticate users across modes. Where the client application is hosted on a first client device, the avatar management platform can receive or otherwise obtain a request to access the communication session from a second client device different from the first client device. The avatar management platform can transmit or cause transmission of an authentication test to the second client device. The avatar management platform can receive authentication information from the second client device in response to the authentication test. The avatar management platform can validate the authentication information against stored user information associated with the first client device. In response to satisfaction of the authentication information with the stored user information, the avatar management platform can establish a connection from the second client device to the communication session.

The avatar can be caused to maneuver when, for example, another user comes into the picture and tries to interact with the avatar when the avatar is in the middle of a communication session with another user. The avatar management platform can detect a presence of an unauthorized user during the communication session. For example, when a face is detected that does not match the authorized user's profile, the avatar management platform classifies that person as an unauthorized user. Responsive to detecting the presence of the unauthorized user, the avatar management platform can adjust or modify the avatar response to remove one or more indicators of the data record set. For example, the avatar management platform removes sensitive information in the conversation history or the avatar response (before presenting the response) by replacing the information with generic placeholders or by pausing the response until the unauthorized user is no longer detected in the video feed. In some implementations, the avatar management platform generates a notification to the authorized user indicating that the session has been paused due to detection of another person and prompts the user to confirm whether they want to continue the session or terminate the session.

Synchronizing Memory from Multiple Sources Using the Avatar Management Platform

Figure 6:
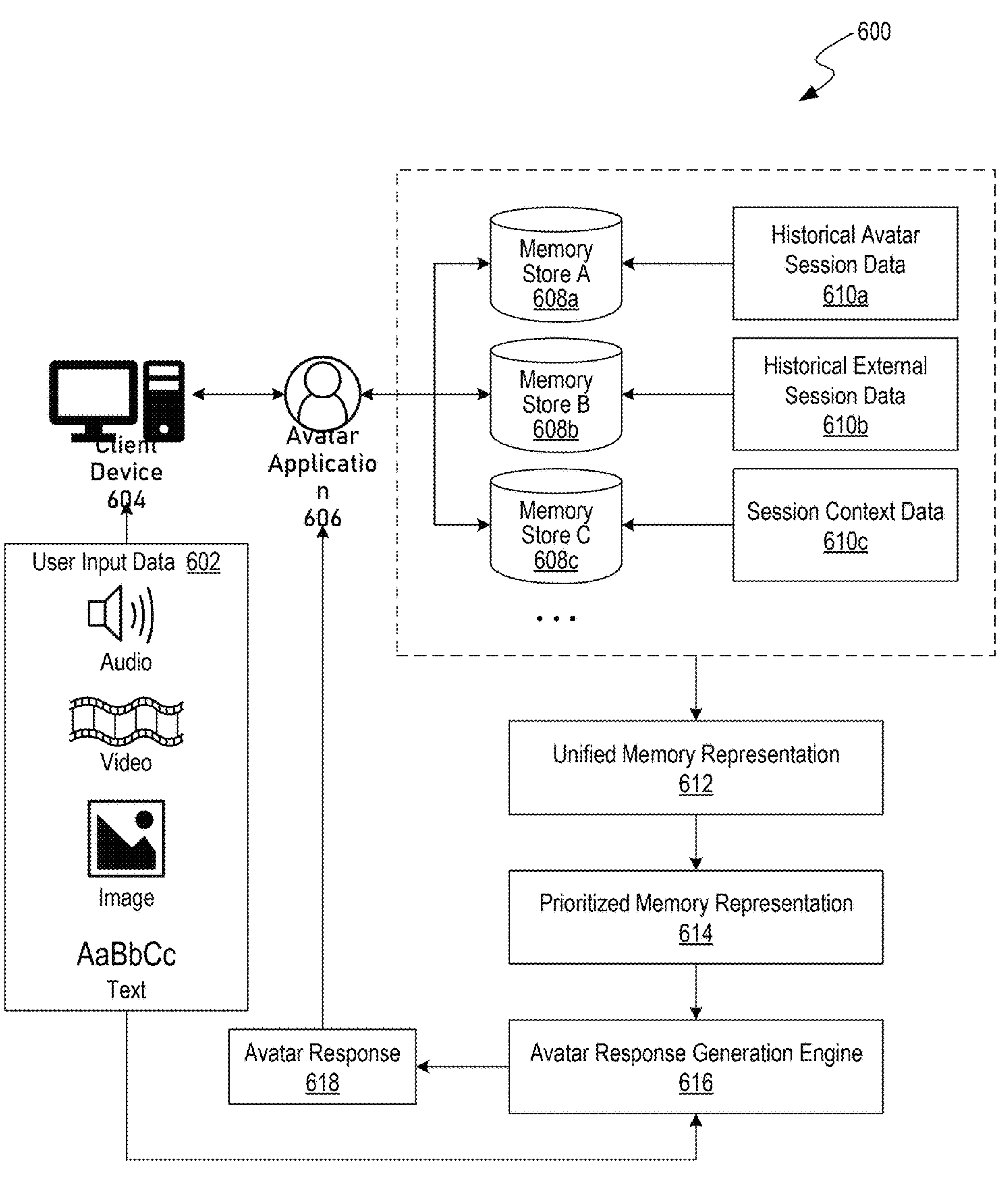
FIG. 6 shows a schematic illustrating an example environment of an architecture implemented by an avatar management platform to synchronize memory from multiple sources, in accordance with some implementations of the present technology.

FIG. 6 shows a schematic illustrating an example environment 600 of an architecture implemented by an avatar management platform to synchronize memory from multiple sources, in accordance with some implementations of the present technology. The environment 600 can be implemented using components of example computer system 00 illustrated and described in more detail with reference to FIG. 16. Likewise, implementations of example environment 600 can include different and/or additional components or can be connected in different ways.

The avatar management platform is enabled to receive (e.g., obtain, access) user input data 602 via a client device 604 communicatively connected to an avatar application 606. The user input data 602 refers to information captured from a user during a communication session with an AI avatar (such as the user input data 102 in FIG. 1). The user input data 602 can include audio data captured through a microphone of the client device 604 that records spoken utterances from the user. In some implementations, the user input data 602 includes video or image data captured via a camera of the client device 604 (or otherwise uploads the video or image data) that records facial expressions or other gestures from the user. In some implementations, the user input data 602 includes text data entered through a keyboard or touchscreen interface of the client device 604.

The client device 604 (such as the client device 104 in FIG. 1) refers to a computing device having at least one processor that executes machine-readable instructions and at least one memory module that stores data and instructions for access by the processor. The avatar application 606 (such as the avatar application 106 in FIG. 1) refers to a software application executing on the client device 604 that renders or otherwise presents an AI avatar interface structured to present audiovisual signals in response to natural language inputs received from the user.

The avatar application 606 can be communicatively connected with multiple memory data structures such as memory stores 608 (e.g., a first memory store 608*a*, a second memory store 608*b*, a third memory store 608*c*). A memory store 608 refers to a data repository that maintains records of interaction history and/or other contextual information accessible by the avatar management platform during communication sessions. Each memory store 608 can organize respective data into structured formats with defined schemas that specify the data types and field names for each record. The memory stores 608 can be implemented as relational databases that organize data into tables where each table contains rows representing individual records and columns representing data fields within those records. Thus, the relational database enforces referential integrity constraints that define relationships between tables, such as a foreign key constraint that links a record in a session table to a corresponding record in a user table. In some implementations, the memory stores 608 are implemented as document databases that store records as self-contained documents. For example, each document includes key-value pairs that define the fields and values for a single record, and the document database indexes specified fields to enable retrieval of documents matching query predicates.

The avatar application 606 can establish connections to the memory stores 608 by transmitting a connection request through a network interface. Each connection request can include authentication credentials such as an access token that encodes the identity of the requesting application and the permissions granted to that application. The memory store 608 can validate the access token by verifying a cryptographic signature or other authentication credential appended to the token and validating that the permissions encoded in the token authorize the requested operation.

Each memory store 608 can represent and store different data 610 (e.g., historical avatar session data 610*a*, historical external session data 610*b*, session context data 610*c*). For example, the first memory store 608*a* stores historical avatar session data 610*a*, the second memory store 608*b* stores historical external session data 610*b*, and the third memory store 608*c* stores session context data 610*c*. The separation of data 610 across distinct memory stores 608 enables the avatar management platform to apply different access controls to each category of data 610. For example, the avatar management platform can restrict access to the second memory store 608*b* to authorized personnel who are permitted to view records from external engagements, and grant broader access to the third memory store 608*c* for session context data 610*c* that is used during active communication sessions.

The separation further enables the avatar management platform to apply different retention policies to each category of data 610. For example, the avatar management platform can retain historical avatar session data 610*a* in the first memory store 608*a* for an extended duration (e.g., multiple years) to enable long-term personalization, and clear session context data 610*c* from the third memory store 608*c* after a shorter duration (e.g., 24 hours following session termination) to reduce storage consumption. In some implementations, the memory stores 608 are co-located within a single database instance but partitioned into separate logical containers that isolate each category of data 610 while sharing underlying storage infrastructure. The logical containers can be implemented as separate schemas or namespaces within the database instance, where each schema defines the table structures and access permissions for its contained data.

Historical avatar session data 610*a* refers to records generated by an AI avatar during prior communication sessions with a user. The historical avatar session data 610*a* includes prior user inputs submitted by the user during those sessions. Each user input can be stored as a record containing a text field that holds the content of the input (or a reference to an audio, image, or video file if the input was non-textual) and/or one or more metadata fields that indicate, for example, the timestamp identifying when the input was received and/or a session identifier that associates the input with a particular communication session. The session identifier refers to a unique value assigned when the communication session is initiated and can be used to group all records belonging to that session. Each avatar response can be stored as a record containing a field that indicates the generated response content and/or metadata fields that indicate the timestamp identifying when the response was generated and/or a reference to the user input record that prompted the response.

In some implementations, the historical avatar session data 610*a* includes derived information extracted from the prior communication sessions. The derived information can include topic labels assigned to each session, where a topic label refers to a value or a categorical value (e.g., "account inquiry" or "product information") determined by a classification model, rule-based system, and so forth. The determined information can include user preference indicators inferred from patterns of user behavior across multiple sessions, where a user preference indicator can be represented as a key-value pair that captures a characteristic of how the user prefers to interact with the AI avatar (e.g., brief interactions).

Historical external session data 610*b* refers to records generated by an external source during engagements with the user that occurred independently of the AI avatar. The external source can include a representative who interacts directly with the user through meetings such as in-person meetings or telephone conversations. The representative documents observations from those interactions and causes storage of the observations as records in the second memory store 608*b*. Each record can include, for example, a notes field that includes free-form text describing topics discussed with the user, structured fields that indicate categorical values indicating the type of engagement (e.g., "in-person meeting" or "telephone call"), the date on which the engagement occurred, and so forth. In some implementations, the external source can include an automated system that captures interaction data from channels other than the avatar application 606. For example, an email processing system can capture information from email correspondence between the user and organizational representatives and store the captured information as records in the second memory store 608*b*.

Session context data 610*c* refers to records captured during a current communication session. The session context data 610*c* includes user input data received from the user since the communication session was initiated. Each user input can be stored in a sequence data structure that preserves the order in which inputs were received, where the sequence data structure can be implemented as an ordered list or array that appends each new input to the end of the list. The session context data 610*c* includes avatar response data generated by the AI avatar since the communication session was initiated. Each avatar response can be stored in association with the user input that prompted the response by including a reference field in the avatar response record that contains the identifier of the corresponding user input record.

The session context data 610*c* can include state information that tracks the current status of the communication session. The state information refers to a current topic field that holds a label indicating the subject matter currently being discussed, where the label can be updated each time the avatar management platform detects a topic change. The state information can include, for example, a pending questions list that defines references to user inputs that have been identified as questions but have not yet been fully addressed by the AI avatar, where each reference is removed from the list when the avatar management platform determines that a subsequent avatar response has addressed the corresponding question. In some implementations, the third memory store

608*c* clears the session context data 610*c* after the communication session terminates by deallocating the memory regions used to store the session data. In some implementations, the third memory store 608*c* archives the session context data 610*c* to persistent storage before clearing by writing the session data to the first memory store 608*a* as a new historical avatar session record.

In some implementations, the avatar management platform uses a single unified memory store rather than separate memory stores 608 for each category of data 610. The unified memory store maintains all records in a common storage structure implemented as a single database or data lake. Each record in the unified memory store can include a source tag field that contains a categorical value indicating whether the record originated from historical avatar sessions or historical external sessions or the current session context. Each record can include a category tag field that contains a categorical value indicating the type of information contained in the record (e.g., user input, avatar response, user preference). The avatar management platform can filter records by source tag and category tag when retrieving data for a specific purpose.

In some implementations, the avatar management platform uses a hierarchical memory architecture in which the third memory store 608*c* operates as a cache layer positioned between the avatar application 606 and the first memory store 608*a* and the second memory store 608*b*. The cache layer stores copies of records from the first memory store 608*a* and the second memory store 608*b* that have been accessed during the current communication session or that are predicted to be relevant. The cache layer can be implemented using an in-memory data store that provides lower access latency than the underlying persistent memory stores 608. When the avatar management platform retrieves a record, the avatar management platform can first query the cache layer. If the cache layer contains the requested record (a cache hit), the avatar management platform retrieves the record from the cache layer without querying the underlying memory stores 608. If the cache layer does not contain the requested record (a cache miss), the avatar management platform queries the underlying memory store 608 and stores a copy of the retrieved record in the cache layer for potential future access.

The avatar management platform can aggregate or otherwise unify data 610 from one or more memory stores 608 to generate a unified memory representation 612. The avatar management platform can generate a vector embedding for each record in the data 610 using an embedding model. A vector embedding refers to a numerical representation of a record encoded as a fixed-length array of floating-point values. The array encodes the semantic meaning of the record such that records with similar meaning are represented by arrays with similar numerical values. The embedding model refers to a neural network that has been trained to produce vector embeddings that capture semantic relationships between words and phrases. The embedding model receives an input (e.g., the content of a user input record or an avatar response record) and processes the input through multiple layers of the neural network. Each layer applies a transformation to the data received from the preceding layer, where the transformation is defined by parameter weights learned during training. The final layer outputs the vector embedding as the numerical representation of the input.

The avatar management platform can index the vector embeddings into a common vector space accessible by the artificial intelligence avatar. The common vector space can be implemented as a vector index data structure that stores vector embeddings by organizing vector embeddings using spatial partitioning operations (e.g., hierarchical navigable small world graphs or inverted file indexes) to enable the avatar management platform to identify vector embeddings located near a query vector without comparing the query vector against every stored embedding. The indexing operation inserts each vector embedding into the vector index data structure and/or with a reference to the source record from which the embedding was generated. The reference enables the avatar management platform to retrieve the full record content after identifying one or more embeddings through similarity search. The unified memory representation 612 refers to the populated vector index data structure that includes the indexed vector embeddings generated from records across the memory stores 608.

In some implementations, the avatar management platform aggregates data 610 from one or more memory stores 608 to generate a unified memory representation 612 using different approaches that do not rely on vector embeddings. For example, the avatar management platform aggregates the data 610 by concatenating records from each memory store 608 into a single data structure that preserves the source identifier and timestamp associated with each record. The concatenated data structure organizes records in chronological order based on timestamps, which enables the avatar management platform to traverse the unified memory representation 612 sequentially when retrieving context for response generation.

In some implementations, the avatar management platform aggregates the data 610 by constructing a knowledge graph that represents entities mentioned in the records as nodes and relationships between entities as edges. Each node in the knowledge graph corresponds to a person or object or concept referenced in one or more records, and each edge represents a relationship (e.g., "discussed with" or "expressed preference for" or "inquired about") that connects two entities. The knowledge graph enables the avatar management platform to retrieve context by traversing edges from entities mentioned in the current user input to related entities and their associated records.

The avatar management platform can aggregate the data 610 by indexing records using keyword-based indexing techniques that map terms appearing in the records to the records containing those terms. The keyword-based index enables the avatar management platform to retrieve records that contain specific terms mentioned in the user input. In some implementations, the avatar management platform can aggregate the data 610 by maintaining a structured summary representation that condenses information from multiple records into a compact format. The structured summary representation extracts information such as user preferences and topics from each record and organizes the extracted information into predefined categories, which enables the avatar management platform to retrieve relevant context by querying specific categories rather than searching across all stored records.

The avatar management platform can generate, using the unified memory representation 612, a prioritized memory representation 614. The avatar management platform can apply one or more weighting operations to portions of the unified memory representation 612 to generate the prioritized memory representation 614. Each portion of the unified memory representation 612 corresponds to a vector embedding and its associated source record. The weighting operations can assign a weight value to each portion based on a timestamp associated with that portion. The timestamp can be extracted from the metadata fields of the source record and indicate when the record was created or last modified. The weighting operations determine the weight value by evaluating a weighting function that uses the timestamp as input to produce a numerical weight as output. The weighting function assigns higher weight values to records associated with more recent timestamps relative to records associated with older timestamps. For example, the weighting function can determine the weight value as an inverse function of the elapsed time between the timestamp and the current time, such that a record created one hour ago receives a higher weight than a record created one week ago.

In some implementations, the weighting operations apply a decay function that reduces the weight value assigned to each record as a function of elapsed time from the timestamp associated with the record. The decay function can be implemented as an exponential decay function that multiplies an initial weight value by a decay factor raised to a power proportional to the elapsed time. A smaller decay factor causes weight values to decrease more rapidly, while a larger decay factor causes weight values to decrease more gradually. The prioritized memory representation 614 refers to the collection of vector embeddings and associated source records augmented with computed weight values that reflect both semantic relevance to the current query and temporal recency of each record.

An avatar response generation engine 616 can generate, using the prioritized memory representation 614 and/or the user input data 602, an avatar response 618. The avatar response generation engine 616 produces audiovisual outputs responsive to user inputs by applying one or more response generation operations (rule-based, AI model-based). The avatar response generation engine 616 can include rule-based components that match user inputs against predefined patterns stored in a pattern database. The pattern database stores mappings between input patterns and corresponding response templates. Each input pattern can be expressed as a regular expression or template structure that defines the syntactic form of user inputs that should trigger the associated response. Each response template can include static text interspersed with placeholder variables that are populated with values extracted from the matched user input. When the avatar response generation engine 616 receives user input data 602, the rule-based components can evaluate the user input against each input pattern in the pattern database. If the user input matches an input pattern, the rule-based components can extract values from the user input corresponding to capture groups defined in the pattern and substitute the extracted values into the placeholder variables of the associated response template to produce the generated response.

In some implementations, the avatar response generation engine 616 can include generative AI components that process input data through one or more neural network architectures to generate natural language responses. The neural network architectures can include transformer-based models that process input sequences through attention mechanisms. An attention mechanism determines weighted combinations of input representations where the weights indicate a degree of relevance of each input element to the current processing step. The transformer-based model receives the user input data 602 and context retrieved from the prioritized memory representation 614 as an input sequence of tokens. A token refers to a discrete unit of text (e.g., a word or subword or character) that serves as a basic element processed by the model. The model processes the input sequence through multiple transformer layers, where each layer applies self-attention operations that enable each token representation to incorporate information from other tokens in the sequence. The final layer outputs probability distributions over the vocabulary for each position in the output sequence, and the model generates the response by selecting tokens according to the probability distributions.

In some implementations, the avatar response generation engine 616 includes a combination of rule-based components and generative AI components. For example, the avatar response generation engine 616 evaluates the user input data 602 against the pattern database using the rule-based components. If the user input matches a pattern with high confidence (e.g., the pattern match score exceeds a threshold value), the avatar response generation engine 616 generates the response using the matched response template. If the user input does not match any pattern with high confidence, the avatar response generation engine 616 generates the response using the generative AI components.

The avatar response generation engine 616 can invoke a plurality of agents (such as the agents 110 in FIG. 1) to retrieve data from backend systems and data repositories. Each agent is a software module that executes autonomously to perform a specific retrieval task. Each agent executes a command set to retrieve data from a respective data source. A command set refers to a collection of programmatic instructions that specify how to construct a query for a particular data source and how to parse the response returned by the data source. The command set can include connection parameters that specify the network address and authentication credentials used to access the data source. The command set can include a query template that defines the structure of queries supported by the data source, where the query template identifies placeholder variables that are populated with values extracted from the user input or the session context.

In some implementations, the command set identifies how to extract relevant fields from the data structure returned by the data source. Each agent can be trained on a domain-specific knowledge base that enables the agent to recognize when user inputs require information from its associated data source. A knowledge base refers to a structured collection of information organized around a particular subject area. A knowledge base can include, for example, example user inputs that have been labeled with intent categories indicating the type of information requested. The agent learns associations between linguistic patterns in user inputs and intent categories by processing the labeled examples through a classification model during a training phase. During operation, the agent evaluates incoming user inputs against the learned associations to determine whether the user input falls within the agent's domain of expertise.

The agents can execute their command sets in response to invocation signals from the avatar response generation engine 616. An invocation signal refers to a message transmitted from the avatar response generation engine 616 to an agent that includes the user input data 602 and any extracted parameters used to populate the query templates in the agent's command set. The agent receives the invocation signal and constructs a query by substituting the extracted parameters into the query template. The agent transmits the constructed query to its associated data source and receives a response containing the requested data. The agent parses the response according to the response parsing instructions in its command set and returns the parsed data to the avatar response generation engine 616. The avatar response generation engine 616 aggregates the data retrieved by the plurality of agents into a context payload. The context payload can combine information from multiple agents into a format configured to operate as input to one or more generative AI components of the avatar management platform. The generative AI components can receive the context payload as part of the input sequence along with the user input data 602 and one or more records from the prioritized memory representation 614.

The avatar response 618 can be transmitted back to the avatar application 606 for presentation to the user during the communication session. The avatar response 618 can include an audio signal containing synthesized speech generated by converting the text of the generated response into audio waveforms. The conversion can be performed by a text-to-speech model configured to determine phonetic representations of each word and prosodic features (e.g., pitch contours and timing patterns) that control how the words are spoken, and generate audio samples that encode the synthesized speech as a digital audio waveform. The avatar response 618 can include a video signal containing animated visual representations of the AI avatar. The visual representations can include lip movements synchronized to the phonetic content of the audio signal, where each phoneme in the synthesized speech is mapped to a corresponding mouth shape that is rendered in the video frames coinciding with that phoneme. The visual representations can include expressions synchronized to the sentiment of the response content by assigning the response content to one or more categorical labels (e.g., "positive" or "neutral" or "concerned") that are mapped to corresponding expression configurations. The visual representations can include gestures synchronized to emphasis points in the response by identifying stressed syllables and/or phrase boundaries that trigger corresponding gesture animations.

The avatar response 618 can be transmitted from the second infrastructure layer 116 (as described in FIG. 1) to the first infrastructure layer 108 through a gateway engine (such as the gateway engine 232 in FIGS. 2A and 2B). The gateway engine validates the avatar response 618 against guidelines by evaluating the response text and audiovisual content against a set of validation rules that detect prohibited content patterns. If the avatar response 618 satisfies the validation rules, the gateway engine forwards the avatar response 618 to the first infrastructure layer 108. The first infrastructure layer 108 can transmit the avatar response 618 to the avatar application 606 through the established connection. The avatar application 606 can present the audio signal, the video signal, and/or other components of the avatar response 618.

Figure 7:
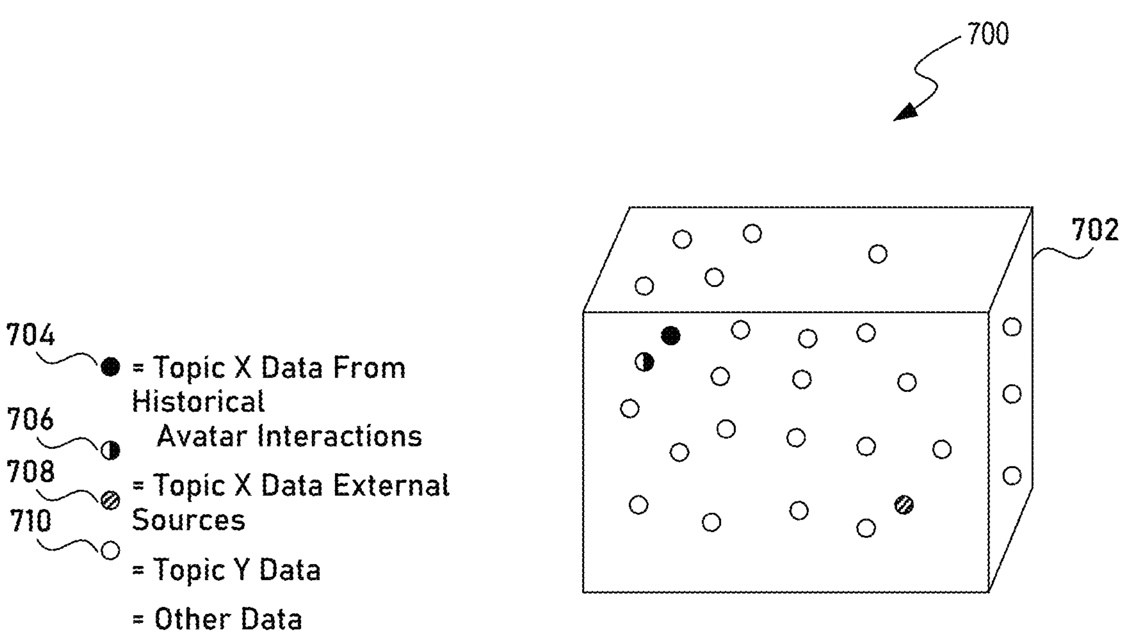
FIG. 7 shows an illustration of an example environment of a latent space used by an avatar management platform to synchronize memory from multiple sources, in accordance with some implementations of the present technology.

FIG. 7 shows an illustration of an example environment 700 of a latent space 702 used by an avatar management platform to synchronize memory from multiple sources, in accordance with some implementations of the present technology. The environment 700 can be implemented using components of example computer system 1600 illustrated and described in more detail with reference to FIG. 16. Likewise, implementations of example environment 700 can include different and/or additional components or can be connected in different ways.

The latent space 702 can be used to represent memory from different sources. The latent space 702 refers to a multi-dimensional vector space in which semantically related data is mapped to proximate positions such that records with similar meaning are represented by vectors that are closer together than records with dissimilar meaning. The latent space 702 can be constructed by defining a coordinate system with a fixed number of dimensions, where each dimension corresponds to a learned feature that captures some aspect of semantic meaning. Each record from the memory stores 608 (as described in FIG. 6) can be transformed into a point in the latent space 702 by generating a vector embedding that assigns a numerical value to each dimension. The numerical values can be determined by an embedding model (as described in FIG. 6) that processes the content of the record through a neural network trained to position semantically similar content at nearby coordinates. The latent space 702 enables the avatar management platform to compare records from different memory sources using geometric distance or other similarity metrics rather than exact matching. For example, records that discuss similar concepts or address similar user needs are positioned in the same region of the latent space 702 even if the records use different vocabulary or phrasing to express those concepts.

In the environment 700, a first vector representation 704 can represent topic X data from historical avatar interactions. The first vector representation 704 refers to a numerical encoding of records generated by an AI avatar during prior communication sessions (such as the historical avatar session data 610*a* described in FIG. 6), where the records pertain to a particular subject matter (e.g., topic X). The first vector representation 704 can be computed by extracting the text content from a record in the historical avatar session data 610*a* and processing the text through the embedding model to produce a fixed-length array. Each floating-point value in the array corresponds to one dimension of the latent space 702 and encodes the degree to which the record exhibits the semantic feature associated with that dimension. The first vector representation 704 is then inserted into the latent space 702 at the coordinates specified by the floating-point values, along with a reference pointer that links the vector representation back to the source record in the first memory store 608*a*.

A second vector representation 706 can represent topic X data from external sources. The second vector representation 706 refers to a numerical encoding of records generated by an external source (such as the historical external session data 610*b* described in FIG. 6), where the records pertain to the same subject matter as the first vector representation 704 (e.g., topic X). The external source can include notes documented by a representative during direct engagements with a user that occurred independently of the AI avatar, and/or interaction logs captured by automated systems from communication channels other than the avatar application 606. The second vector representation 706 can be computed using the same embedding model and the same dimensional structure as the first vector representation 704, which ensures that records from different sources are mapped into a common coordinate system.

A third vector representation 708 can represent topic Y data. The third vector representation 708 refers to a numerical encoding of records pertaining to a different subject matter (e.g., topic Y) than the first vector representation 704 and the second vector representation 706. Topic Y represents a distinct category of information that addresses different user needs or discusses different concepts than topic X. The third vector representation 708 can be computed using the same embedding process as the first vector representation 704 and the second vector representation 706, but the resulting coordinates can differ because the semantic content of the underlying record differs.

A fourth vector representation 710 can represent other data. The fourth vector representation 710 refers to a numerical encoding of records pertaining to subject matter distinct from both topic X and topic Y. The fourth vector representation 710 can represent records that address miscellaneous user needs or contain general information that does not fall within the defined topic categories.

Since both the first vector representation 704 and the second vector representation 706 are related to topic X, the first vector representation 704 and the second vector representation 706 are positioned closer to each other in the latent space 702 than to the third vector representation 708 because the third vector representation 708 is directed to topic Y. When the embedding model processes a record about topic X from the historical avatar session data 610*a* and a record about topic X from the historical external session data 610*b*, the model identifies shared semantic features (such as references to the same concepts or use of related terminology) and assigns similar values to the dimensions that encode those features. The resulting vector representations occupy nearby positions in the latent space 702 because their coordinate values are similar across one or more dimensions. In contrast, the third vector representation 708 occupies a more distant position because the underlying record discusses topic Y, which is associated with different concepts and terminology that activate different dimensions of the latent space 702.

The avatar management platform can perform a similarity search within the latent space 702 by generating a query vector from user input data and identifying vector representations that satisfy a similarity threshold relative to the query vector. The query vector can be computed by processing the user input data 602 (as described in FIG. 6) through the same embedding model used to generate the stored vector representations. The similarity search determines a distance metric between the query vector and each stored vector representation in the latent space 702. The distance metric quantifies how far apart two vectors are positioned in the multi-dimensional space. For example, a distance metric such as cosine similarity produces a value between negative one and positive one, where values closer to positive one indicate that the vectors point in similar directions (and thus represent semantically similar content) and values closer to negative one indicate that the vectors point in opposite directions (and thus represent semantically dissimilar content). The avatar management platform identifies vector representations that satisfy the similarity threshold by comparing the computed distance metric against a predefined threshold value (e.g., a cosine similarity of 0.8 or higher). Vector representations with distance metrics that exceed the threshold can be considered semantically relevant to the user input and can be retrieved for inclusion in the context provided to the avatar response generation engine 616 (as described in FIG. 6).

The similarity search enables the avatar management platform to retrieve records from different memory sources (such as the historical avatar session data 610*a* and the historical external session data 610*b*) that are semantically related to the user input data regardless of the originating source of those records. In some implementations, the avatar management platform applies a re-ranking operation to the vector representations identified by the similarity search. The re-ranking operation adjusts the ordering of retrieved vector representations based on additional factors beyond semantic similarity. For example, the re-ranking operation can incorporate the weight values from the prioritized memory representation 614 (as described in FIG. 6) to promote more recent records over older records that have similar semantic relevance. The re-ranking operation can incorporate source preference factors that promote records from certain memory sources (such as the session context data 610*c*) over records from other memory sources when the user input indicates a need for information about the current conversation.

In some implementations, the avatar management platform performs an approximate nearest neighbor search to reduce computational overhead when the latent space 702 contains a large number of vector representations. The approximate nearest neighbor search uses indexing structures (such as hierarchical partitions of the vector space) to identify candidate vector representations that are likely to be among the most similar to the query vector without computing exact distances to every stored vector. The approximate nearest neighbor search enables the avatar management platform to maintain low response latency even as the volume of stored records grows.

Figure 8:
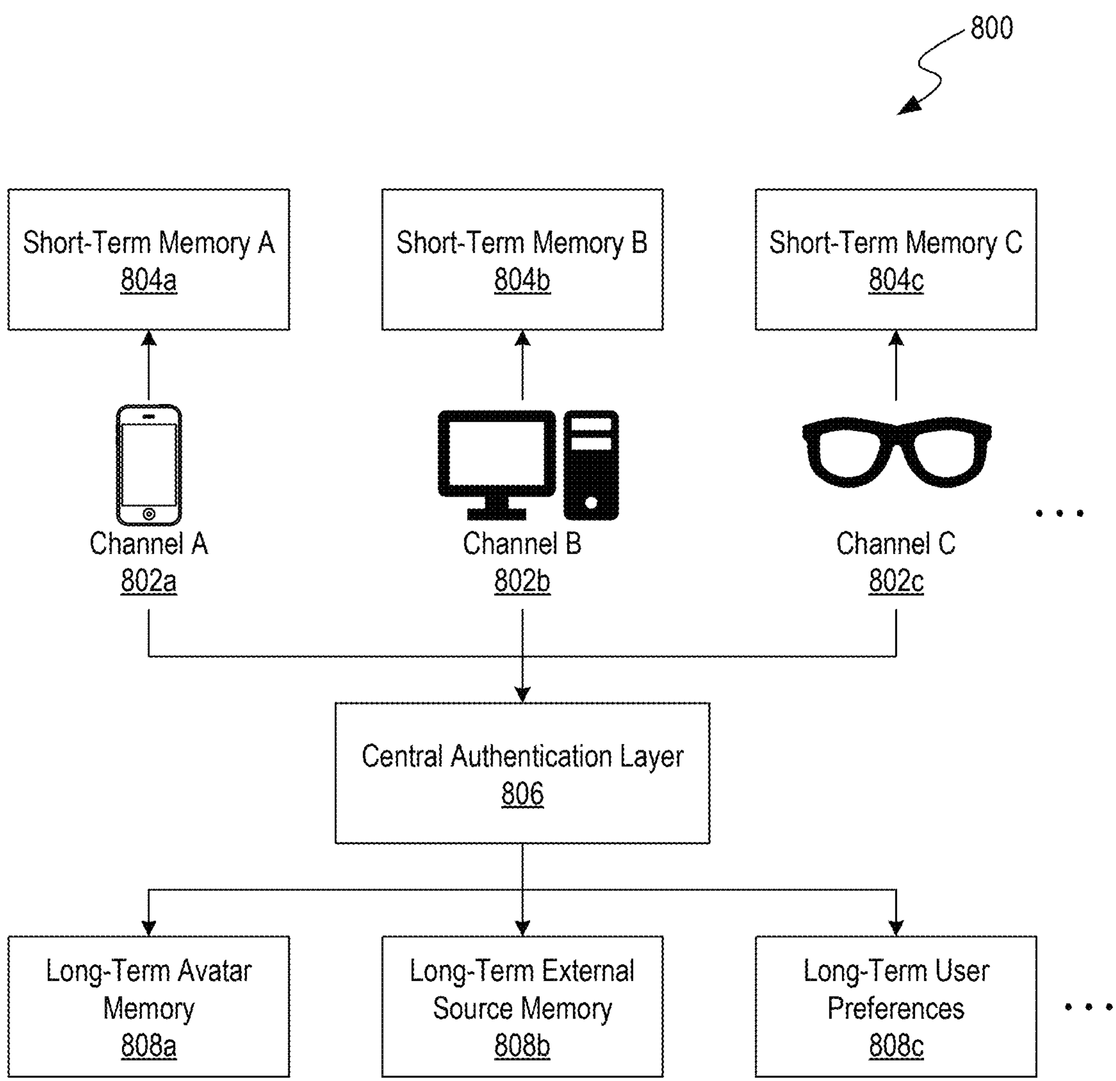
FIG. 8 shows a schematic illustrating an example environment of synchronizing memory across multiple channels using an avatar management platform, in accordance with some implementations of the present technology.

FIG. 8 shows a schematic illustrating an example environment 800 of synchronizing memory across multiple channels using an avatar management platform, in accordance with some implementations of the present technology. The environment 800 can be implemented using components of example computer system 1600 illustrated and described in more detail with reference to FIG. 16. Likewise, implementations of example environment 800 can include different and/or additional components or can be connected in different ways.

Multiple channels 802 such as a first channel 802*a*, a second channel 802*b*, and a third channel 802*c* can each be associated with its respective short-term memory 804 such as a first short-term memory 804*a*, a second short-term memory 804*b*, and a third short-term memory 804*c*, respectively. A channel 802 refers to a communication pathway through which user interaction requests are transmitted from client applications to the avatar management platform, where each channel 802 represents a different mode of user interaction. Each channel 802 can operate independently in terms of capturing user inputs and presenting avatar responses, but all channels 802 can connect to the same avatar management platform backend to ensure consistent behavior and access to shared memory resources regardless of which channel 802 the user employs.

A short-term memory 804 refers to a session-specific data store that maintains conversational state information for a current communication session. The conversational state information includes dialogue context that tracks the flow of conversation between the user and the AI avatar. The dialogue context can be represented as an ordered sequence of conversational turns, where each turn contains a user input paired with the corresponding avatar response. The dialogue context enables the avatar management platform to generate responses that account for what has been discussed earlier in the conversation without requiring the user to repeat information. The conversational state information includes temporary user preferences expressed during the session. A temporary user preference is a setting or characteristic that the user indicates during the current conversation but that has not been established as a persistent preference. For example, if the user requests brief responses during a particular session, the avatar management platform stores this preference in the short-term memory 804 and applies it to subsequent responses within that session without modifying the user's long-term preference settings.

The conversational state information can include transient data references made within recent conversational turns. A transient data reference is a pointer to a specific piece of information (such as an account number or transaction identifier or document name) that the user mentioned during the conversation and that can be relevant to subsequent queries within the same session. The short-term memory 804 stores transient data references in an associative data structure that maps reference identifiers to the corresponding data values to enable the avatar management platform to resolve references in subsequent user inputs without requiring the user to repeat the full information. Each short-term memory 804 can be local to its respective channel 802, meaning that the short-term memory 804 is stored on computing resources associated with that channel 802 rather than in a centralized location. The local storage provides low-latency access to session state during active conversations because the data does not need to traverse network connections to reach a remote storage system. When the communication session terminates (either through explicit user action or through timeout after a period of inactivity), the short-term memory 804 can be cleared by deallocating the storage resources used to maintain the session state. In some implementations, the avatar management platform archives selected portions of the short-term memory 804 to long-term storage before clearing, such as archiving the dialogue context to the long-term avatar memory 808*a* (described below) to preserve a record of the conversation for future reference.

To access long-term memory, the channels 802 can use a central authentication layer 806 to authenticate a user associated with a requesting channel 802. The central authentication layer 806 refers to a security service that validates authentication credentials submitted by a channel 802 before permitting access to shared memory resources. The authentication credentials can include an authentication token that encodes the identity of the user and the permissions granted to that user. The authentication token is generated when the user successfully completes a login process by providing valid credentials (such as a username and password or a biometric identifier) to an identity provider. The identity provider verifies the provided credentials against stored user records and issues the authentication token upon successful verification. The authentication token can include a payload section that contains claims about the user's identity (such as a unique user identifier and the user's name) and/or a signature section that contains a cryptographic signature using a secret key known to the identity provider. The central authentication layer 806 can validate the authentication token by verifying the cryptographic signature using the corresponding public key and checking that the token has not expired based on a timestamp encoded in the payload.

Once the authentication credentials satisfy validation requirements of the central authentication layer 806, the channels 802 can access shared long-term memories 808. The shared long-term memories 808 can include long-term avatar memory 808*a* that contains records generated by the AI avatar during prior communication sessions with a user. The long-term avatar memory 808*a* can store the same or similar types of records as the historical avatar session data 610*a* described in FIG. 6. The long-term avatar memory 808*a* differs from the short-term memory 804 in that the long-term avatar memory 808*a* persists across multiple communication sessions and is accessible from any authenticated channel 802 rather than being local to a single channel. The shared long-term memories 808 can include long-term external source memory 808*b* that contains records generated by an external source during engagements with the user that occurred independently of the AI avatar. The long-term external source memory 808*b* can store the same types of records as the historical external session data 610*b* described in FIG. 6. The avatar management platform can assimilate records from the long-term external source memory 808*b* as prior interaction experience of the AI avatar, enabling the AI avatar to reference information from external engagements when generating responses. The shared long-term memories 808 can include long-term user preferences 808*c* containing established user preferences.

The shared long-term memories 808 can be stored in a distributed database accessible by any authenticated channel 802. The distributed database replicates data across multiple storage nodes located in different geographic regions to ensure that data remains available even if individual storage nodes fail. The distributed storage enables the avatar management platform to maintain conversational continuity when a user transitions from one channel 802 to another channel 802 during or between communication sessions. In some implementations, the avatar management platform synchronizes selected portions of the short-term memory 804 to the shared long-term memories 808 during an active communication session to enable channel transitions. The synchronization can be performed by periodically writing the current dialogue context from the short-term memory 804 to a temporary storage location in the distributed database that is accessible from other channels 802. If the user transitions to a different channel 802 during the session, the new channel 802 can retrieve the synchronized dialogue context from the temporary storage location and load it into its local short-term memory 804 to continue the conversation without interruption.

Figure 9:
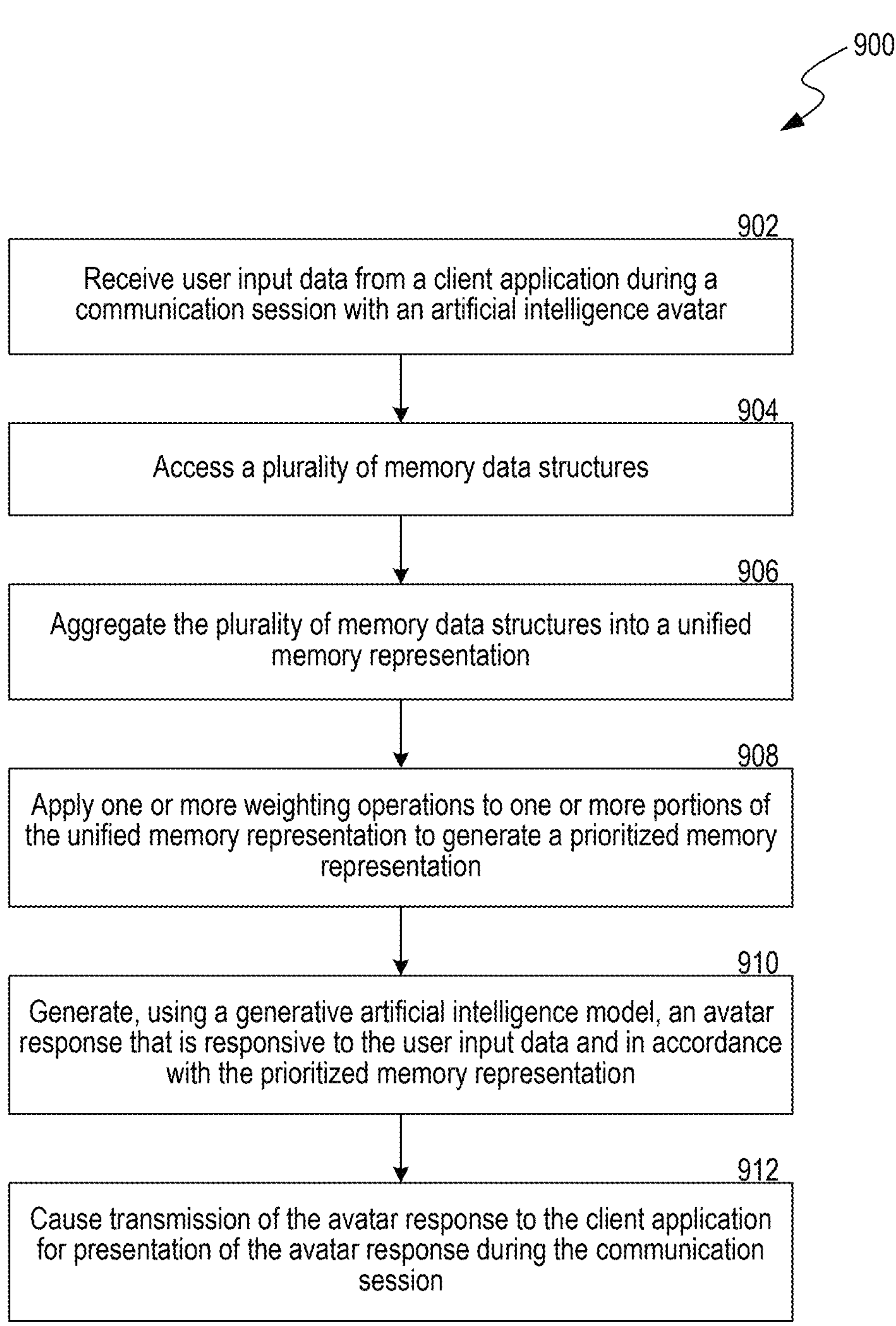
FIG. 9 is a flow diagram illustrating an example process of generating avatar responses using memory from multiple sources, in accordance with some implementations of the present technology.

FIG. 9 is a flow diagram illustrating an example process 900 of generating avatar responses using memory from multiple sources, in accordance with some implementations of the present technology. In some implementations, the process 900 is performed by a computer system, e.g., example computer system 1600 illustrated and described in more detail with reference to FIG. 16. Implementations can include different and/or additional operations or can perform the operations in different orders.

In operation 902, the avatar management platform can receive or otherwise obtain user input data (such as the user input data 602 described in FIG. 6) from a client or otherwise computer-implemented application during a communication session with an AI avatar. The AI avatar can be structured to present an audiovisual signal responsive to an input received by the client application. In some implementations, the audiovisual signal includes a video stream depicting the AI avatar performing one or more of a facial expression or a gesture corresponding to the audio signal.

In operation 904, the avatar management platform can access a plurality of memory data structures. The plurality of memory data structures can represent a long-term interaction history, a short-term interaction history, and so forth. For example, the plurality of memory data structures includes a first memory data structure representing a first record set generated by the AI avatar during a first historical communication session set with a user associated with the client application (such as the historical avatar session data 610*a* described in FIG. 6), a second memory data structure representing a second record set generated by an external source during a second historical communication session set with the user associated with the client application (such as the historical external session data 610*b* described in FIG. 6), a third memory data structure representing session context data captured during the communication session (such as the session context data 610*c* described in FIG. 6), and so forth. The session context data represents one or more of historical user input data or a historical avatar response generated during the communication session.

In operation 906, the avatar management platform can aggregate or cause aggregation of the first memory data structure, the second memory data structure, and the third memory data structure into a unified memory representation by indexing a vector representation of each record in the first record set, a vector representation of each record in the second record set, and a vector representation of the session context data into a common vector space (such as the latent space 702 described in FIG. 7) accessible by the AI avatar. To aggregate the memory, the avatar management platform can generate the vector representation of each record in the first record set, the second record set, and the session context data using an embedding model. The avatar management platform can store each vector representation in the latent space.

In operation 908, the avatar management platform can apply or cause application of one or more weighting operations to one or more portions of the unified memory representation to generate a prioritized memory representation. The one or more weighting operations can assign a weight value to each portion of the unified memory representation relative to a timestamp associated with the portion of the unified memory representation. In some implementations, the weighting operation can be a temporal decay function. The avatar management platform can apply a decay parameter to the one or more weighting operations. The decay parameter can reduce the weight value assigned to each portion of the unified memory representation relative to an increase in elapsed time from the timestamp associated with the portion of the unified memory representation. The decay parameter can be configured based on the characteristics of the application domain. For example, in domains where user preferences change frequently, a smaller decay parameter may be appropriate to prioritize recent interactions. In domains where historical context remains relevant over extended periods, a larger decay parameter may be appropriate to preserve the influence of older records.

In some implementations, the avatar management platform identifies a score for each portion of the unified memory representation using a comparison between the portion of the unified memory representation and the input data. The avatar management platform can aggregate the score with the weight value to generate a composite ranking for each portion of the prioritized memory representation. The aggregation can be performed by computing a weighted sum of the relevance score and the weight value, where the relative weights of the two components are configured based on the desired balance between recency and relevance.

In operation 910, the avatar management platform can generate or cause generation of, using a generative AI model (such as the generative AI components described in FIG. 6), an avatar response that is responsive to the user input data and in accordance with the prioritized memory representation. The avatar response can include an audio signal and/or a video signal. In some implementations, the video signal depicts the AI avatar performing a sign language gesture corresponding to content of the audio signal. The avatar can reference memory from other sources as its own. For example, the avatar includes, in the avatar response, an indication of the second record set. The indication of the second record set can be represented as a prior interaction experience with a user. The avatar management platform can apply one or more guardrail operations to the avatar response prior to transmission of the avatar response. The one or more guardrail operations can evaluate at least one of the audio signal or the video signal against one or more guidelines.

The avatar management platform can transform the user input into a query vector in order to select relevant memory portions. For example, the avatar management platform receives a query vector derived from the input data. The avatar management platform compares the query vector with the vector representation of each record in the first record set, the vector representation of each record in the second record set, and the vector representation of the session context data. The avatar management platform retrieves one or more records from the unified memory representation using the comparison.

In some implementations, agents (semi-autonomous, autonomous) are used to retrieve data sources used to generate the avatar response. An agent is a software module that executes autonomously to perform a specific retrieval task (such as the agents 110 described in FIG. 1). For example, the avatar management platform invokes a plurality of agents to retrieve source data from a plurality of data sources. Each agent of the plurality of agents can execute a command set associated with a respective data source. The avatar management platform can aggregate the source data retrieved by the plurality of agents into an overall source data. The avatar management platform can input the overall source data and the input data to the generative AI model to generate the avatar response.

The avatar management platform can select relevant portions of the unified memory representation based on how relevant the portions are to the user. For example, the avatar management platform can generate a similarity score between the vector representation of the user input data and each vector representation indexed in the common vector space, and select one or more portions of the unified memory representation based on the similarity score satisfying a threshold value.

In operation 912, the avatar management platform can cause transmission of the avatar response to the client application for presentation of the avatar response during the communication session. Memory can be used to determine what audiovisual parameters are used to present the avatar response. The avatar management platform can determine one or more audiovisual presentation parameters based on the prioritized memory representation. The one or more audiovisual presentation parameters can define at least one of a vocal characteristic of the audio signal or a visual characteristic of the video signal. In some implementations, the visual characteristic includes a facial expression parameter, a gesture parameter, and/or a body language parameter synchronized with the audio signal.

In some implementations, the memory is stored in a centralized storage. In other implementations, one or more of the first memory data structure, the second memory data structure, or the third memory data structure are stored in a distributed database accessible across a plurality of interaction channels. The avatar management platform can detect a channel transition from a first interaction channel within the plurality of interaction channels to a second interaction channel within the plurality of interaction channels during the communication session. In response, the avatar management platform can cause retrieval of, via the second interaction channel, one or more of the first memory data structure, the second memory data structure, or the third memory data structure from the distributed database.

The avatar management platform can update the session context data as the conversation progresses. For example, the avatar management platform updates the third memory data structure by appending a first record representing the user input data and a second record representing the avatar response. The avatar management platform can store the updated third memory data structure in a database accessible by the AI avatar.

Example Implementations of the Avatar Access Gateway

Figure 10:
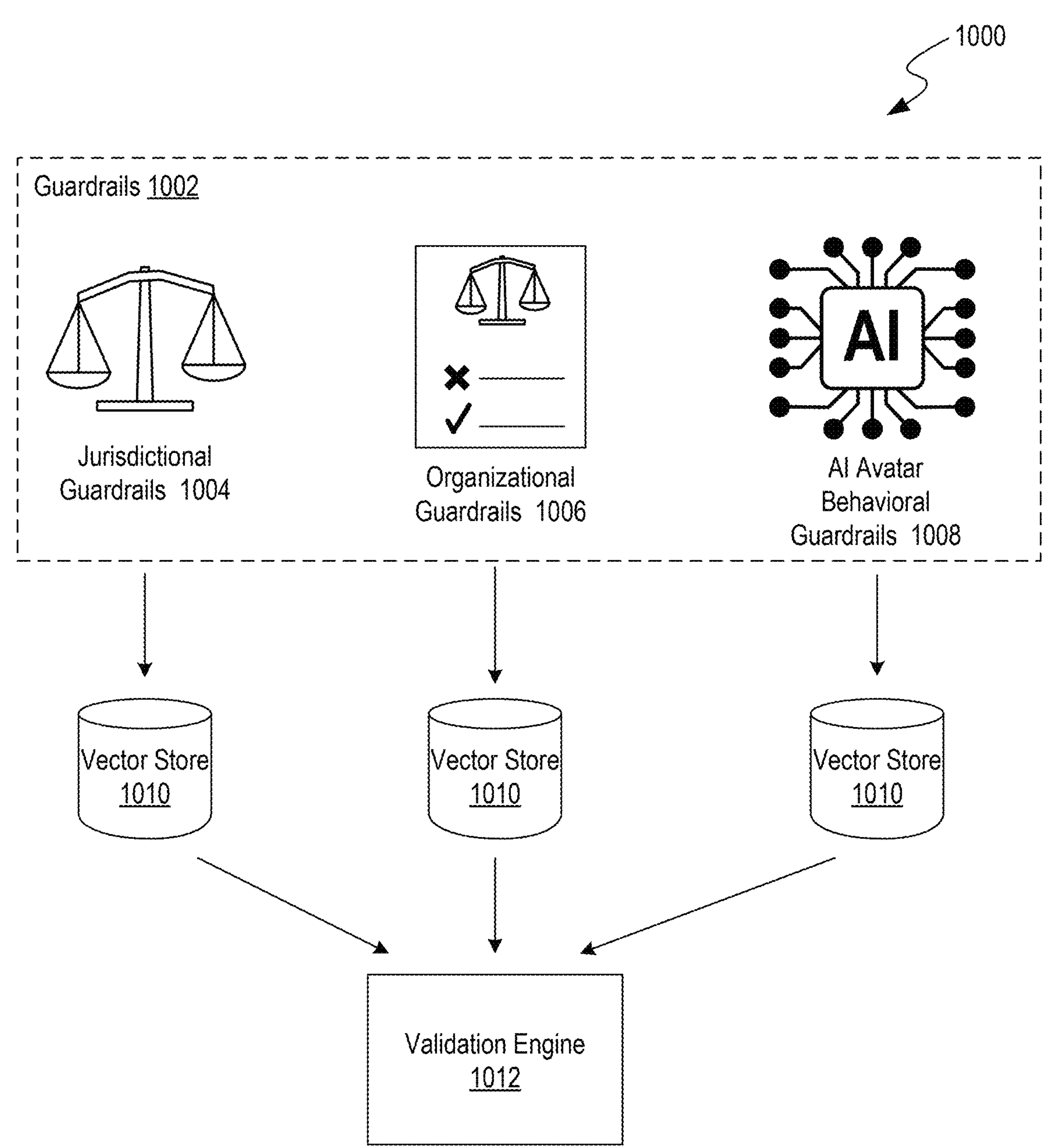
FIG. 10 is a block diagram illustrating an example environment for using guardrails input into a validation engine for validating data transferred between infrastructure layers, in accordance with some implementations of the present technology.

FIG. 10 is a block diagram illustrating an example environment 1000 for using guardrails input into a validation engine 1012 for validating data transferred between infrastructure layers, in accordance with some implementations of the present technology. Example environment 1000 includes guardrails 1002 (e.g., jurisdictional guardrails 1004, organizational guardrails 1006, AI avatar behavioral guardrails 1008), vector store(s) 1010, and validation engine 1012. The validation engine 1012 can be the same as or similar to the gateway engine 232 in the avatar management platform discussed with reference to FIGS. 2A and 2B. The validation engine 1012 can use the guardrails 1002 to restrict information passing through the validation engine 1012, such as user input data 102 in FIG. 1 and/or information transmitted from the client application 204 to the avatar generation engine 242 and/or information that is sent from the avatar generation engine 242 to the client application 204 in FIGS. 2A and 2B. The environment 1000, including vector stores 1010 and validation engine 1012, can be implemented using components of example computer system 1600 illustrated and described in more detail with reference to FIG. 16. Likewise, implementations of example environment 1000 can include different and/or additional components or can be connected in different ways.

The validation engine 1012 can be configured to apply one or more validation rules to data passing through the validation engine 1012. The data can include user data (e.g., user input data, which is sent to an avatar generation engine) and/or avatar data (e.g., data generated by the avatar generation engine to be sent to a client application). The user data and avatar data can include multimodal data, including text, audio data, and/or visual data. The validation rules can be applied to ensure data security, privacy, and user experience objectives.

Applying the validation rules can include applying one or more guardrails 1002 to the data. A guardrail refers to a validation rule that detects and/or removes prohibited content and/or information from the data. As described in more detail with respect to FIGS. 8 and 9, prohibited content can include sensitive information (e.g., personal user information, such as a bank account balance, or personally identifiable information, such as a social security number), prohibited commands to the avatar generation engine, inappropriate language, incorrect information (e.g., AI hallucinations), a prohibited tone of voice (e.g., by the avatar), and the like. Different sets of validation rules can be applied to data based on data type (e.g., text, audio, combined audio and video), direction (e.g., user data transferred to the avatar generation engine versus generated data received from the avatar generation engine), topic or intent (e.g., request to retrieve information, request to perform an action, request to receive advice, an intent to give advice), and the like.

Guardrails 1002 can pertain to different subject areas or satisfy different regulatory requirements. The guardrails 1002 can include jurisdictional guardrails 1004, organizational guardrails 1006, and AI avatar behavioral guardrails 1008 (e.g., pertaining to prohibited textual, audio, and/or visual signals). Jurisdictional guardrails 1004 (e.g., governmental guardrails) can include guardrails pertaining to governmental regulations, such as data privacy and security. The jurisdictional guardrails 1004 can include guardrails for a specific use case of the environment 1000, such as medical and/or financial regulations. Organizational guardrails 1006 include guardrails established by an enterprise entity operating the environment 1000. For example, organizational guardrails 1006 can pertain to policies established by an enterprise entity that implements components of the internal infrastructure layer described with reference to FIGS. 2A and 2B, such as the avatar orchestration engine 220 and/or the gateway engine 232. The organizational guardrails 1006 can include guardrails for restricting the transmission of sensitive data (e.g., user account data for an account of the enterprise) or restricting a conversational topic or intent (e.g., preventing avatar responses with an intent to give advice). AI avatar behavioral guardrails 1008 include guardrails that pertain to specific types of AI avatar behaviors. The restricted AI avatar behaviors can include multimodal behaviors across text, audio signals, and/or visual signals. Examples of restricted AI avatar behaviors can include language, tone, speech cadence, and visual gestures (e.g., body language, facial expression).

Additionally, the guardrails 1002 can pertain to different topics and/or intents. An intent can refer to an intended outcome of data (e.g., of a prompt, request, and/or query), such as particular data being presented and/or a particular action being performed. For example, the guardrails 1002 can include a subset of guardrails to apply to data that has a retrieval intent (e.g., a user request to retrieve and/or present data, such as sensitive user information, and/or an avatar response directed to presenting the retrieved information), an action intent (e.g., a user request to perform an action, such as opening an account or changing a password, and/or an avatar response directed to performing the action), and/or an advice intent (e.g., a user request for advice, such as advice based on sensitive user information, and/or an avatar response directed to providing advice to the user).

The guardrails 1002 can be applied to data using various techniques (e.g., based at least in part on the guardrail). Applying a guardrail 1002 can include inputting data into one or more validation models (e.g., artificial intelligence models, such as trained neural networks). Each validation model can be configured to apply one or more guardrails 1002 to the data. Alternatively, or additionally, guardrails 1002 can be applied to the data using static pattern-matching techniques (e.g., regular expressions).

Applying a guardrail 1002 to data can include detecting one or more prohibited patterns in the data. For example, applying a guardrail 1002 can include searching through text data to find instances of account information (e.g., bank account information, bank account balance) in the data. Finding prohibited patterns in text data can include using text-based similarity searches (e.g., regular expressions) and/or vector-based similarity searches. For example, the validation engine 1012 can compare a vector representation of text data to a vector representation of a prohibited text pattern to determine whether the prohibited text pattern is present in the data. This can allow the validation engine 1012 to detect prohibited content in the data based on semantic similarity to reference patterns indicative of the prohibited content. Additionally, applying a guardrail 1002 can include detecting prohibited content in audio and/or video data. For example, a guardrail 1002 can be associated with and/or include a vector representation of a reference pattern indicative of prohibited content, and applying the guardrail 1002 to data can include comparing a vector representation of the data to the vector representation of the reference pattern.

One or more components of the guardrails 1002 (e.g., reference patterns indicative of prohibited content, vectorized instructions for an AI model to apply a guardrail 1002) can be stored in vector stores 1010. The vector stores 1010 can store vector representations of the guardrail components in a structured and accessible format (e.g., using distributed databases or NoSQL stores), which allows for efficient retrieval and utilization by the validation engine 1012. The vector representations of the guardrail components can be generated by encoding reference data into vector representations. For example, reference data that includes prohibited content can be transformed into a vector representation (e.g., by using one or more embedding models) and stored in the vector stores 1010. The vector representations can include numerical vectors that capture the semantic meaning and relationships between data, such that data containing prohibited content will be similar to (e.g., close to) a vector embedding of reference data that also includes the prohibited content.

The vector stores 1010 can be deployed in a self-hosted environment (e.g., on an internal enterprise infrastructure and/or within an organization's network perimeter), such as a private web server. Deploying the vector stores 1010 in a self-hosted environment can entail setting up the server with the necessary hardware and/or virtual machines, installing an operating system, and storing the vector stores 1010. In a self-hosted environment, organizations have full control over the vector stores 1010, allowing organizations to implement customized security measures and compliance policies tailored to the organization's specific needs. For example, organizations in industries with strict data privacy and security guardrails, such as financial institutions, can mitigate security risks by storing the vector stores 1010 in a self-hosted environment (e.g., rather than a cloud environment).

The validation engine 1012 can access the guardrails 1002 from the vector stores 1010 to apply validation rules. The validation engine 1012 can establish a connection to each vector store 1010 using appropriate APIs and/or database drivers. The connection allows the validation engine 1012 to query the vector store 1010 and retrieve the relevant guardrail components for the applied validation rules. Frequently accessed guardrail components can be stored in memory, which allows the validation engine 1012 to reduce latency and improve response times for validation testing. In some implementations, only the relevant guardrails are retrieved based on the specific use case, topic, and/or intent. For example, the validation engine 1012 can determine an intent of the data (e.g., via vector-based similarity search, keyword search, an intent classification model, and the like), determine one or more relevant guardrails 1002 to apply to the data, and retrieve relevant guardrail components from the vector stores 1010.

In some implementations, the validation engine 1012 can apply guardrails 1002 to user input data based on user permissions. For example, the validation engine 1012 can determine that a user has given permission for certain sensitive information, such as health information or biometric data, to be shared with a particular external system. The validation engine 1012 can responsively decide to not apply guardrails 1002 pertaining to the certain sensitive information, and/or to ignore the results of such guardrails 1002. The validation engine 1012 can periodically retrieve and/or update user permissions. In some implementations, the validation engine 1012 causes a request for user permissions to be presented to a user and responsively receives the user permissions.

Figure 11:
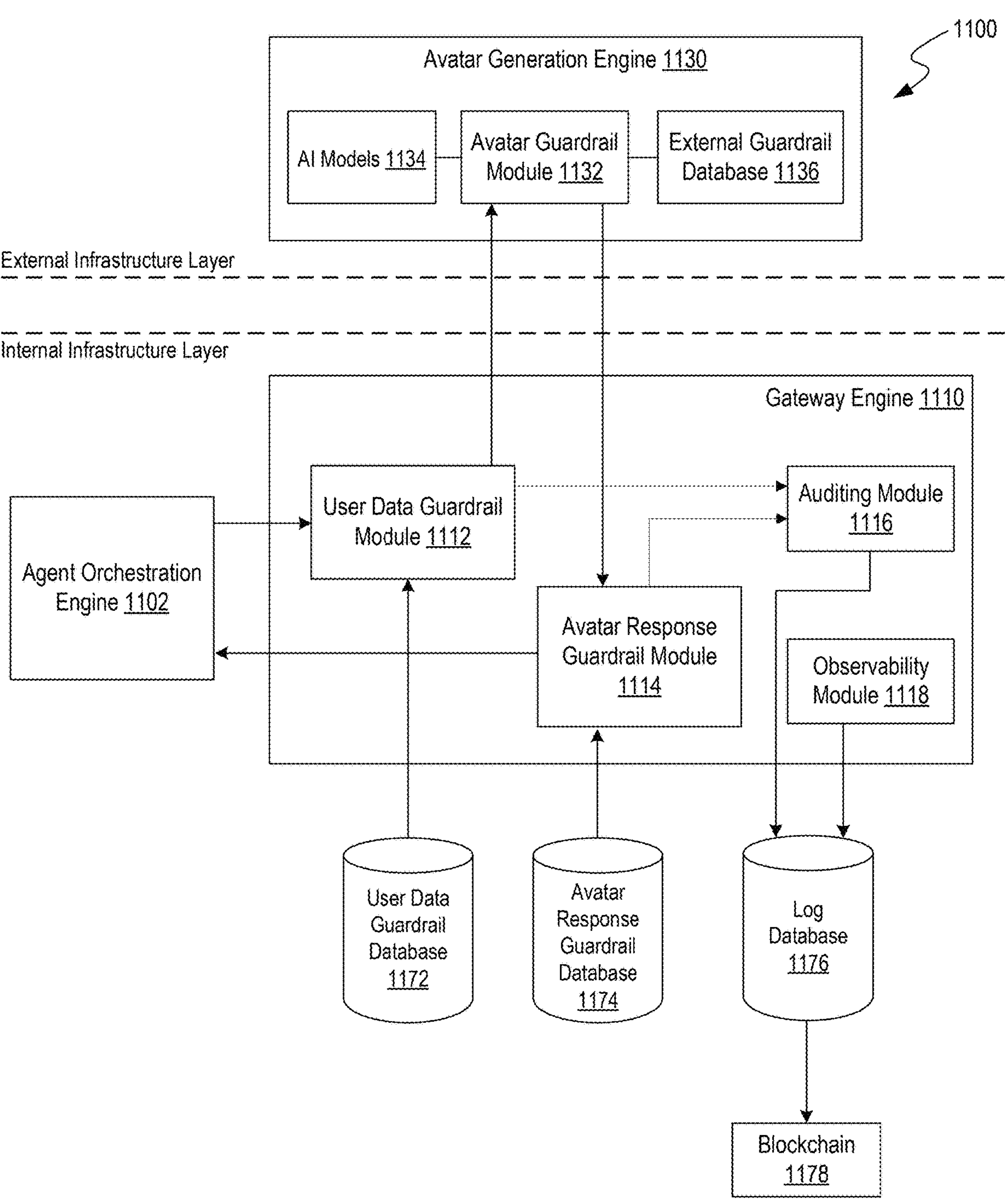
FIG. 11 shows a schematic illustrating an example environment of a gateway engine used by an avatar management platform, in accordance with some implementations of the present technology.

FIG. 11 shows a schematic illustrating an example environment 1100 of a gateway engine used by an avatar management platform, in accordance with some implementations of the present technology. The environment 1100 can be implemented using components of example computer system 1600 illustrated and described in more detail with reference to FIG. 16. Likewise, implementations of example environment 1100 can include different and/or additional components or can be connected in different ways.

The avatar management platform implements an architecture where a gateway engine 1110 coordinates the transfer of communication session data between an internal infrastructure layer and an external infrastructure layer. The gateway engine 1110 can be the same as or similar to the gateway engine 232 in the avatar management platform discussed with reference to FIGS. 2A and 2B. The communication session data is part of an avatar communication session between a client and an AI avatar (e.g., as described with reference to FIG. 1).

The agent orchestration engine 1102 receives user input data (e.g., from a client application operating in the external infrastructure layer). The user input data can be multimodal data, and can include text (e.g., natural language text), audio data, and/or video data (e.g., gestures, sign language). The agent orchestration engine 1102 can be configured to retrieve supplemental information related to the user input data. The supplemental information can include information needed to respond to user queries (e.g., queries present in the user input data), and can include information related to the client, such as sensitive user information (e.g., bank account balance, health information). In some implementations, the agent orchestration engine 1102 converts multimodal user input data into different modes. For example, the agent orchestration engine 1102 can be configured to convert audio data into text (e.g., detecting language spoken by the user in the audio data) and/or to convert video data into text (e.g., describing relevant visual information, such as facial expressions and/or body language).

The agent orchestration engine 1102 can combine and/or format the user input data, retrieved data, and/or converted data into augmented user input data (hereafter "augmented input") for transmission to an avatar generation engine 1130 operating in the external infrastructure layer. The augmented input can be multimodal data, including text, audio, and/or video data. The text data can be structured text data (e.g., separately indicating different types of information, such as a natural language user input, retrieved supplemental data, audio and/or video data converted to text, and the like), and/or unstructured text data (e.g., natural language). In some implementations, generating the augmented input can include processing the user input data, supplemental information, and/or converted information to generate a natural language prompt (e.g., by inputting the data into a language model agent of the agent orchestration engine 1102).

The augmented input can be processed by the gateway engine 1110 prior to being transmitted to the avatar generation engine 1130. The gateway engine 1110 can apply one or more validation rules, such as criteria, guidelines, and/or guardrails, to the augmented input to detect the presence of prohibited content.

The augmented input can be processed by a user data guardrail module 1112 that is configured to apply one or more guardrails to the augmented input. The user data guardrail module 1112 can apply the guardrails by evaluating the augmented input for prohibited data patterns that indicate the presence of prohibited data, such as sensitive information, prohibited commands, and the like. In some implementations, the user data guardrail module 1112 applies one or more text-based pattern recognition techniques. For example, the user data guardrail module 1112 can search the augmented input for specific instances of prohibited content (e.g., a social security number). Such prohibited content can be retrieved via the agent orchestration engine 1102 (e.g., from a backend data repository). Additionally, or alternatively, the user data guardrail module 1112 can use pattern-based text matching techniques, such as regular expressions, to identify instances of prohibited content that matches a particular format (e.g., a particular series of numbers and/or dashes). In some implementations, the user data guardrail module 1112 can convert other data modalities (e.g., audio data and/or video data) into text and detect instances of prohibited content by applying text-based pattern recognition techniques to the converted data.

In some implementations, the user data guardrail module 1112 is configured to detect one or more prohibited patterns by comparing the augmented input to one or more reference patterns. The reference patterns can include examples of prohibited content that can be used to identify similar prohibited content in the augmented input. In some implementations, the user data guardrail module 1112 compares vector representations of the augmented input to vector representations of reference patterns. For example, the user data guardrail module 1112 can include an encoder model that encodes the augmented input into one or more encoded vectors that are then compared to the vector representations of the reference patterns. In some implementations, the encoder separately encodes portions of the augmented input (e.g., natural language text, supplemental text, audio data, video data, combined audio and video data, and the like). For example, the user data guardrail module 1112 can separately encode audio data and video data into separate vector representations, and compare the vectors to vector representations of corresponding reference patterns (e.g., audio reference patterns for the audio data and video reference patterns for the video data).

In some implementations, the user data guardrail module 1112 applies different sets of validation tests based on characteristics of the augmented input. In some implementations, the user data guardrail module 1112 can detect and/or determine an intent of the augmented input (and/or of the user input data). An intent of the augmented input (or any data, input, and/or prompt) can refer to an intended outcome of augmented input, such as particular data being presented and/or a particular action being performed. The user data guardrail module 1112 can determine a set of validation tests that correspond to the intent. For example, if the augmented input is directed to retrieving client information (e.g., from a backend data repository), the user data guardrail module 1112 can apply a set of validation tests that are configured to detect sensitive user data in the augmented input. Alternatively, or additionally, if the augmented input includes a request and/or command to the avatar, the validation tests can be configured to detect prohibited commands in the augmented input. In some implementations, the user data guardrail module 1112 can apply one or more validation tests to determine an intent of the augmented input. For example, the user data guardrail module 1112 can use text-based pattern recognition techniques (e.g., keyword search) and/or semantic similarity techniques (e.g., using vector representations) to determine an intent of the augmented input. In some implementations, the validation tests are applied in stages. For example, the user data guardrail module 1112 can apply a validation test to detect a prohibited intent of the augmented data. If the detected intent is not prohibited, then the user data guardrail module 1112 can apply validation tests that correspond to the detected intent.

In some implementations, the user data guardrail module 1112 is configured to apply validation tests in real time as user data (e.g., augmented input) is streamed through the gateway engine 1110. In some implementations, the user data guardrail module 1112 applies validation tests in parallel to reduce latency. For example, the user data guardrail module 1112 can identify multiple sets of validation tests (e.g., corresponding with an intent of the augmented input) and perform each set of validation tests in parallel with other sets. In some implementations, the user data guardrail module 1112 includes and/or is connected to multiple validation agents (e.g., each associated with an intent) that are selectively executed to apply validation tests to the augmented input.

The user data guardrail module 1112 can be connected to a user data guardrail database 1172 that contains assistance data for applying the guardrails to the augmented input. The user data guardrail database 1172 can store structured data, unstructured content, semi-structured content, and/or vector representations of data elements, such as assistance data, to enable semantic search operations and information retrieval. The assistance data can include instructions for applying guardrails and/or can include examples of prohibited content (e.g., reference patterns). Examples of guardrails and/or prohibited content stored in the user data guardrail database 1172 are described in more detail with respect to FIG. 12.

In some implementations, the user data guardrail database 1172 includes a vector store (e.g., a vector store 1010 of FIG. 10). The vector store can store vectorized representations of guardrail components, such as instructions and/or reference patterns of prohibited content. In some implementations, the user data guardrail module 1112 receives and/or generates a vector representation of the augmented input, and compares the vector representation to one or more vector representations of reference patterns stored in the user data guardrail module 1112 to detect prohibited content in the augmented input. The user data guardrail module 1112 can retrieve the one or more vector representations of reference patterns, which are compared to the vector representation of the augmented input, and/or the user data guardrail module 1112 can send the vector representation of the augmented input to the user data guardrail database 1172 and receive a comparison result indicative of a comparison between the vector representation of the augmented input and the vector representations of the reference patterns.

In some implementations, the user data guardrail database 1172 stores guardrail data in a structured and accessible format. In some implementations, the user data guardrail database 1172 stores metadata for the guardrail data. For example, the user data guardrail database 1172 can store guardrail data in association with an associated data modality and/or an associated intent type. An associated data modality can indicate a data modality (e.g., text, audio, and/or video) that the guardrail is meant to be applied to. An associated intent type can indicate that the guardrail is meant to be applied on augmented inputs with the associated intent.

Figure 12:
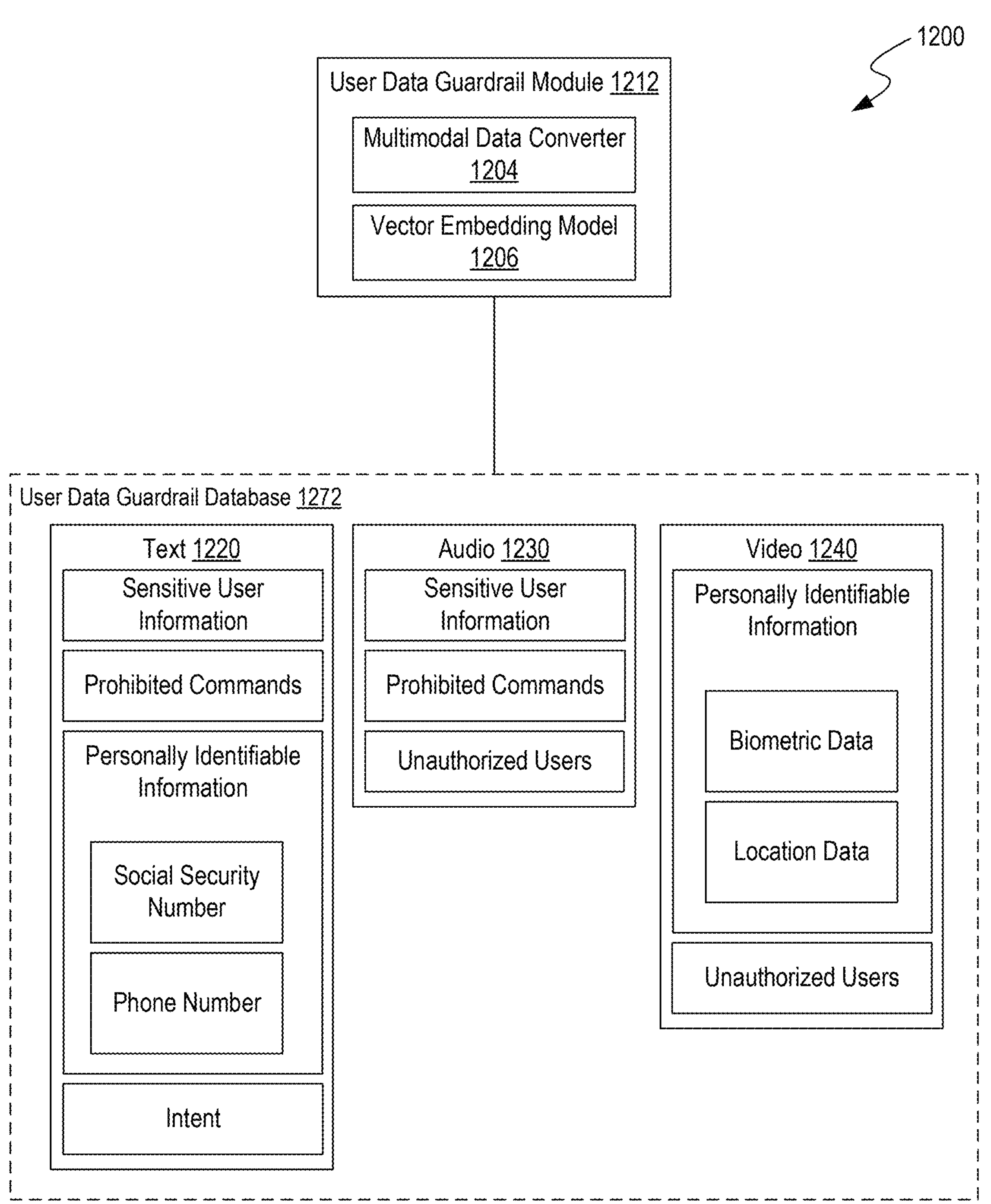
FIG. 12 is an illustrative diagram illustrating an example environment of a user data guardrail module, in accordance with some implementations of the present technology.

FIG. 12 is an illustrative diagram illustrating an example environment 1200 of a user data guardrail module 1212, in accordance with some implementations of the present technology. The example environment 1200 includes a user data guardrail module 1212 (e.g., the user data guardrail module 1112 of FIG. 11) and a user data guardrail database 1272 (e.g., the user data guardrail database 1172 of FIG. 11). The user data guardrail module 1212 can be configured to receive user data (e.g., an augmented input) and apply one or more validation tests (e.g., guardrails) to the user data. The user data guardrail database 1272 can include one or more guardrail components used to apply guardrails to the user data. The user data guardrail database 1272 can store structured data, unstructured content, semi-structured content, and/or vector representations of data elements. For example, the user data guardrail database 1272 can include one or more vector stores, such as vector stores 1010 described with reference to FIG. 10.

The user data guardrail database 1272 can include text validation data 1220. The text validation data 1220 can include information pertaining to prohibited text content in user data. Examples of prohibited text content include sensitive user data (e.g., account information, bank account balance, health information, account passwords, and the like), prohibited commands (e.g., commands for an avatar to perform a prohibited gesture or speak with a prohibited tone, commands to change an avatar's appearance to a prohibited appearance, commands to perform an unauthorized action on a user's account), personally identifiable information (e.g., user address, bank account number, social security number), and the like. In some implementations, the text validation data 1220 can include information for validating intent. For example, the text validation data 1220 can include a list of prohibited intents, reference patterns used to determine intent, and the like. Examples of intent include: intent to retrieve and/or present data (e.g., user information, such as sensitive user data and/or user account information), intent to perform an action (e.g., change a user account setting, change a characteristic of the avatar, update user information), intent to receive advice (e.g., based on user information), and the like.

The user data guardrail database 1272 can include audio validation data 1230. The audio validation data 1230 can include information pertaining to prohibited audio content in user data. Examples of prohibited audio content include prohibited commands, sensitive user data, and the like. Additionally, or alternatively, the audio validation data 1230 can include data used to detect one or more unauthorized users. For example, the user data guardrail module 1212 can compare audio data received from a client device to reference audio data corresponding to an authorized user to detect a voice that belongs to a user other than the authorized user. The reference audio data can be temporarily stored in the user data guardrail database 1272 (e.g., only for the duration of an avatar conversation).

The user data guardrail database 1272 can include video validation data 1240. The video validation data 1240 can include information pertaining to prohibited video content in user data. Examples of prohibited video content include prohibited commands, sensitive user data, and personally identifiable information (e.g., biometric data, such as user appearance or distinguishing features, and/or location data, such as from a user's surroundings). Additionally, or alternatively, the video validation data 1240 can include data used to detect one or more unauthorized users. For example, the user data guardrail module 1212 can compare video data received from a client device to reference video data corresponding to an authorized user to detect the presence of a user other than the authorized user. The reference video data can be temporarily stored in the user data guardrail database 1272 (e.g., only for the duration of an avatar conversation).

While certain prohibited content has illustratively been described as belonging to a particular data modality, types of prohibited content are not so limited. For example, the user data guardrail database 1272 can include audio validation data 1230 used to detect personally identifiable information in audio data, or can include video validation data 1240 used to detect sensitive user information in video data (e.g., written information presented in video data).

In some implementations, the environment 1200 (e.g., the user data guardrail module 1212 and/or the user data guardrail database 1272) includes a multimodal data converter 1204. The multimodal data converter 1204 can improve validation tests by converting user data into a modality that is more effective for detecting prohibited content. For example, the multimodal data converter 1204 can convert audio data into text data (e.g., generate a transcript of speech detected in the audio data).

In some implementations, the environment 1200 (e.g., the user data guardrail module 1212 and/or the user data guardrail database 1272) includes a vector embedding model 1206. The vector embedding model 1206 can convert user data into one or more vector representations. In some implementations, the environment 1200 generates a different vector embedding based on characteristics of the user data such as data modality and/or intent. For example, the environment 1200 can include multiple vector embedding models 1206 that are executed based on the characteristics of the user data.

In some implementations, applying one or more validation rules to user data involves transmitting validation data from the user data guardrail database 1272 to the user data guardrail module 1212. For example, the user data guardrail module 1212 can determine a modality type and/or intent of the user data, retrieve relevant validation data from the user data guardrail database 1272, and use the relevant validation data to apply the validation rules. In some implementations, applying one or more validation rules to user data involves transmitting the user data to the user data guardrail database 1272. For example, the user data guardrail module 1212 can transmit the user data to the user data guardrail database 1272, where the validation tests are performed on the user data using relevant validation data stored in the user data guardrail database 1272.

Returning to FIG. 11, the user data guardrail module 1112 can, as a result of applying one or more validation rules, generate and/or receive (e.g., from the user data guardrail database 1172) a content score associated with the augmented input. The content score can indicate the presence of prohibited content in the augmented input. The content score can be a category or level (e.g., "low," "high," "critical") and/or a numerical value (e.g., a number between 1 and 10). In some implementations, the content score is based at least in part on a distance (e.g., cosine similarity) between a vector representation of the augmented input and a vector representation of a reference pattern. In some implementations, the content score indicates a likelihood that the augmented input contains prohibited content. For example, the content score can be higher when the vector representation of the augmented input is closer to one or more vector representations of reference patterns corresponding to prohibited content. In some implementations, the content score indicates an amount of confidence that the augmented input contains particular prohibited content. For example, the content score can be lower when the vector representation of the augmented input is close to multiple vector representations that correspond to different types of prohibited content, such that the particular type of prohibited content in the augmented input cannot be determined with a high level of confidence.

The user data guardrail module 1112 can determine the presence of prohibited content in the augmented input based at least in part on applying the validation rules. In some implementations, the user data guardrail module 1112 receives, as a result of applying the validation rules, one or more content scores associated with the validation rules, and determines the presence of prohibited content based on the content scores. For example, the user data guardrail module 1112 can determine whether the content scores satisfy a score threshold (e.g., whether a content score is greater than or equal to a score threshold value and/or whether the content score is included in a list of score threshold values). Each score threshold can vary based on the corresponding validation rule (e.g., with some validation rules having higher thresholds than other validation rules).

The user data guardrail module 1112 can be configured to take one or more actions in response to the detection of prohibited content in an augmented input. In some implementations, the user data guardrail module 1112 can remove the prohibited content from the augmented input. For example, the user data guardrail module 1112 can remove prohibited text from text data, silence prohibited audio data, and so on. In some implementations, removing prohibited content includes replacing the prohibited content with proxy content. The proxy content can include falsified content, such as intentionally incorrect and/or randomized content. The proxy content can include placeholder content, such as specific content recognized as being a placeholder for a particular type of prohibited content and/or treated as legitimate content of the particular type. For example, the user data guardrail module 1112 can identify a bank account balance in the text data of an augmented input, and replace the bank account balance with placeholder text, where the avatar generation engine 1130 subsequently recognizes the placeholder text and treats the placeholder text as if it were a user bank account balance.

In some implementations, the user data guardrail module 1112 can, in response to the detection of prohibited content in an augmented input, transmit one or more instructions for the avatar generation engine 1130. For example, when the prohibited content has been replaced with placeholder content, the user data guardrail module 1112 transmits (or cause transmission of) instructions for a generative AI model to treat the placeholder content as if it were the original prohibited content. Additionally, or alternatively, the user data guardrail module 1112 can determine that the augmented input is directed to a prohibited topic and/or intent (e.g., includes a request for advice) and transmit an instruction to prevent prohibited content from being included in a response generated by the avatar generation engine 1130 (e.g., an instruction to direct the conversation away from the prohibited topic, an instruction to ground and/or validate an output of a generative AI model). In some implementations, the instruction includes a function call that is transmitted by the gateway engine 1110 to the avatar generation engine 1130, which can be executed by an avatar guardrail module 1132. In some implementations, the instruction is generated and transmitted alongside the augmented input. For example, the instruction can be a natural language instruction that is input into an AI model to guide the model in generating an output responsive to user input (e.g., to the augmented input).

Once prohibited content has been detected in the augmented input, the user data guardrail module 1112 can generate an avatar input prompt by removing the prohibited content from the augmented input. The avatar input prompt can also include one or more instructions for the avatar generation engine 1130 to prevent prohibited content from appearing in a generated response.

The gateway engine 1110 (e.g., the user data guardrail module 1112) can transmit the avatar input prompt from the internal infrastructure layer to the avatar generation engine 1130 in the external infrastructure layer. The avatar generation engine 1130 can be the same as or similar to the avatar generation engine 242 described with reference to FIGS. 2A and 2B. The avatar input prompt is received by the avatar generation engine 1130, where it is used to generate a candidate avatar response using one or more AI models 1134. The AI models 1134 can include a language model and/or one or more multimodal generative AI models (e.g., AI models capable of generating audio and/or video outputs).

The avatar generation engine 1130 can include an avatar guardrail module 1132. The avatar guardrail module 1132 can be used to perform validation tests on data transmitted from the internal infrastructure layer to one or more AI models 1134. For example, the validation tests can be performed on user input data (e.g., the avatar input prompt) and/or outputs generated by the AI models 1134. The validation tests performed by the avatar guardrail module 1132 can be determined and/or received by the gateway engine 1110. For example, the avatar input prompt can contain instructions to perform one or more validation tests on outputs generated by the AI models 1134. The validation tests can detect prohibited content, such as inaccurate information (e.g., hallucinations), inappropriate responses, a prohibited intent, and the like. The avatar guardrail module 1132 can be connected to an external guardrail database 1136. The external guardrail database 1136 can include assistance data (e.g., instructions, reference patterns, knowledge databases) for use by the avatar guardrail module 1132 to assist in applying the validation tests.

In some implementations, the avatar guardrail module 1132 is configured to receive one or more instructions from the gateway engine 1110 (e.g., included in an avatar input prompt) and responsively perform one or more actions. For example, the avatar guardrail module 1132 can receive an instruction to guide the conversation away from a prohibited topic, and responsively cause the AI models 1134 to generate outputs that guide the conversation away from the prohibited topic and/or responsively apply one or more validation tests to the outputs to detect the presence of prohibited patterns that indicate the prohibited topic.

The avatar guardrail module 1132 can modify the output of the generative AI model to generate a candidate avatar response (e.g., an output that complies with one or more guardrails enforced by the avatar guardrail module 1132) that is configured for transmission to the client application through the internal infrastructure layer. The candidate avatar response can include text (e.g., natural language text, structured text data), audio data, and/or video data. The candidate avatar response can then be transmitted by the avatar generation engine 1130 from the external infrastructure layer to the gateway engine 1110 in the internal infrastructure layer. The gateway engine 1110 can then apply additional validation rules to the received candidate avatar response. The additional validation rules can be configured to guarantee the guardrails enforced by the avatar generation engine 1130 and/or apply additional guardrails (e.g., guardrails that depend on internal enterprise data that is not transmitted to the external infrastructure layer).

The candidate avatar response can be processed by an avatar response guardrail module 1114 prior to being transmitted to the client application. The avatar response guardrail module 1114 can be configured to apply one or more validation rules, such as criteria, guidelines, and/or guardrails, to the candidate avatar response to detect the presence of prohibited content.

The avatar response guardrail module 1114 can be configured to perform generally similar operations as the user data guardrail module 1112. For example, the avatar response guardrail module 1114 can apply validation tests (e.g., guardrails) by evaluating the candidate avatar response for prohibited data patterns that indicate the presence of prohibited data. Applying a guardrail can involve applying a text-based pattern recognition technique, semantic search techniques, and/or vector comparison techniques. For example, applying a guardrail can involve receiving and/or determining a vector representation of the candidate avatar response and comparing the vector representation with vector representations of reference patterns that are indicative of prohibited content. The validation tests can be applied based on an intent of the candidate avatar response (e.g., an action intent, an advice intent) or a modality of data contained in the candidate avatar response (e.g., text, audio, video), and/or can be applied based on the results of previous validation tests (e.g., a validation test corresponding to an intent determined by a prior validation test).

In some implementations, the avatar response guardrail module 1114 is configured to apply validation tests in real time as avatar data (e.g., candidate avatar responses) are streamed through the gateway engine 1110. In some implementations, the avatar response guardrail module 1114 applies validation tests in parallel to reduce latency. For example, the avatar response guardrail module 1114 can identify multiple sets of validation tests (e.g., corresponding with an intent of the candidate avatar response) and perform each set of validation tests in parallel with other sets. In some implementations, the avatar response guardrail module 1114 includes and/or is connected to multiple validation agents (e.g., each associated with an intent) that are selectively executed to apply validation tests to the candidate avatar response.

In some implementations, the avatar response guardrail module 1114 is connected to an avatar response guardrail database 1174 that contains assistance data for applying validation tests (e.g., guardrails) to the candidate avatar response. The avatar response guardrail database 1174 can store structured data, unstructured content, semi-structured content, and/or vector representations of data elements, such as assistance data, to enable semantic search operations and information retrieval. The assistance data can include instructions for applying guardrails and/or can include examples of prohibited content (e.g., reference patterns and/or vector representations of reference patterns).

Figure 13:
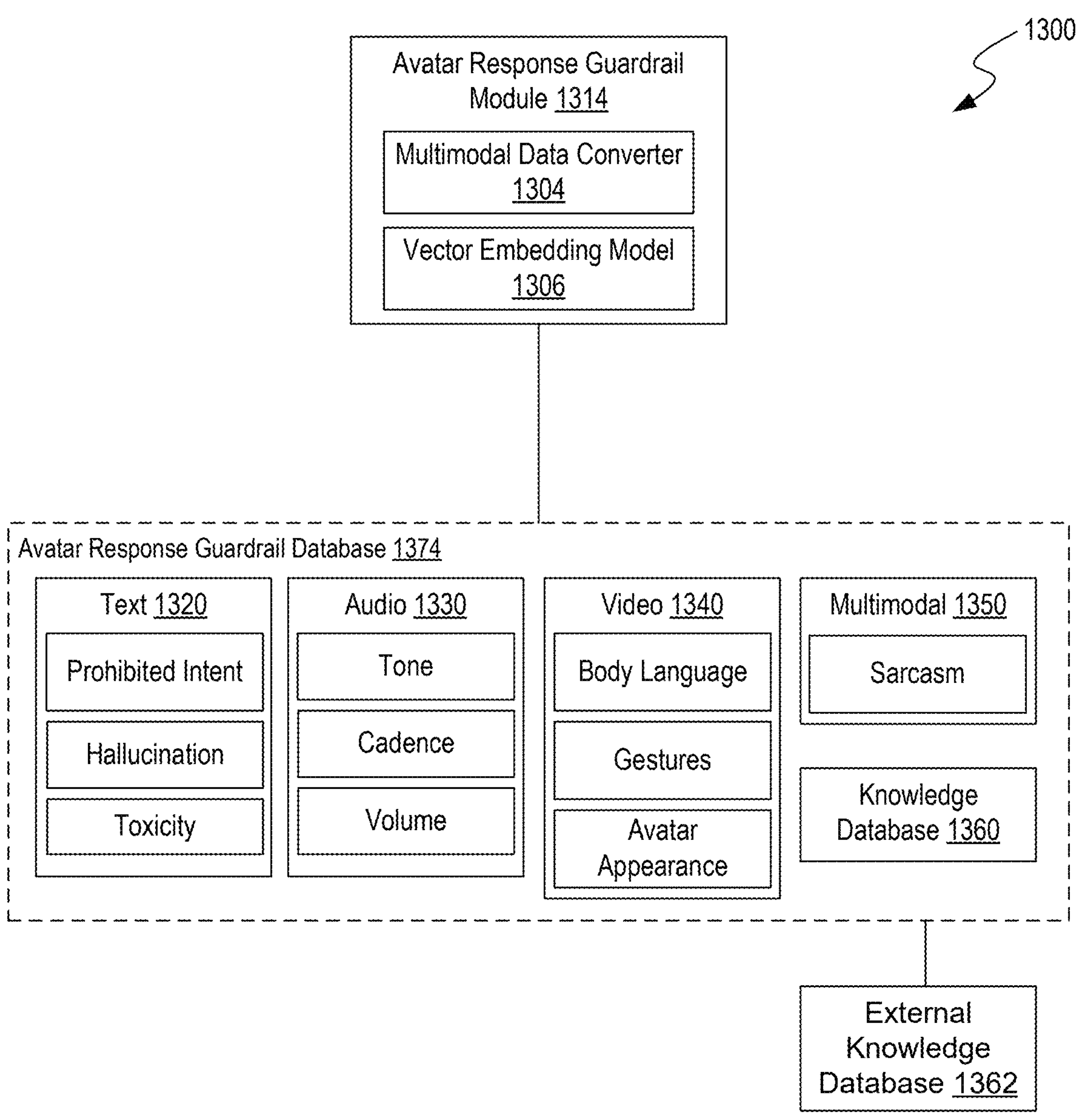
FIG. 13 is an illustrative diagram illustrating an example environment of an avatar response guardrail module, in accordance with some implementations of the present technology.

FIG. 13 is an illustrative diagram illustrating an example environment 1300 of an avatar response guardrail module 1314, in accordance with some implementations of the present technology. The example environment 1300 includes an avatar response guardrail module 1314 (e.g., the avatar response guardrail module 1114 of FIG. 11) and an avatar response guardrail database 1374 (e.g., the avatar response guardrail database 1174 of FIG. 11). The avatar response guardrail module 1314 can be configured to receive avatar data (e.g., a candidate avatar response) and apply one or more validation tests (e.g., guardrails) to the avatar data. The avatar response guardrail database 1374 can include one or more guardrail components used to apply guardrails to the avatar data. The avatar response guardrail database 1374 can store structured data, unstructured content, semi-structured content, and/or vector representations of data elements. For example, the avatar response guardrail database 1374 can include one or more vector stores, such as vector stores 1010 described with reference to FIG. 10.

The avatar response guardrail database 1374 can include text validation data 1320. The text validation data 1320 can include information pertaining to prohibited text content in avatar data. Examples of prohibited text content include prohibited language (e.g., insults, explicit words, controversial statements, toxic language, unusual or uncommon vocabulary, highly technical terminology), inaccurate and/or misleading information (e.g., hallucinations), biased language (e.g., offensive statements, stereotypes), and the like. In some implementations, the text validation data 1320 can include information for validating intent. For example, the text validation data 1320 can include a list of prohibited intents, reference patterns used to determine intent, and the like. Examples of intent include intent to retrieve and/or present data (e.g., user information, such as sensitive user data and/or user account information), intent to perform an action (e.g., change a user account setting, update user information), intent to provide advice (e.g., based on user information), and the like.

The avatar response guardrail database 1374 can include audio validation data 1330. The audio validation data 1330 can include information pertaining to prohibited audio content in avatar data, such as spoken language. Examples of prohibited audio content pertaining to spoken language include a prohibited tone of voice (e.g., angry, condescending, melancholic), a prohibited cadence (e.g., a cadence that is too fast or too slow, a cadence that is irregular or inconsistent with the meaning of the spoken words), a prohibited volume (e.g., too quiet or too loud), and the like.

The avatar response guardrail database 1374 can include video validation data 1340. The video validation data 1340 can include information pertaining to prohibited video content in avatar data, such as avatar appearance and/or gestures. Examples of prohibited video content include prohibited body language (e.g., aggressive, nervous, melancholic), prohibited body position and/or motion (e.g., running, jumping, lying down), prohibited gestures (e.g., rude gestures, aggressive gestures, rude words in sign language, fast motions, inappropriate and/or uncanny facial expressions), prohibited visual information and/or visual data (e.g., sensitive user information presented as text represented in video data), and prohibited avatar visual characteristics and/or avatar appearances (e.g., incorrect body proportions, inappropriate, gory, stereotypical or offensive), and the like.

The avatar response guardrail database 1374 can include multimodal validation data 1350. The multimodal validation data 1350 can include information pertaining to prohibited content involving multimodal data, such as text, audio, and/or video data. The multimodal validation data 1350 can include separate validation data corresponding to each modality (e.g., such that the multimodal validation data 1350 contains text validation data 1320, audio validation data 1330, and/or video validation data 1340) and/or validation data corresponding to multimodal data (e.g., a single vector representation of combined audiovisual data). Examples of prohibited multimodal content include prohibited nonobvious meaning and/or intent (e.g., sarcasm, double entendre, parable), incongruous multimodal data (e.g., negative text with an affirmative tone of voice and/or affirmative body language), and the like.

The avatar response guardrail database 1374 can include and/or be connected to a knowledge database 1360 (e.g., knowledge base 228 of FIGS. 2A and 2B). The environment 1300 (e.g., the avatar response guardrail module 1314 and/or the avatar response guardrail database 1374) can use the knowledge database 1360 to ground avatar responses and prevent hallucinations (e.g., prohibited inaccurate information). In some implementations, the avatar response guardrail database 1374 (and/or the avatar response guardrail module 1314) is connected to one or more external knowledge databases 1362. The external knowledge databases 1362 can include one or more preapproved external databases that can be used to ground avatar data. For example, if the avatar response guardrail module 1314 (and/or the avatar response guardrail database 1374) determines that the knowledge database 1360 does not contain sufficient information to determine whether the avatar data contains factually correct information, then data can be retrieved from an external knowledge database 1362 to verify the information.

While certain prohibited content has illustratively been described as belonging to a particular data modality, types of prohibited content are not so limited. For example, the avatar response guardrail database 1374 can include audio validation data 1330 used to detect prohibited language and/or prohibited intent (e.g., based on tone and/or spoken language content).

In some implementations, the avatar response guardrail module 1314 compares avatar data to historical data. For example, the avatar response guardrail module 1314 can compare the avatar data to user input used to generate the avatar data to determine whether the avatar data addresses the user's requests and/or queries. Additionally, or alternatively, the avatar data can be compared to past instances of user data and/or avatar data to determine whether the avatar data is relevant to an avatar conversation.

In some implementations, the environment 1300 (e.g., the avatar response guardrail module 1314 and/or the avatar response guardrail database 1374) includes a multimodal data converter 1304. The multimodal data converter 1304 can improve validation tests by converting avatar data into a modality that is more effective for detecting prohibited content. For example, the multimodal data converter 1304 can convert audio data into text data (e.g., generate a transcript of speech detected in the audio data).

In some implementations, the environment 1300 (e.g., the avatar response guardrail module 1314 and/or the avatar response guardrail database 1374) includes a vector embedding model 1306. The vector embedding model 1306 can convert avatar data into one or more vector representations. In some implementations, the environment 1300 generates a different vector embedding based on characteristics of the avatar data such as data modality and/or intent. For example, the environment 1300 can include multiple vector embedding models 1306 that are executed based on the characteristics of the avatar data.

In some implementations, applying one or more validation rules to avatar data involves transmitting validation data from the avatar response guardrail database 1374 to the avatar response guardrail module 1314. For example, the avatar response guardrail module 1314 can determine a modality type and/or intent of the avatar data, retrieve relevant validation data from the avatar response guardrail database 1374, and use the relevant validation data to apply the validation rules. In some implementations, applying one or more validation rules to avatar data involves transmitting the avatar response to the avatar response guardrail database 1374. For example, the avatar response guardrail module 1314 can transmit the avatar data to the avatar response guardrail database 1374, where the validation tests are performed on the avatar data using relevant validation data stored in the avatar response guardrail database 1374.

Returning to FIG. 11, the avatar response guardrail module 1114 can, as a result of applying one or more validation tests, generate and/or receive (e.g., from the avatar response guardrail database 1174) a content score associated with the candidate avatar response. The content score can indicate the presence of prohibited content in the candidate avatar response. The content score can be a category or level (e.g., "low," "high," "critical") and/or a numerical value (e.g., a number between 1 and 10). In some implementations, the content score is based at least in part on a distance (e.g., cosine similarity) between a vector representation of the candidate avatar response and a vector representation of a reference pattern. In some implementations, the content score indicates a likelihood that the candidate avatar response contains prohibited content and/or indicates a confidence that the candidate avatar response contains a particular type of prohibited content.

The avatar response guardrail module 1114 can determine the presence of prohibited content in the augmented input based at least in part on applying the validation rules. In some implementations, the avatar response guardrail module 1114 receives, as a result of applying the validation rules, one or more content scores associated with the validation results, and determines the presence of prohibited content based on the content scores. For example, the avatar response guardrail module 1114 can determine whether the content scores satisfy a score threshold (e.g., whether a content score is greater than or equal to a score threshold value and/or whether the content score is included in a list of score threshold values). Each score threshold can vary based on the corresponding validation rule (e.g., with some validation rules having higher thresholds than other validation rules).

The avatar response guardrail module 1114 can be configured to take one or more actions in response to the detection of prohibited content in the candidate avatar response. For example, the avatar response guardrail module 1114 can remove the prohibited content from the candidate avatar response. For example, the avatar response guardrail module 1114 can remove prohibited text from text data, silence prohibited audio data, and so on. In some implementations, removing prohibited content includes replacing the prohibited content with substitute content. The substitute content can include avatar response content generated in response to detecting the prohibited content. In some implementations, the avatar management platform generates the substitute content within the internal infrastructure layer. For example, the gateway engine 1110 and/or the agent orchestration engine 1102 can generate the substitute content (e.g., if the avatar management platform determines that the internal infrastructure has the capability and/or resources to generate the substitute content). In some implementations, the avatar management platform generates the substitute content within the external infrastructure layer. For example, the gateway engine 1110 (e.g., the avatar response guardrail module 1114) can transmit an instruction to the avatar generation engine 1130 to generate the substitute content. The instruction can identify the prohibited content and instruct the avatar generation engine 1130 to generate substitute content that does not contain the prohibited content. In some implementations, the instruction includes a function call that is transmitted by the gateway engine 1110 to the avatar generation engine 1130, which can be executed by the avatar guardrail module 1132. In some implementations, the instruction is generated and transmitted as input data. For example, the instruction can be a natural language instruction that is input into the AI models 1134 (e.g., along with the augmented input that was used to generate the candidate avatar response) to generate an output that does not contain the prohibited content.

In some implementations, the avatar response guardrail module 1114 removes content from the candidate avatar response in response to the detection (e.g., by the user data guardrail module 1112) of an unauthorized user. For example, the avatar response guardrail module 1114 can, in response to the detection of the unauthorized user, apply one or more validation tests to detect prohibited content corresponding to sensitive user information. The avatar response guardrail module 1114 can, in response to detecting the prohibited content (e.g., in response to a content score that satisfies a threshold), remove the prohibited content from the candidate avatar response.

In some implementations, the avatar response guardrail module 1114 adds content to the candidate avatar response and/or replaces content in the candidate avatar response. For example, if the user data guardrail module 1112 replaced prohibited content (such as user account information) with proxy data, the avatar response guardrail module 1114 can detect the proxy data and replace the proxy data with the relevant content. For example, the avatar response guardrail module 1114 can replace proxy text data with relevant text data (e.g., retrieved from a backend data repository and/or stored by the user data guardrail module 1112 in response to the removal of the prohibited content). Additionally, or alternatively, the avatar response guardrail module 1114 can cause multimodal replacement content (e.g., audio and/or video content) to be generated (e.g., by one or more components operating inside of the internal infrastructure layer).

In some implementations, the avatar response guardrail module 1114 adds default avatar content to the candidate avatar response to replace prohibited content. For example, the avatar response guardrail module 1114 can have access to default paused and/or idle animations for the avatar that are added to replace prohibited content. In some implementations, the paused and/or idle animations are presented to the client any time the avatar management platform has not received avatar responses to present to the client (e.g., during periods of high latency or poor connection quality, when avatar responses have been removed due to the presence of prohibited content, and the like). In some implementations, the avatar response guardrail module 1114 replaces the prohibited avatar content with advisory content (e.g., text, spoken language, and/or visual indicators) indicating that the avatar response is prohibited.

In some implementations, the avatar response guardrail module 1114 determines that the candidate avatar response (e.g., including sensitive content added by the avatar response guardrail module 1114) includes sensitive content, and requires additional authorization credentials from the client. For example, the avatar response guardrail module 1114 can determine (e.g., in response to applying a validation test and/or guardrail) that the candidate avatar response includes extremely sensitive information, such as sensitive health information for a user. The avatar response guardrail module 1114 can determine that the extremely sensitive information requires additional authorization credentials from the client. The determination can be made by accessing a sensitivity database indicating extremely sensitive information. For example, the avatar response guardrail module 1114 can compare a vector representation of the avatar response to a vector representation of extremely sensitive information. The comparison can determine that the candidate avatar response contains the extremely sensitive information. Alternatively, or additionally, the comparison can determine a category of the extremely sensitive information, and the category can be compared to a database of extremely sensitive information categories to determine that the avatar response contains the extremely sensitive information.

The avatar response guardrail module 1114 can, in response to determining that the avatar response contains extremely sensitive information, prevent the extremely sensitive information from being transmitted to the client application and transmit a request to receive additional user authorization credentials. The request to receive additional user authorization credentials can cause a client application to present (e.g., on a user interface) a prompt to input user authorization credentials. Inputting the user authorization credentials can include advanced security measures, such as additional passcodes, two-factor authentication, and/or biometric authentication. In some implementations, the avatar response guardrail module 1114 generates an alternate avatar response to replace the candidate avatar response. For example, the avatar response guardrail module 1114 can transmit an instruction to the avatar generation engine 1130 to generate an alternate avatar response that includes a request for the client to input the additional user authorization credentials. Alternatively, or additionally, the avatar management platform can cause the alternate avatar response to be generated in the internal infrastructure layer by one or more AI models.

Once prohibited content has been detected in the candidate avatar response, the avatar response guardrail module 1114 can generate a final avatar response by removing and/or replacing the prohibited content within the candidate avatar response and/or by adding relevant data to the candidate avatar response. The final avatar response can then be transmitted to the client application (e.g., through the agent orchestration engine 1102) for presentation to the client on a client device.

In some implementations, the gateway engine 1110 implements observability and logging capabilities via an auditing module 1116 and an observability module 1118. An auditing module 1116 can record transmitted data and/or log outputs of the gateway engine 1110 (e.g., of the user data guardrail module 1112 and/or the avatar response guardrail module 1114). For example, the auditing module 1116 can record the augmented input, identifiers of the validation tests applied to the augmented input, the results of the validation tests applied to the augmented input, the content scores resulting from applying the validation tests to the augmented input, the prohibited content detected within and/or removed from the augmented input, the avatar input prompt, and/or any logs generated by the user data guardrail module 1112. Additionally, or alternatively, the auditing module 1116 can record the candidate avatar response, identifiers of the validation tests applied to the candidate avatar response, the results of the validation tests applied to the candidate avatar response, the content scores resulting from applying the validation tests to the candidate avatar response, the prohibited content detected within and/or removed from the candidate avatar response, the final avatar response, and/or any logs generated by the avatar response guardrail module 1114. An observability module 1118 can record system metrics, such as computational load, latency (e.g., network latency), memory usage, and the like. The observability module 1118 can compare the system metrics against threshold ranges and/or values to detect deviations that may indicate one or more system errors, and can responsively generate an alert.

The auditing module 1116 and/or the observability module 1118 can record data (e.g., auditing and/or observability data) in a log database 1176. The log database can store data as structured, unstructured, and/or semi-structured data. In some implementations, the avatar management platform performs analysis on data stored in the log database 1176 to determine historical performance metrics. In some implementations, the avatar management platform stores data (e.g., auditing and/or observability data) on a distributed ledger such as a blockchain 1178 and/or a federated ledger. For example, the avatar management platform can generate a cryptographic hash (or other cryptographic representation) of the logs and can record the hash along with metadata such as timestamps and user identifiers in a block that is added to the distributed ledger.

Example Implementation of Using the Avatar Access Gateway

Figure 14:
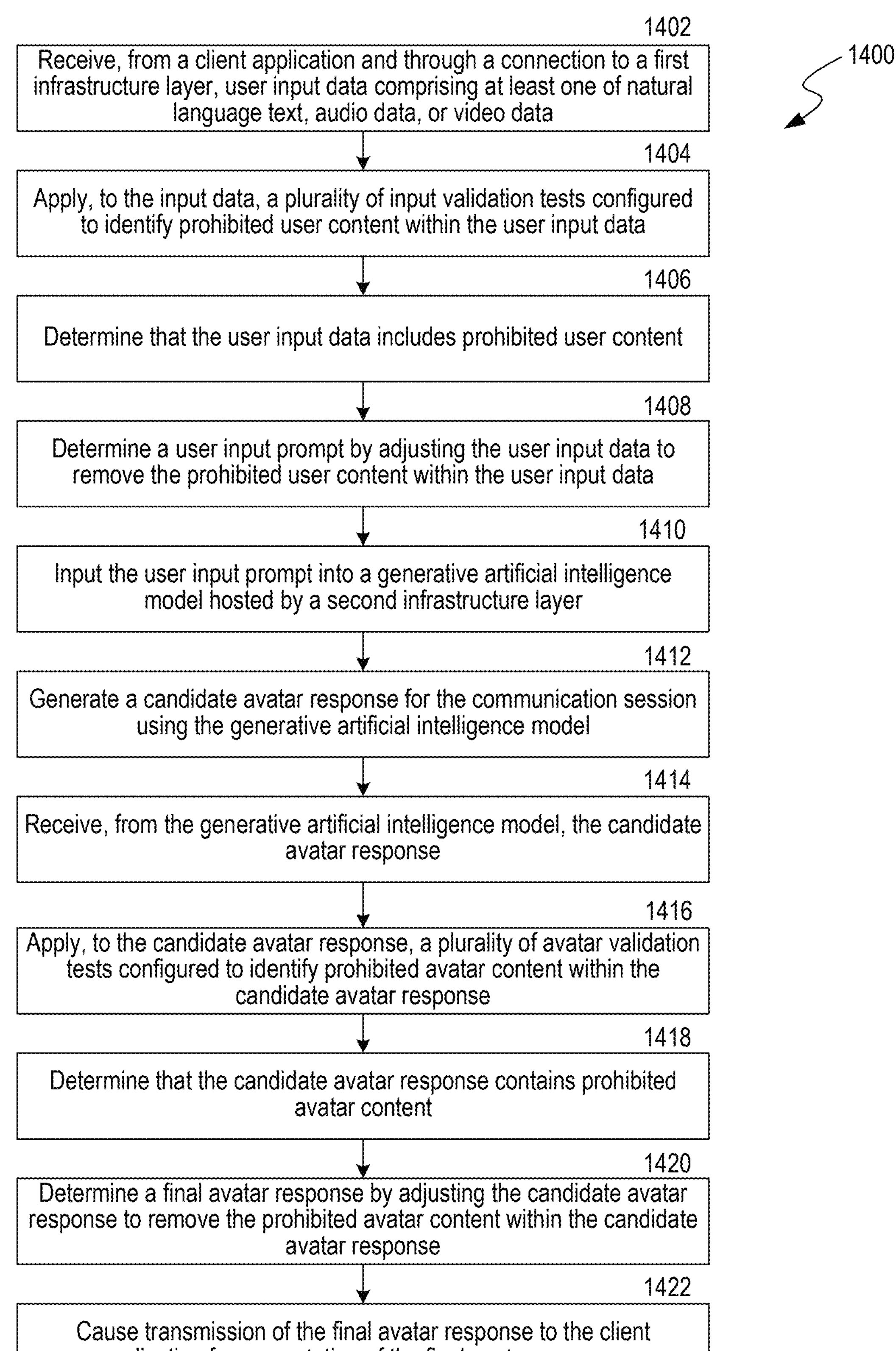
FIG. 14 is a flow diagram illustrating an example process of transmitting data through an avatar access gateway of an avatar management platform, in accordance with some implementations of the present technology.

FIG. 14 is a flow diagram illustrating an example process 1400 of transmitting data through an avatar access gateway of an avatar management platform, in accordance with some implementations of the present technology. In some implementations, the process 1400 is performed by a computer system, e.g., example computer system 1600 illustrated and described in more detail with reference to FIG. 16. Implementations can include different and/or additional operations or can perform the operations in different orders.

In operation 1402, the avatar management platform can receive user input data from a client application. The user input data can include natural language text, audio data, and/or video data captured during a communication session between the client application and an artificial intelligence (AI) avatar. The AI avatar can be configured to present an output (e.g., an avatar response) responsive to an input (e.g., the user input data) received by the client application. The AI avatar output can be generated by one or more AI systems, such as generative AI systems. The communication session can be a bidirectional communication session enabling real-time data streaming (e.g., between the client application and the generative AI systems and/or between the client and the AI avatar). The user input data can be received through a connection to a first infrastructure layer. For example, the client application can be executed in a second infrastructure layer that is connected to the first infrastructure through the connection (e.g., a network connection). The first infrastructure layer can operate within a first network perimeter. The first network perimeter can restrict access to authorized devices and users by filtering incoming network traffic based on source addresses and connection parameters.

In operation 1404, the avatar management platform can apply a plurality of input validation tests to the user input data. Each input validation test can be configured to identify prohibited user content within the user input data. The prohibited user content can include multimodal content, such as prohibited text, audio, and/or video content. Examples of prohibited user content can include sensitive user information (e.g., bank account balance, account password, social security number), personally identifiable information (e.g., name, address, location, biometric data), and prohibited commands (e.g., commands to perform certain prohibited actions, commands to retrieve data that the user does not have authorization to retrieve).

Applying the plurality of input validation tests can include comparing the user input data to reference patterns indicative of prohibited user content. For example, the avatar management platform can compare a vector representation of the user input data to respective vector representations of one or more reference patterns. The avatar management platform can determine vector representations for each modality of the user input data and/or determine vector representations of multimodal data (e.g., audiovisual data). In some implementations, comparing the vector representations can include determining a cosine similarity between vectors. In some implementations, the avatar management platform can generate a score based on a comparison between a vector representation of the user input data and one or more vector representations of reference patterns. The score can represent a degree to which the reference pattern is present within the user input data and/or a degree to which prohibited content is present within the user input data.

At operation 1406, the avatar management platform can determine that the user input data includes prohibited user content. In some implementations, determining that the input data includes prohibited user content includes generating a score that represents a degree to which a reference pattern and/or prohibited user content is present in the user input data, and determining that the score satisfies a threshold. The score can be generated in accordance with a comparison between vector representations of the user input data and one or more reference patterns. The score can be a value (e.g., between 0 and 10), and the score can satisfy the threshold when the score is greater than or equal to a threshold value.

At operation 1408, the avatar management platform can determine a user input prompt. The user input prompt can be determined (e.g., identified and/or generated) by adjusting the user input data to remove the prohibited user content within the user input data. In some implementations, the avatar management platform deletes the prohibited user content from the user input data. In some implementations, the avatar management platform replaces the prohibited user content within the user input data (e.g., with fake and/or random content, and/or with proxy content).

At operation 1410, the avatar management platform can input the user input prompt into a generative AI model. The generative AI model can be configured to generate text, audio signals, and/or visual signals. The generative AI model can be configured to generate content in real time as part of an avatar conversation. The generative AI model can be hosted by a second infrastructure layer operating in a second network perimeter. Inputting the user input prompt into the generative AI model can include transmitting the user input prompt from the first infrastructure layer to the second infrastructure layer. For example, the avatar management platform can transmit the user input prompt from an internal system operating in the first infrastructure layer to an external system operating in the second infrastructure layer, where the external system is a generative AI model and/or inputs the user input prompt into the generative AI model. In some implementations, the user input prompt is input into multiple generative AI models (e.g., portions of the user input prompt are input into respective generative AI models).

At operation 1412, the avatar management platform can generate a candidate avatar response by using the generative AI model. The candidate avatar response can include multimodal data, such as text, audio signals, and/or visual signals. The candidate avatar response can be part of a bidirectional communication session, and can be generated in real time as part of the bidirectional communication session. The candidate avatar response can be generated in accordance with an external guardrails module that applies one or more guardrails to the candidate avatar response.

At operation 1414, the avatar management platform can receive, from the generative AI model, the candidate avatar response of the AI avatar. The candidate avatar response can be transmitted from the second infrastructure layer to the first infrastructure layer.

At operation 1416, the avatar management platform can apply a plurality of avatar validation tests to the candidate avatar response. Each avatar validation test can be configured to identify prohibited avatar content within the candidate avatar response. The prohibited avatar content can include multimodal content, such as prohibited text, audio, and/or video content. Avatar validation tests can be configured to identify prohibited avatar audio content and/or prohibited avatar video content. Examples of prohibited avatar content can include prohibited language content (e.g., rude language, offensive speech), a prohibited tone of voice (e.g., angry, condescending), a prohibited speech cadence (e.g., too fast or irregular), or a prohibited volume (e.g., too loud or too soft). Examples of prohibited user video content include prohibited gestures (e.g., rude, angry, or violent gestures, rude words in sign language), a prohibited avatar visual characteristic (e.g., body proportions, face proportions, tropes or stereotypes, gory content), or prohibited visual information (e.g., offensive language displayed as video data).

Applying the plurality of avatar validation tests can include comparing the candidate avatar response to reference patterns indicative of prohibited avatar content. For example, the avatar management platform can compare a vector representation of the user input data to respective vector representations of one or more reference patterns. The avatar management platform can determine vector representations for each modality of the candidate avatar responses and/or determine vector representations of multimodal data (e.g., audiovisual data). In some implementations, comparing the vector representations can include determining a cosine similarity between vectors. In some implementations, the avatar management platform can generate a score based on a comparison between a vector representation of the candidate avatar response and one or more vector representations of reference patterns. The score can represent a degree to which the reference pattern is present within the candidate avatar response and/or a degree to which prohibited content is present within the candidate avatar response.

At operation 1418, the avatar management platform can determine that the candidate avatar response includes prohibited avatar content. In some implementations, determining that the candidate avatar response includes prohibited avatar content includes generating a score that represents a degree to which a reference pattern and/or prohibited avatar content is present in the candidate avatar response, and determining that the score satisfies a threshold. The score can be generated in accordance with a comparison between vector representations of the user input data and one or more reference patterns. The score can be a value (e.g., between 0 and 10), and the score can satisfy the threshold when the score is greater than or equal to a threshold value.

In some implementations, determining that the candidate avatar response includes prohibited avatar content includes applying a plurality of avatar validation tests to the candidate avatar response, comparing a vector representation of the candidate avatar response against a respective vector representation of at least one reference pattern indicative of the prohibited avatar content, and generating a score for the candidate avatar response in accordance with the comparison.

At operation 1420, the avatar management platform can determine a final avatar response. The final avatar response can be determined (e.g., identified and/or generated) by adjusting the candidate avatar response to remove the prohibited avatar content within the candidate avatar response. In some implementations, the avatar management platform replaces the prohibited avatar content within the candidate avatar response (e.g., replaces prohibited avatar content with a natural pause in the avatar communication). In some embodiments, the avatar management platform identifies proxy content in the candidate avatar response (e.g., wherein the prohibited avatar content is a placeholder) and replaces the proxy content with relevant data (e.g., data that the proxy content is meant to represent). In some embodiments, removing the prohibited avatar content involves sending a request to the generative AI model to generate a replacement avatar response that does not include the prohibited avatar content, and include the replacement avatar response in the final avatar response.

At operation 1422, the avatar management platform can cause the final avatar response to be transmitted to the client application. For example, the avatar management platform can cause the final avatar response to be transmitted from the second infrastructure layer, through the first infrastructure layer and the connection, to the client application. Alternatively, or additionally, the avatar management platform can cause the final avatar response to be transmitted from the first infrastructure layer, through the connection, to the client application. The final avatar response can be presented by the client application (e.g., on a user interface).

Example Implementation of the Models of the Avatar Management Platform

Figure 15:
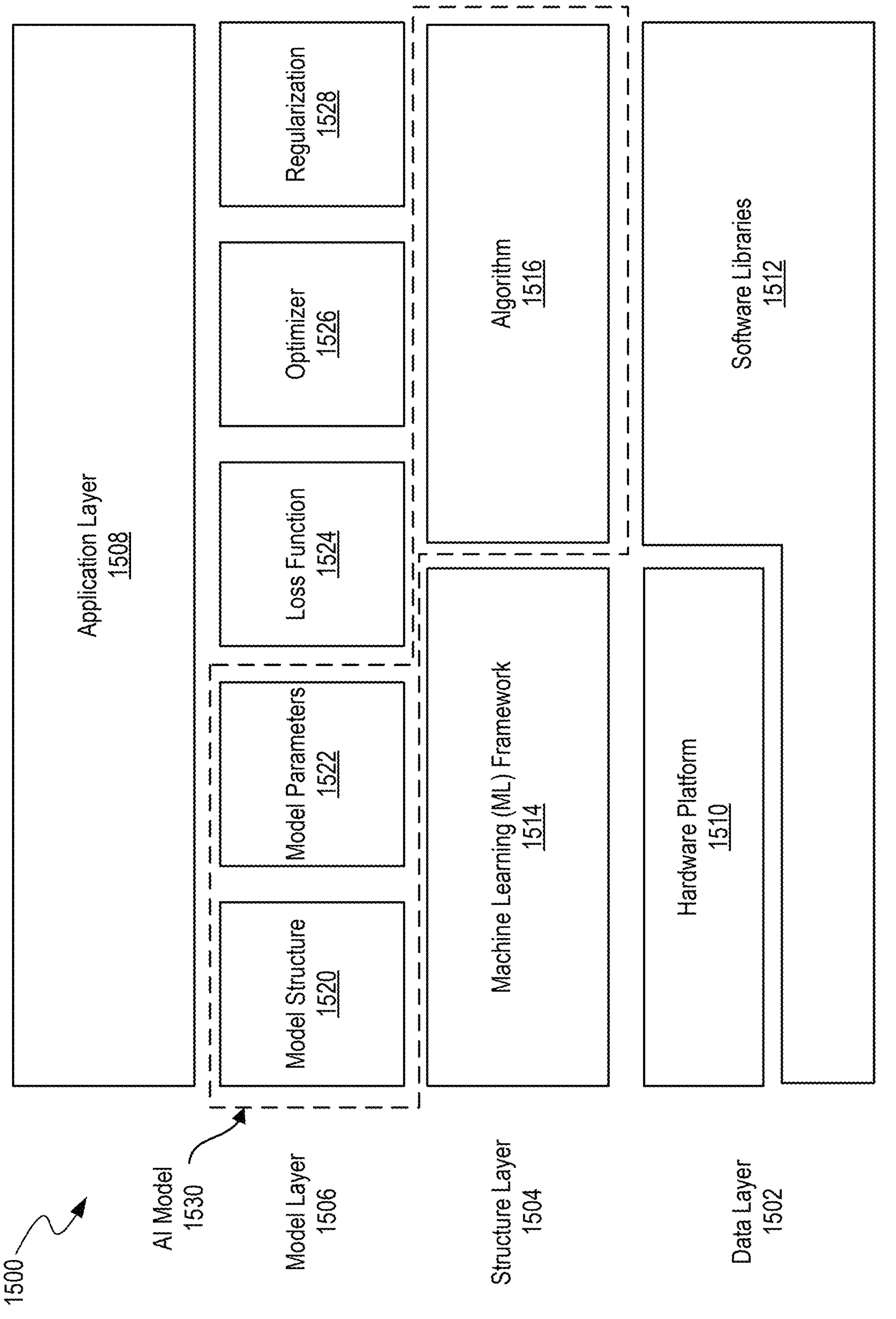
FIG. 15 illustrates a layered architecture of an AI system that can implement the machine learning (ML) models of an avatar management platform, in accordance with some implementations of the present technology.

FIG. 15 illustrates a layered architecture of an AI system 1500 that can implement the ML models of the avatar management platform of FIG. 15, in accordance with some implementations of the present technology. Example ML models can include the models executed by the avatar management platform, such as the agents 110 and/or the generative AI model 118 in FIG. 1. Accordingly, the agents 110 and/or the generative AI model 118 in FIG. 1 can include one or more components of the AI system 1500.

As shown, the AI system 1500 can include a set of layers, which conceptually organize elements within an example network topology for the AI system's architecture to implement a particular AI model (e.g., the AI model 1530). Generally, an AI model is a computer-executable program implemented by the AI system 1500 that analyses data to make predictions. Information can pass through each layer of the AI system 1500 to generate outputs for the AI model. The layers can include a data layer 1502, a structure layer 1504, a model layer 1506, and an application layer 1508. The algorithm 1516 of the structure layer 1504 and the model structure 1520 and model parameters 1522 of the model layer 1506 together form an example AI model. The optimizer 1526, loss function engine 1524, and regularization engine 1528 work to refine and optimize the AI model, and the data layer 1502 provides resources and support for application of the AI model by the application layer 1508.

The data layer 1502 acts as the foundation of the AI system 1500 by preparing data for the AI model. As shown, the data layer 1502 can include two sub-layers: a hardware platform 1510 and one or more software libraries 1512. The hardware platform 1510 can be designed to perform operations for the AI model and include computing resources for storage, memory, logic and networking, such as the resources described in relation to FIGS. 16 and 17. The hardware platform 1510 can process amounts of data using one or more servers. The servers can perform backend operations such as matrix calculations, parallel calculations, machine learning (ML) training, and the like. Examples of servers used by the hardware platform 1510 include CPUs and GPUs. CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1510 can include computing resources (e.g., servers, memory, etc.) offered by a cloud services provider. The hardware platform 1510 can also include computer memory for storing data about the AI model, application of the AI model, and training data for the AI model. The computer memory can be a form of random-access memory (RAM), such as dynamic RAM, static RAM, and non-volatile RAM.

The software libraries 1512 can be thought of suites of data and programming code, including executables, used to control the computing resources of the hardware platform 1510. The programming code can include low-level primitives (e.g., fundamental language elements) that form the foundation of one or more low-level programming languages, such that servers of the hardware platform 1510 can use the low-level primitives to carry out specific operations. The low-level programming languages do not require much, if any, abstraction from a computing resource's instruction set architecture, enabling them to run quickly with a small memory footprint. Examples of software libraries 1512 that can be included in the AI system 1500 include INTEL Math Kernel Library, NVIDIA cuDNN, EIGEN, and OpenBLAS.

The structure layer 1504 can include an ML framework 1514 and an algorithm 1516. The ML framework 1514 can be thought of as an interface, library, or tool that enables users to build and deploy the AI model. The ML framework 1514 can include an open-source library, an API, a gradient-boosting library, an ensemble method, and/or a deep learning toolkit that work with the layers of the AI system facilitate development of the AI model. For example, the ML framework 1514 can distribute processes for application or training of the AI model across multiple resources in the hardware platform 1510. The ML framework 1514 can also include a set of pre-built components that have the functionality to implement and train the AI model and enable users to use pre-built functions and classes to construct and train the AI model. Thus, the ML framework 1514 can be used to facilitate data engineering, development, hyperparameter tuning, testing, and training for the AI model. Examples of ML frameworks 1514 that can be used in the AI system 1500 include TENSORFLOW, PYTORCH, SCIKIT-LEARN, KERAS, LightGBM, RANDOM FOREST, and AMAZON WEB SERVICES.

The algorithm 1516 can be an organized set of computer-executable operations used to generate output data from a set of input data and can be described using pseudocode. The algorithm 1516 can include complex code that enables the computing resources to learn from new input data and create new/modified outputs based on what was learned. In some implementations, the algorithm 1516 can build the AI model through being trained while running computing resources of the hardware platform 1510. This training enables the algorithm 1516 to make predictions or decisions without being explicitly programmed to do so. Once trained, the algorithm 1516 can run at the computing resources as part of the AI model to make predictions or decisions, improve computing resource performance, or perform tasks. The algorithm 1516 can be trained using supervised learning, unsupervised learning, semi-supervised learning, and/or reinforcement learning.

Using supervised learning, the algorithm 1516 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of audio data in FIG. 1) from various source computing systems described in relation to FIG. 15. Furthermore, training data can include pre-processed data generated by various engines of the avatar management platform described in relation to FIG. 15. The user may label the training data based on one or more classes and trains the AI model by inputting the training data to the algorithm 1516. The algorithm determines how to label the new data based on the labeled training data. The user can facilitate collection, labeling, and/or input via the ML framework 1514. In some instances, the user may convert the training data to a set of feature vectors for input to the algorithm 1516. Once trained, the user can test the algorithm 1516 on new data to determine if the algorithm 1516 is predicting accurate labels for the new data. For example, the user can use cross-validation methods to test the accuracy of the algorithm 1516 and retrain the algorithm 1516 on new training data if the results of the cross-validation are below an accuracy threshold.

Supervised learning can include classification and/or regression. Classification techniques include teaching the algorithm 1516 to identify a category of new observations based on training data and are used when input data for the algorithm 1516 is discrete. Said differently, when learning through classification techniques, the algorithm 1516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1516 can categorize new data by analyzing the new data for features that map to the categories. Examples of classification techniques include boosting, decision tree learning, genetic programming, learning vector quantization, KNN algorithm, and statistical classification.

Regression techniques include estimating relationships between independent and dependent variables and are used when input data to the algorithm 1516 is continuous. Regression techniques can be used to train the algorithm 1516 to predict or forecast relationships between variables. To train the algorithm 1516 using regression techniques, a user can select a regression method for estimating the parameters of the model. The user collects and labels training data that is input to the algorithm 1516 such that the algorithm 1516 is trained to understand the relationship between data features and the dependent variable(s). Once trained, the algorithm 1516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 1516 learns patterns from unlabeled training data. In particular, the algorithm 1516 is trained to learn hidden patterns and insights of input data, which can be used for data exploration or for generating new data. Here, the algorithm 1516 does not have a predefined output, unlike the labels output when the algorithm 1516 is trained using supervised learning. Said another way, unsupervised learning is used to train the algorithm 1516 to find an underlying structure of a set of data, group the data according to similarities, and represent that set of data in a compressed format. The avatar management platform can use unsupervised learning to identify patterns in claim history (e.g., to identify particular event sequences) and so forth. In some implementations, performance of the avatar management platform that can use unsupervised learning is improved because the incoming memories (e.g., audio data in FIG. 1) is pre-processed and reduced, based on the relevant triggers, as described herein.

A few techniques can be used in unsupervised learning: clustering, anomaly detection, and techniques for learning latent variable models. Clustering techniques include grouping data into different clusters that include similar data, such that other clusters contain dissimilar data. For example, during clustering, data with possible similarities remains in a group that has less or no similarities to another group. Examples of clustering techniques density-based methods, hierarchical based methods, partitioning methods, and grid-based methods. In one example, the algorithm 1516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1516 may be trained to be an Isolation Forest, local outlier factor (LOF) algorithm, or KNN algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 1516 include factor analysis, item response theory, latent profile analysis, and latent class analysis.

The model layer 1506 implements the AI model using data from the data layer and the algorithm 1516 and ML framework 1514 from the structure layer 1504, thus enabling decision-making capabilities of the AI system 1500. The model layer 1506 includes a model structure 1520, model parameters 1522, a loss function engine 1524, an optimizer 1526, and a regularization engine 1528.

The model structure 1520 describes the architecture of the AI model of the AI system 1500. The model structure 1520 defines the complexity of the pattern/relationship that the AI model expresses. Examples of structures that can be used as the model structure 1520 include decision trees, support vector machines, regression analyses, Bayesian networks, Gaussian processes, genetic algorithms, and artificial neural networks (or, simply, neural networks). The model structure 1520 can include a number of structure layers, a number of nodes (or neurons) at each structure layer, and activation functions of each node. Each node's activation function defines how a node converts data received to data output. The structure layers may include an input layer of nodes that receive input data, an output layer of nodes that produce output data. The model structure 1520 may include one or more hidden layers of nodes between the input and output layers. The model structure 1520 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 1522 represent the relationships learned during training and can be used to make predictions and decisions based on input data. The model parameters 1522 can weigh and bias the nodes and connections of the model structure 1520. For instance, when the model structure 1520 is a neural network, the model parameters 1522 can weight and bias the nodes in each layer of the neural networks, such that the weights determine the strength of the nodes and the biases determine the thresholds for the activation functions of each node. The model parameters 1522, in conjunction with the activation functions of the nodes, determine how input data is transformed into desired outputs. The model parameters 1522 can be determined and/or altered during training of the algorithm 1516.

The loss function engine 1524 can determine a loss function, which is a metric used to evaluate the AI model's performance during training. For instance, the loss function engine 1524 can measure the difference between a predicted output of the AI model and the actual output of the AI model and is used to guide optimization of the AI model during training to minimize the loss function. The loss function may be presented via the ML framework 1514, such that a user can determine whether to retrain or otherwise alter the algorithm 1516 if the loss function is over a threshold. In some instances, the algorithm 1516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1526 adjusts the model parameters 1522 to minimize the loss function during training of the algorithm 1516. In other words, the optimizer 1526 uses the loss function generated by the loss function engine 1524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1526 used may be determined based on the type of model structure 1520 and the size of data and the computing resources available in the data layer 1502.

The regularization engine 1528 executes regularization operations. Regularization is a technique that prevents over- and under-fitting of the AI model. Overfitting occurs when the algorithm 1516 is overly complex and too adapted to the training data, which can result in poor performance of the AI model. Underfitting occurs when the algorithm 1516 is unable to recognize even basic patterns from the training data such that it cannot perform well on training data or on validation data. The optimizer 1526 can apply one or more regularization techniques to fit the algorithm 1516 to the training data properly, which helps constrain the resulting AI model and improves its ability for generalized application. Examples of regularization techniques include lasso (L1) regularization, ridge (L2) regularization, and elastic (L1 and L2 regularization).

The application layer 1508 describes how the AI system 1500 is used to solve problems or perform tasks. In an example implementation, the application layer 1508 can include a front-end user interface of the avatar management platform.

Example Computing Environment of the Avatar Management Platform

Figure 16:
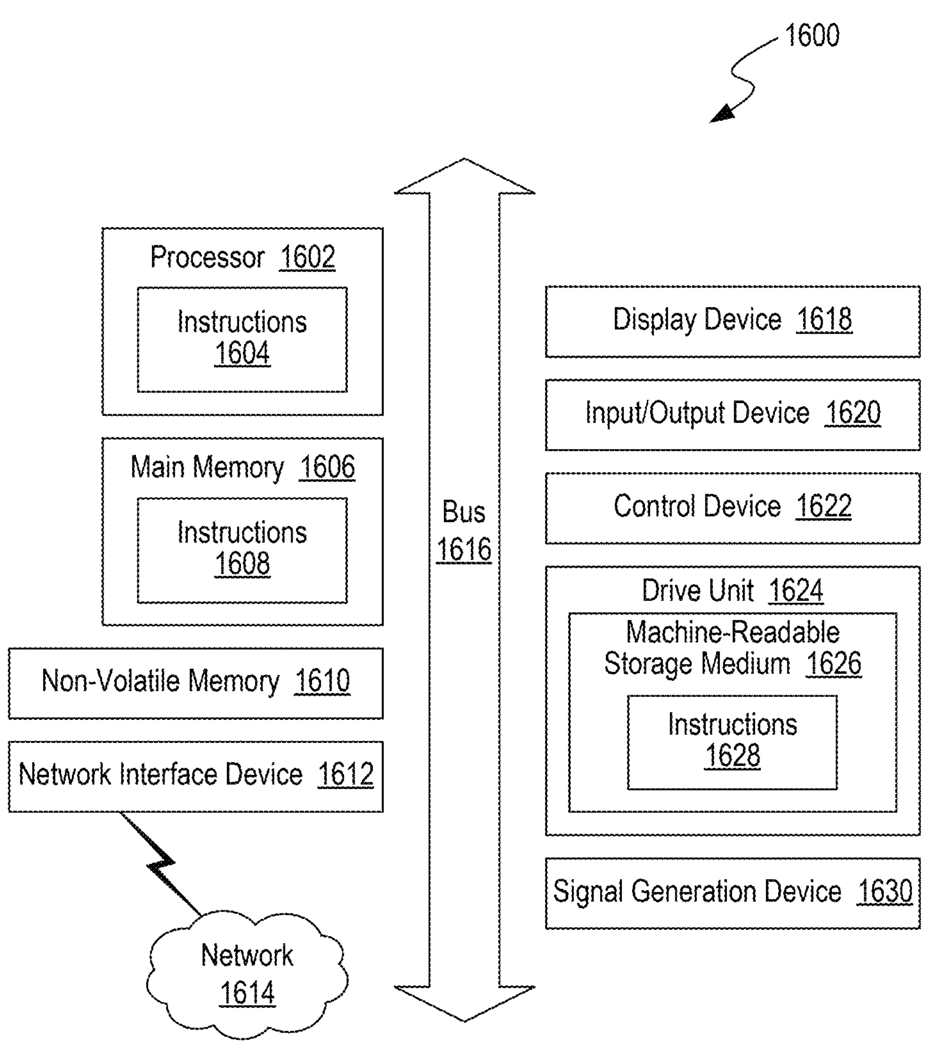
FIG. 16 is a block diagram showing some of the components typically incorporated in at least some of the computer systems and other devices on which the avatar management platform operates, in accordance with some implementations of the present technology.

FIG. 16 is a block diagram showing some of the components typically incorporated in at least some of the computer systems 1600 and other devices on which the disclosed system operates in accordance with some implementations of the present technology. As shown, an example computer system 1600 can include: one or more processors 1602, main memory 1606, non-volatile memory 1610, a network interface device 1612, video display device 1618, an input/output device 1620, a control device 1622 (e.g., keyboard and pointing device), a drive unit 1624 that includes a machine-readable medium 1626, and a signal generation device 1630 that are communicatively connected to a bus 1616. The bus 1616 represents one or more physical buses and/or point-to-point connections that are connected by appropriate bridges, adapters, or controllers. Various common components (e.g., cache memory) are omitted from FIG. 16 for brevity. Instead, the computer system 1600 is intended to illustrate a hardware device on which components illustrated or described relative to the examples of the figures and any other components described in this specification can be implemented.

The computer system 1600 can take any suitable physical form. For example, the computer system 1600 can share a similar architecture to that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computer system 1600. In some implementations, the computer system 1600 can be an embedded computer system, a system-on-chip (SOC), a single-board computer system (SBC) or a distributed system such as a mesh of computer systems or include one or more cloud components in one or more networks. Where appropriate, one or more computer systems 1600 can perform operations in real time, near real time, or in batch mode.

The network interface device 1612 enables the computer system 1600 to exchange data in a network 1614 with an entity that is external to the computing system 1600 through any communication protocol supported by the computer system 1600 and the external entity. Examples of the network interface device 1612 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1606, non-volatile memory 1610, machine-readable medium 1626) can be local, remote, or distributed. Although shown as a single medium, the machine-readable medium 1626 can include multiple media (e.g., a centralized/distributed database and/or associated caches and servers) that store one or more sets of instructions 1628. The machine-readable (storage) medium 1626 can include any medium that is capable of storing, encoding, or carrying a set of instructions for execution by the computer system 1600. The machine-readable medium 1626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1608, 1628) set at various times in various memory and storage devices in computing device(s). When read and executed by the processor 1602, the instruction(s) cause the computer system 1600 to perform operations to execute elements involving the various aspects of the disclosure.

Figure 17:
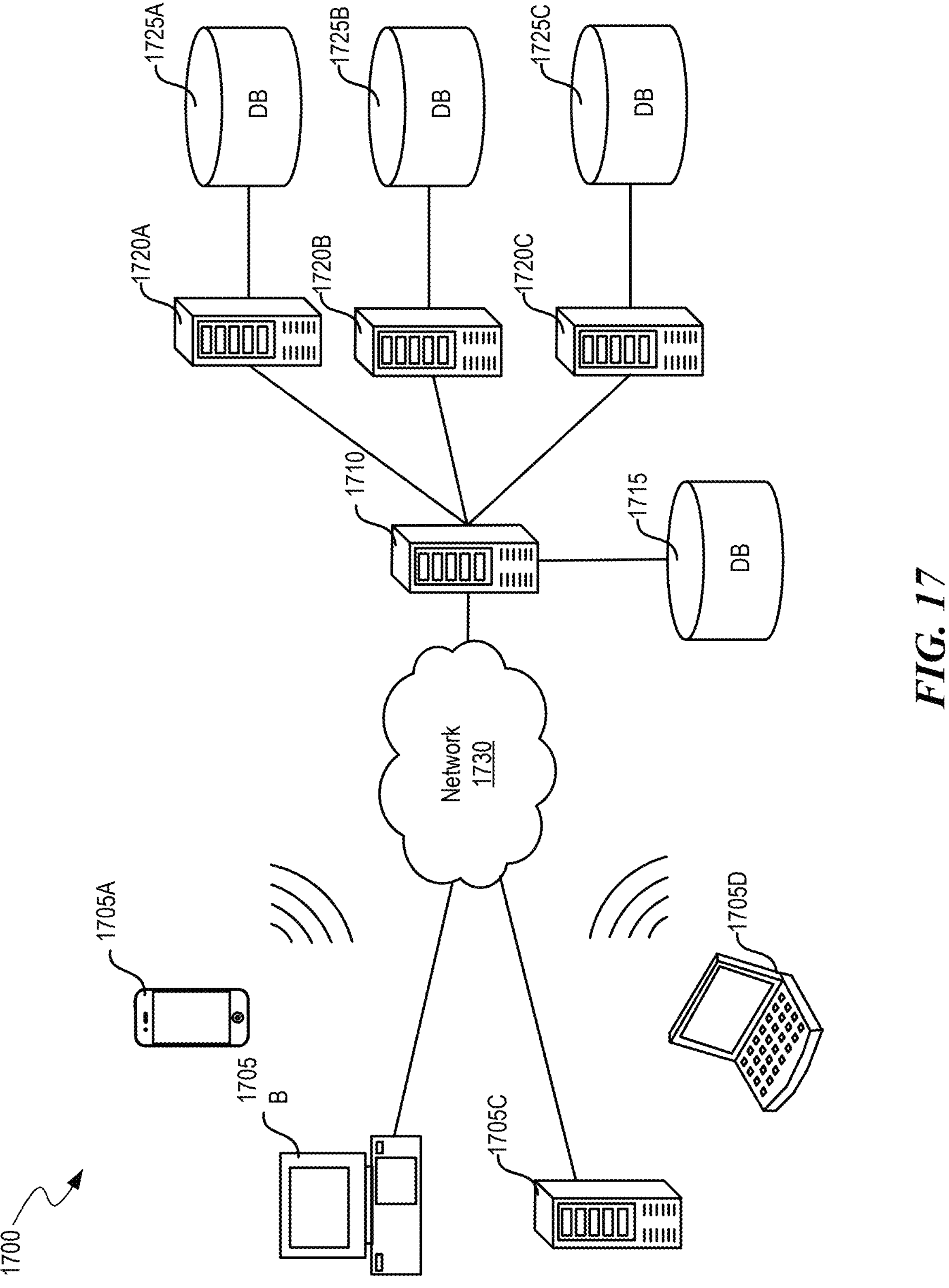
FIG. 17 is a system diagram illustrating an example of a computing environment in which the avatar management platform operates, in accordance with some implementations of the present technology.

FIG. 17 is a system diagram illustrating an example of a computing environment in which the disclosed system operates in some implementations. In some implementations, environment 1700 includes one or more client computing devices 1705A-D, examples of which can host the avatar management platform of FIG. 10. Client computing devices 1705 operate in a networked environment using logical connections through network 1730 to one or more remote computers, such as a server computing device.

In some implementations, server computing device 1710 is an edge server which receives client requests and coordinates fulfillment of those requests through other servers, such as servers 1720A-C. In some implementations, server computing devices 1710 and 1720 comprise computing systems, such as the avatar management platform of FIG. 10. Though each server computing device 1710 and 1720 is displayed logically as a single server, server computing devices can each be a distributed computing environment encompassing multiple computing devices located at the same or at geographically disparate physical locations. In some implementations, each server computing device 1720 corresponds to a group of servers.

Client computing devices 1705 and server computing devices 1710 and 1720 can each act as a server or client to other server or client devices. In some implementations, servers (1710, 1720A-C) connect to a corresponding database (1715, 1725A-C). As discussed above, each server computing device 1720 can correspond to a group of servers, and each of these servers can share a database or can have its own database. Databases 1715 and 1725 warehouse (e.g., store) information such as claims data, email data, call transcripts, call logs, policy data and so on. Though databases 1715 and 1725 are displayed logically as single units, databases 1715 and 1725 can each be a distributed computing environment encompassing multiple computing devices, can be located within their corresponding server, or can be located at the same or at geographically disparate physical locations.

Network 1730 can be a local area network (LAN) or a wide area network (WAN), but can also be other wired or wireless networks. In some implementations, network 1730 is the Internet or some other public or private network. Client computing devices 1705 are connected to network 1730 through a network interface, such as by wired or wireless communication. While the connections between server computing device 1710 and server computing devices 1720 are shown as separate connections, these connections can be any kind of local, wide area, wired, or wireless network, including network 1730 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having operations, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 612(f) will begin with the words "means for," but use of the term "for" in any other context is not intended to invoke treatment under 35 U.S.C. § 612(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A system comprising:

at least one hardware processor; and at least one non-transitory memory storing instructions, which, when executed by the at least one hardware processor, cause the system to:

receive, at a client application executing on a client device, a user interaction request to initiate a communication session with an artificial intelligence avatar, wherein the artificial intelligence avatar is configured to present an audiovisual signal responsive to an input received by the client application;

initiate the communication session by establishing a connection between the client application and a first infrastructure layer operating within a first network perimeter, wherein the connection is configured to bidirectionally transmit data during the communication session;

receive, from the client application through the connection to the first infrastructure layer, user input data comprising at least one of natural language text, audio data, or video data captured during the communication session;

invoke, within the first infrastructure layer, a plurality of agents each configured to execute a command set to retrieve a data record set corresponding to the user interaction request, wherein the plurality of agents are each trained using different domain-specific knowledge bases to execute a respective command set;

route (a) the user input data and (b) the data record set from the first infrastructure layer operating within a first network perimeter controlled by a first entity to a second infrastructure layer operating within a second network perimeter controlled by a second entity different from the first entity;

cause generation of an avatar response of the artificial intelligence avatar using a generative artificial intelligence model hosted by the second infrastructure layer, wherein the generative artificial intelligence model is configured to:

identify, within the data record set, one or more data fields by comparing a vector representation of the user input data and a vector representation of each data field in the data record set, map the one or more data fields to one or more corresponding data sources, and use (a) the one or more data fields and (b) a representation of the one or more corresponding data sources to generate an audio stream and a corresponding video stream within the avatar response, wherein the audio stream and the corresponding video stream are responsive to the user input data; and cause transmission of the avatar response from the second infrastructure layer, through the first infrastructure layer and the connection, to the client application for presentation of the avatar response on the client device during the communication session.

2. The system of claim 1, wherein the user interaction request comprises a service inquiry from a user account, and wherein the data record set comprises at least one of: account information, transaction history, or product data associated with the user account.

3. The system of claim 2, wherein the system is further caused to:

classify the service inquiry as a servicing request or an advice request, wherein the servicing request comprises a request to execute a transaction in association with the user account, and wherein the advice request comprises a request for a recommendation generated based on the data record set associated with the user account.

4. The system of claim 1, wherein the system is further caused to:

validate the user input data prior to routing the user input data to the second infrastructure layer by applying one or more criteria to remove prohibited content within the user input data, wherein the one or more criteria are associated with one or more patterns indicative of the prohibited content within the user input data.

5. The system of claim 1, wherein the system is further caused to:

validate the avatar response prior to causing transmission of the avatar response to the client application by applying one or more criteria to remove prohibited content within the avatar response, wherein the one or more criteria are associated with one or more patterns indicative of the prohibited content within the avatar response.

6. The system of claim 5, wherein the one or more criteria comprise a classification rule configured to determine whether the avatar response includes advice or a transaction request, and wherein, in response to a determination that the avatar response includes the advice, the system is further caused to modify the avatar response to remove the advice.

7. The system of claim 1, wherein the system is further caused to:

apply one or more validation rules to at least one of the user input data or the avatar response to generate a validation result; and modify the avatar response using the validation result, wherein modifying the avatar response comprises at least one of: adjusting a conversation topic within the avatar response, requesting additional authentication information, or adding a referral associated with a particular agent within the avatar response.

8. A non-transitory computer-readable storage medium comprising instructions for deploying an artificial intelligence avatar stored thereon, wherein the instructions when executed by at least one data processor of a system, cause the system to:

obtain, at a client application executing on a client device, a user interaction request to initiate a communication session with an artificial intelligence avatar, wherein the artificial intelligence avatar is configured to present an audiovisual signal responsive to an input obtained by the client application;

cause initiation of the communication session by establishing a connection between the client application and a first infrastructure layer operating within a first network perimeter controlled by a first entity;

obtain, from the client application through the connection to the first infrastructure layer, user input data comprising at least one of natural language text, audio data, or video data captured during the communication session;

invoke, within the first infrastructure layer, one or more agents each configured to execute a command set to retrieve a data record set corresponding to the user input data;

cause generation of an avatar response of the artificial intelligence avatar using a generative artificial intelligence model hosted by a second infrastructure layer operating within a second network perimeter controlled by a second entity different from the first entity, wherein the generative artificial intelligence model is configured to use the data record set to generate the avatar response, and wherein the avatar response is responsive to the user input data; and cause transmission of the avatar response from the second infrastructure layer, through the first infrastructure layer and the connection, to the client application for presentation of the avatar response on the client device during the communication session.

9. The non-transitory computer-readable storage medium of claim 8, wherein the instructions further cause the system to:

store a record of the avatar response on a distributed ledger, wherein the distributed ledger comprises at least one of a blockchain or a federated ledger.

10. The non-transitory computer-readable storage medium of claim 8, wherein the first infrastructure layer operates within a first network perimeter controlled by a first entity, and wherein the second infrastructure layer operates within a second network perimeter controlled by a second entity different from the first entity.

11. The non-transitory computer-readable storage medium of claim 8, wherein the instructions further cause the system to:

invoke a guardrails service hosted within the first infrastructure layer, wherein the guardrails service is configured to apply one or more criteria to at least one of the user input data or the avatar response.

12. The non-transitory computer-readable storage medium of claim 8, wherein the instructions further cause the system to:

invoke a guardrails service hosted within the second infrastructure layer, wherein the guardrails service is configured to apply one or more criteria to at least one of the user input data or the avatar response.

13. The non-transitory computer-readable storage medium of claim 8, wherein the instructions further cause the system to:

invoke a first guardrails service hosted within the first infrastructure layer, wherein the first guardrails service is configured to trigger one or more function calls to a second guardrails service external to the first infrastructure layer, and wherein the second guardrails service is configured to apply one or more criteria to at least one of the user input data or the avatar response.

14. The non-transitory computer-readable storage medium of claim 8, wherein the instructions further cause the system to:

classify the user input data into a category;

identify a subset of validation rules from a plurality of validation rules based on the category;

apply the subset of validation rules to the avatar response to generate a validation result; and determine, based on the validation result, whether to transmit the avatar response to the client application or generate a modified avatar response.

15. A computer-implemented method for deploying an artificial intelligence avatar, the computer-implemented method comprising:

obtaining, at a computer-implemented application, a user interaction request to initiate a communication session with the artificial intelligence avatar configured to present an output responsive to an input obtained by the computer-implemented application;

causing initiation of the communication session by establishing a connection between the computer-implemented application and a first infrastructure layer operating within a first network perimeter controlled by a first entity;

obtaining, from the computer-implemented application through the connection to the first infrastructure layer, input data obtained during the communication session;

causing invocation of, within the first infrastructure layer, one or more agents each configured to execute a command set to retrieve a data record set corresponding to the input data;

causing generation of an avatar response of the artificial intelligence avatar using a generative artificial intelligence model hosted by a second infrastructure layer operating within a second network perimeter controlled by a second entity different from the first entity, wherein the generative artificial intelligence model is configured to use the data record set to generate the avatar response; and causing transmission of the avatar response from the second infrastructure layer, through the first infrastructure layer and the connection, to the computer-implemented application for presentation of the avatar response during the communication session.

16. The computer-implemented method of claim 15, further comprising:

evaluating the input data to determine one or more subsequent interaction requests to occur within a predetermined number of conversational turns; and invoking one or more additional agents configured to retrieve supplemental data records corresponding to the one or more subsequent interaction requests.

17. The computer-implemented method of claim 15, further comprising:

storing conversation data including one or more of the input data or the avatar response from the communication session in a memory database, wherein the conversation data is accessible across multiple client devices.

18. The computer-implemented method of claim 15, further comprising:

classify conversation data as short-term memory data or long-term memory data based on temporal data associated with the conversation data, wherein the conversation data includes one or more input data and one or more avatar responses across multiple communication sessions, storing the short-term memory data in a session memory that is accessible during the communication session; and storing the long-term memory data in a persistent memory database that is accessible across the multiple communication sessions.

19. The computer-implemented method of claim 15, wherein the computer-implemented application is hosted on a first client device, further comprising:

receiving a request to access the communication session from a second client device different from the first client device;

transmitting an authentication test to the second client device;

receiving authentication information from the second client device in response to the authentication test;

validating the authentication information against stored user information associated with the first client device; and in response to satisfaction of the authentication information with the stored user information, establishing a connection from the second client device to the communication session.

20. The computer-implemented method of claim 15, further comprising:

detecting a presence of an unauthorized user during the communication session; and responsive to detecting the presence of the unauthorized user, modifying the avatar response to remove one or more indicators of the data record set.

* * * * *